US006188953B1

United States Patent
Yasui et al.

(10) Patent No.: US 6,188,953 B1
(45) Date of Patent: Feb. 13, 2001

(54) PLANT CONTROL SYSTEM

(75) Inventors: Yuji Yasui; Shusuke Akazaki; Yoshihisa Iwaki, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/311,353

(22) Filed: May 13, 1999

(30) Foreign Application Priority Data

May 13, 1998 (JP) .................................................. 10-130864

(51) Int. Cl.$^7$ ................................. F02D 41/14; F01N 3/10
(52) U.S. Cl. .......................... 701/109; 701/103; 60/276; 60/285; 123/674
(58) Field of Search ...................................... 123/672, 673, 123/674, 679; 60/274, 276, 285; 701/101, 102, 103, 109, 115, 116

(56) References Cited

U.S. PATENT DOCUMENTS

| | | | |
|---|---|---|---|
| 5,365,216 | * 11/1994 | Kotwicki et al. | 701/109 |
| 5,682,317 | * 10/1997 | Keeler et al. | 701/101 |
| 5,694,910 | 12/1997 | Hasegawa | 123/674 |
| 5,806,506 | * 9/1998 | Kitamura et al. | 701/109 |
| 5,813,389 | * 9/1998 | Kitamura et al. | 701/109 |
| 5,845,490 | 12/1998 | Yasui et al. | 60/276 |
| 5,845,491 | 12/1998 | Yasui et al. | 60/276 |
| 5,852,930 | 12/1998 | Yasui et al. | 60/276 |
| 5,878,733 | * 3/1999 | Kato et al. | 701/109 |
| 5,880,952 | 3/1999 | Yasui et al. | 700/28 |
| 5,884,613 | * 3/1999 | Kitamura et al. | 701/109 |
| 5,924,281 | * 7/1999 | Yasui et al. | 60/276 |
| 5,947,096 | * 9/1999 | Kurokawa et al. | 701/109 |
| 6,112,517 | * 9/2000 | Yasui et al. | 701/109 |

FOREIGN PATENT DOCUMENTS

| | | |
|---|---|---|
| 4-369471 | 12/1992 | (JP) . |
| 5-79374 | 3/1993 | (JP) . |
| 7-83094 | 3/1995 | (JP) . |
| 7-259588 | 10/1995 | (JP) . |
| 8-21273 | 1/1996 | (JP) . |
| 8-105345 | 4/1996 | (JP) . |
| 9-251142 | 9/1997 | (JP) . |
| 9-273438 | 10/1997 | (JP) . |

\* cited by examiner

*Primary Examiner*—Willis R. Wolfe
(74) *Attorney, Agent, or Firm*—Arent Fox Kintner Plotkin & Kahn, PLLC

(57) ABSTRACT

A plant control system has an actuator for generating an input to the plant, a first sensor for detecting an output from the plant, a manipulated variable determining unit for sequentially determining a manipulated variable which determines the input to the plant to equalize the output from the first sensor to a predetermined target value, an actuator controller for controlling operation of the actuator based on the manipulated variable determined by the manipulated variable determining unit, and an estimator for sequentially generating data representing an estimated value of the output from the first sensor after a total dead time which is the sum of a first dead time of the plant and a second dead time of a system which comprises the actuator and the actuator controller. The manipulated variable determining unit determines the manipulated variable based on the data generated by the estimator.

21 Claims, 21 Drawing Sheets

PLANT CONTROL SYSTEM

BACKGROUND OF THE INVENTION

1. Field of the Invention

The present invention relates to a plant control system for controlling a plant.

2. Description of the Prior Art

The inventors already proposed a control system for controlling the air-fuel ratio of an air-fuel mixture to be combusted by an internal combustion engine to achieve optimum purifying performance of a catalytic converter such as a three-way catalytic converter disposed in the exhaust passage of the internal combustion engine, as disclosed in Japanese laid-open patent publication No. 9-273438 which corresponds to U. S. patent application No. 08/835192 now U.S. Pat. No. 5,924,281.

According to the proposed control system, the air-fuel ratio of the internal combustion engine is controlled to adjust the concentration of a certain component, e.g., oxygen, in an exhaust gas that has passed through the catalytic converter highly accurately to a predetermined optimum value for thereby keeping the catalytic converter maximally effective to purify the exhaust gas regardless of aging thereof. The control process is carried out as follows:

The control system has an $O_2$ sensor disposed downstream of the catalytic converter for detecting the concentration of oxygen contained in the exhaust gas which has passed through the catalytic converter. The control system sequentially determines a manipulated variable for determining the air-fuel ratio of the internal combustion engine, specifically, a target air-fuel ratio for the exhaust gas, such that an output of the $O_2$ sensor will be of a given target value corresponding to the above predetermined optimum value for the oxygen concentration. The control system then controls the air-fuel ratio of the internal combustion engine according to the target air-fuel ratio, more specifically, controls the amount of a fuel supplied to the internal combustion engine so that the air-fuel ratio of the air-fuel mixture to be combusted by the internal combustion engine will be equalized to a target air-fuel ratio. In controlling the air-fuel ratio of the internal combustion engine according to the target air-fuel ratio, the air-fuel ratio of the internal combustion engine, more accurately, the air-fuel ratio of the air-fuel mixture from which the exhaust gas entering the catalytic converter is produced by combustion, is detected by an air-fuel ratio sensor disposed upstream of the catalytic converter, and the air-fuel ratio of the internal combustion engine is controlled by a feedback loop so that the detected air-fuel ratio will be equalized to the target air-fuel ratio.

In the above control system, the exhaust system, including the catalytic converter, which ranges from a position upstream of the catalytic converter to a position downstream of the catalytic converter, may be considered to be a plant for generating and emitting an exhaust gas having an oxygen concentration detected by the $O_2$ sensor, from an exhaust gas having an air-fuel ratio detected by the air-fuel ratio sensor. The internal combustion engine may be considered to be an actuator for generating and emitting an exhaust gas having an air-fuel ratio to be supplied to the plant. Thus, the above control system proposed by the inventors may be expressed as a system for determining a target input for the plant (more generally, a manipulated variable which defines an input to the plant) such that an output from the $O_2$ sensor (an oxygen concentration of the exhaust gas) as an output from the plant will be equalized to a given target value, and controlling an output of the internal combustion engine (=an input to the plant) as the actuator according to the target input.

According to the above control system, it is necessary to control the output from the $O_2$ sensor highly accurately at the target value for the purpose of attaining the optimum purifying performance of the catalytic converter. However, the exhaust system including the catalytic converter has a relatively long dead time, i.e., a period of time required until the air-fuel ratio corresponding to the exhaust gas entering the catalytic converter will be reflected in the output from the $O_2$ sensor disposed downstream of the catalytic converter, and the dead time tends to adversely affect the control process of the control system, i.e., tends to reduce the stability and quick response of the convergence of the output from the $O_2$ sensor toward the target value. In view of the above difficulties, an output of the $O_2$ sensor, i.e., a future value of the output of the $O_2$ sensor, after the dead time of the exhaust system is sequentially estimated based on the output from the $O_2$ sensor and the output from the air-fuel ratio sensor. Using the estimated output, the target air-fuel ratio is determined to compensate for the dead time of the exhaust system. Therefore, the target air-fuel ratio is made highly reliable, and the controllability of the output from the $O_2$ sensor at the target value, i.e., the stability and quick response of the control process, is increased.

A further study conducted by the inventors has revealed that for increasing the controllability of the output from the $O_2$ sensor at the target value, it is desirable to compensate for not only the dead time of the exhaust system including the catalytic converter, but also the dead time of the internal combustion engine and an engine controller for controlling the air-fuel ratio of the internal combustion engine based on the target air-fuel ratio. Generally, the internal combustion engine and the engine controller are a system for generating an exhaust gas to enter the catalytic converter from the data of the target air-fuel ratio. The dead time of the internal combustion engine and the engine controller is a period of time required until the data of the target air-fuel ratio will be reflected in the actual air-fuel ratio corresponding to the exhaust gas entering the catalytic converter.

Specifically, the dead time of the internal combustion engine and the engine controller is affected by operating conditions of the internal combustion engine. While this dead time may be short enough not to impair the process of controlling the output from the $O_2$ sensor at the target value, it may also be relatively long depending on operating conditions of the internal combustion engine. If the dead time is relatively long, then the controllability of the output from the $O_2$ sensor at the target value is lowered.

SUMMARY OF THE INVENTION

It is therefore an object of the present invention to provide a plant control system for determining a manipulated variable which determines an input to a plant such that an output of the plant will be equalized to a predetermined target value and controlling operation of an actuator to generate the input to the plant based on the manipulated variable, the plant control system being capable of compensating for not only the dead time of the plant, but also the dead time of a system comprising the actuator and a controller for controlling the operation of the actuator based on the manipulated variable, for increasing the controllability of the output of the plant at the target value to control the output of the plant stably with high accuracy.

Another object of the present invention is to provide a plant control system for controlling a plant which comprises an exhaust system including a catalytic converter for purifying an exhaust gas emitted from an internal combustion engine, which exhaust system ranges from a position upstream of the catalytic converter to a position downstream of the catalytic converter, the plant control system being capable of determining a manipulated variable which determines the air-fuel ratio of the internal combustion engine such that the concentration of a certain component in the exhaust gas downstream of the catalytic converter will be equalized to a predetermined target value, and controlling the air-fuel ratio of the internal combustion engine based on the manipulated variable.

To achieve the above objects, there is provided in accordance with the present invention a plant control system for controlling a plant, comprising an actuator for generating an input to the plant, first detecting means for detecting an output from the plant, manipulated variable determining means for sequentially determining a manipulated variable which determines the input to the plant to equalize the output from said first detecting means to a predetermined target value, actuator control means for controlling operation of said actuator based on the manipulated variable determined by said manipulated variable determining means, and estimating means for sequentially generating data representing an estimated value of the output from said first detecting means after a total dead time which is the sum of a first dead time of said plant and a second dead time of a system which comprises said actuator and said actuator control means, said manipulated variable determining means comprising means for determining said manipulated variable based on the data generated by said estimating means.

The estimating means sequentially generates data representing an estimated value of the output (which represents a detected value of the output of the plant) from said first detecting means after a total dead time which is the sum of the first dead time and the second dead time. Based on the generated data, the manipulated variable determining means determines said manipulated variable which determines the input to the plant (=the output of the actuator). Therefore, the manipulated variable which determines the input to the plant, required to converge the output of the first detecting means toward the target value, can be determined while compensating for not only the first dead time of the plant but also the second dead time of the system which comprises said actuator and said actuator control means. Accordingly, the actuator control means controls operation of the actuator based on the manipulated variable to equalize the input to the plant as generated by the actuator to an input determined by the manipulated variable for thereby controlling the output of the first detecting means at the target value while compensating for the first and second dead times.

Therefore, the controllability of the output of the plant at the target value is increased, and the output of the plant can be controlled at the target value stably with high accuracy.

The data representing the estimated value of the output of the first detecting means may be an estimated value of the output of the first detecting means, or may be an estimated value of the difference between the output value of the first detecting means and a suitable given value (e.g., the above target value).

Specifically, the plant comprises an exhaust system of an internal combustion engine which ranges from a position upstream of a catalytic converter in the exhaust system to a position downstream of the catalytic converter, and said input to said plant comprises an air-fuel ratio of an exhaust gas generated by said internal combustion engine as said actuator and introduced into said catalytic converter, and the output from said plant comprises the concentration of a component of the exhaust gas which has passed through said catalytic converter.

Since the concentration (represented by the output of the first detecting means) of a component of the exhaust gas as the output of the plant is controlled at the target value stably with high accuracy while compensating for the dead time of the exhaust system as the plant and the dead time of the system which comprises the internal combustion engine as the actuator and the actuator control means, the catalytic converter is allowed to maintain its desired purifying performance stably and reliably.

The estimating means comprises means for generating the data representing the estimated value of the output of said first detecting means according to a predetermined algorithm from the output of said first detecting means and a past value of said manipulated variable which has been determined in the past by said manipulated variable determining means.

The predetermined algorithm is constructed on the basis of a model representing said plant with a response delay element and a dead time element of said first dead time, and a model representing said system which comprises said actuator and said actuator control means with a dead time element of said second dead time. Therefore, it is possible to generate appropriately the data representing the estimated value of the output of said first detecting means.

An actuator such as an internal combustion engine generally contains not only a dead time element but also a response delay element. Because the response delay element can be compensated for by the actuator control means, the manipulated variable determining means is not required to take into account a response delay element of a model of the system which comprises the actuator and the actuator control means.

Because the response delay of the actuator can be compensated for by the actuator control means, the input to the plant (the output of the actuator) from time to time is basically determined by the manipulated variable prior to the second dead time of the system which comprises the actuator and the actuator control means. Therefore, if the past value of said manipulated variable which is used to generate the data representing the estimated value of the output of said first detecting means includes at least one past value prior to said second dead time, then when the input to the plant is detected, the past value of said manipulated variable prior to the second dead time can be replaced with a detected value of the input to the plant which is determined by the past value.

The plant control system further comprises second detecting means for detecting the input to the plant, and the past value of said manipulated variable which is required for said estimating means to generate the data representing the estimated value of the output of said first detecting means includes at least one past value prior to said second dead time, said estimating means comprising means for generating the data representing the estimated value of the output of said first detecting means, using an output value, prior to the present time, of said second detecting means instead of all or some of the past value of said manipulated variable prior to said second dead time.

When the data representing the estimated value of the output of said first detecting means is generated using an output value (a detected value of the input to the plant), prior to the present time, of said second detecting means instead of all or some of the past value of said manipulated variable prior to said second dead time, the reliability of the data of the estimated value is increased. Specifically, even if an actual input to the plant (an actual output of the actuator) as represented by the output of the second detecting means suffers an error due to disturbances, etc. with respect to the input to the plant which is determined by the manipulated variable, the data representing the estimated value of the output of the first detecting means can be generated taking into account the disturbances, etc., i.e., depending on the actual operating state of the actuator. Consequently, the reliability of the data of the estimated value of the output of the first detecting means is increased, and the controllability (control stability and response) of the output of the first detecting means at the target value is increased.

Depending on the length of the second dead time, all the past value of the manipulated variable required to generate the data representing the estimated value of the output of the first detecting means may be prior to the second dead time. In such a case, if all the past value is replaced with the output value, prior to the present time, of the second detecting means, then the estimating means generates the data representing the estimated value of the output of the first detecting means according to the predetermined algorithm from the output of said first detecting means and the output of the second detecting means. The present invention covers such an aspect.

Since the output at each point of time of the second detecting means (a detected value of the input of the plant) corresponds to the manipulated variable prior to the second dead time, the output value of said second detecting means used instead of the past value of said manipulated variable comprises an output value of said second detecting means at a time upon elapse said second dead time from the time when the past value of said manipulated variable is determined by said manipulated variable determining means.

If the plant control system may not necessarily need a second detecting means for generating the data representing the estimated value of the output of the first detecting means, then the plant control system has a second detecting means for detecting the input to the plant, and the past value of said manipulated variable which is required for said estimating means to generate the data representing the estimated value of the output of said first detecting means includes at least one past value prior to said second dead time. The estimating means comprises means for generating the data representing the estimated value of the output of said first detecting means, using an output value, prior to the present time, of said second detecting means instead of all or some of the past value of said manipulated variable prior to said second dead time. The manipulated variable determined by said manipulated variable determining means comprises a target input to said plant, said actuator control means comprising means for feedback-controlling operation of said actuator to equalize the output of said second detecting means to the target input to said plant.

The manipulated variable determined by said manipulated variable determining means comprises a target input to said plant, said actuator control means comprising means for feedback-controlling operation of said actuator to equalize the output of said second detecting means to the target input to said plant.

When said manipulated variable determining means comprises a target input to said plant, and said actuator control means feedback-controls operation of said actuator to equalize the output of said second detecting means to the target input to said plant, the input to the plant can be controlled stably at the target input determined to equalize the output of the first detecting means to the predetermined target value.

The manipulated variable determined by the manipulated variable determining means is not limited to the target input to the plant, but may be a corrective quantity for the amount of operation of the actuator. Even if the manipulated variable is the target input to the plant, the amount of operation of the actuator can be controlled in a feed-forward fashion from the target input, i.e., the target output of the actuator, for thereby controlling the output of the actuator at the target input to the plant.

For feedback-controlling operation of the actuator, the actuator control should preferably comprise a recursive-type controller.

The recursive-type controller comprises an adaptive controller or an optimum regulator. When operation of the actuator is controlled by the recursive-type controller to equalize the output of the second detecting means to the target input, the input to the plant can be controlled at the target input with a high follow-up capability regardless of changes in the operating state of the actuator and dynamic changes thereof such as aging-induced characteristic changes. Since the response delay of the actuator can also be compensated adequately, the reliability of the data representing the estimated value of the output of the first detecting means as generated by the estimating means is further increased. As a consequence, the controllability of the output of the first detecting means at the predetermined target value is further increased.

The recursive-type controller serves to determine a new feedback manipulated variable according to a given recursive formula including a predetermined number of time-series data, prior to the present time, of the feedback manipulated variable for operation of the actuator (e.g., a corrective quantity for the amount of operation of the actuator, a corrective quantity for the amount of fuel to be supplied to the internal combustion engine as the actuator, etc.).

The recursive-type controller preferably comprises an adaptive controller.

The estimating means comprises means for setting said second dead time to a preset constant value, and generating the data representing the estimated value of the output of said first detecting means after said total dead time which is the sum of the preset constant value of said second dead time and said first dead time.

The preset constant value of the second dead time is preferably established as a dead time of the system which comprises said actuator and said actuator control means while said actuator is operating in a predetermined state.

If the plant comprises an exhaust system including the catalytic converter and the actuator comprises an internal combustion engine, then said preset constant value of the second dead time is preferably established as a dead time of the system which comprises said actuator and said actuator control means while said internal combustion engine as said actuator is operating in a predetermined low speed range.

The dead time of the system which comprises the actuator and the actuator control means tends to vary depending on the operating state of the actuator. For example, if the actuator comprises an internal combustion engine, then the dead time (second dead time) of the system which comprises the internal combustion engine and the actuator control means which needs control in synchronism with the rotational speed of the internal combustion engine varies depending on the rotational speed of the internal combustion engine, and becomes longer as the rotational speed is higher. For compensating for the dead time independently of the operating state of the actuator such as the rotational speed of the internal combustion engine, it is preferable to compensate for the maximum dead time which the system of the actuator and the actuator control means can take.

If the second dead time is set to a preset constant value, then such a constant value should preferably be established as the dead time of the system comprising the actuator and the actuator control means when the actuator is in a certain operating state, e.g., the operating state in which the dead time which the system of the actuator and the actuator control means can take is maximum. Particularly, if the actuator comprises an internal combustion engine, then the preset value of the second data time should preferably be established as the dead time of the system comprising the internal combustion engine and the actuator control means when the internal combustion engine is operating in a low speed range, e.g., in an idling rotational speed range.

When the preset value of the second data time is thus established and the data representing the estimated value of the output of the first detecting means after the total dead time of the preset value of the second data time and the first dead time, it is possible to compensate for the dead time of the system comprising the actuator and the actuator control means irrespective of the operating state of the actuator, and hence to increase the controllability of the output of the first detecting means at the predetermined target value regardless of the operating state of the actuator. This holds true when the actuator comprises an internal combustion engine.

In addition to set the second dead time to the present constant value, the second dead time may be set to a variable value. Specifically, the estimating means comprises means for establishing said second dead time so as to be variable depending on the operating state of said actuator, and generating the data representing the estimated value of the output of said first detecting means after said total dead time which is the sum of the established second dead time and said first dead time.

Particularly if the actuator comprises an internal combustion engine, then the estimating means comprises means for establishing said second dead time so as to be variable depending on the operating state of said internal combustion engine as said actuator, and generating the data representing the estimated value of the output of said first detecting means after said total dead time which is the sum of the established second dead time and said first dead time. The operating state of said internal combustion engine for establishing said second dead time includes at least a rotational speed of said internal combustion engine, said estimating means comprising means for increasing said second dead time as the rotational speed of said internal combustion engine is lower.

Even with the second dead time being thus established variably depending on the operating state of the actuator, the dead time (second dead time) of the system comprising the actuator and the actuator control means can be compensated for regardless of the operating state of the actuator, and the controllability of the output of the first detecting means at the predetermined target value can be increased regardless of the operating state of the actuator. Particularly if the actuator comprises an internal combustion engine, then the dead time (second dead time) of the system comprising the internal combustion engine and the actuator control means can be compensated for regardless of the rotational speed of the internal combustion engine, and the controllability of the output of the first detecting means at the predetermined target value can be increased regardless of the rotational speed of the internal combustion engine.

If the actuator comprises an internal combustion engine, then the operating state of the internal combustion engine for establishing the second dead time may comprise an intake state of the internal combustion engine, etc. other than the rotational speed of the internal combustion engine.

The estimating means comprises means for setting said first dead time to a preset constant value, and generating the data representing the estimated value of the output of said first detecting means after said total dead time which is the sum of the preset constant value of said first dead time and the preset constant value of said second dead time. With the second dead time being also set to the constant value, it is easy for the estimating means to generate the data representing the estimated value of the output of the first detecting means.

The manipulated variable determining means comprises means for determining said manipulated variable in order to converge the estimated value of the output from said first detecting means as represented by the data generated by said estimating means toward said target value according to a sliding mode control process.

The sliding mode control process is a variable-structure feedback control process, and is less susceptible to disturbances than the PID control process and hence is highly stable. By determining the manipulated variable in order to converge the estimated value of the output from said first detecting means according to the sliding mode control process, the first and second dead times can be compensated for, and the output of the first detecting means can be controlled at the predetermined target value stably with high accuracy.

Preferably, the sliding mode control process should be an adaptive sliding mode control process which is a combination of an ordinary sliding mode control process and a control law referred to as an adaptive law (adaptive algorithm).

If the plant comprises an exhaust system including the catalytic converter, then it is preferable to use an oxygen concentration sensor ($O_2$ sensor) as the first detecting means and use a constant value as a target value therefor in order to maintain desired purifying performance of the catalytic converter.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A plant control system according to an embodiment of the present invention will be described below with reference to FIGS. 1 through 20. According to present embodiment, the plant control system is a system for controlling a plant which comprises an exhaust system of an internal combustion engine that ranges from a position upstream of a catalytic converter, disposed in an exhaust passage of the internal combustion engine, for purifying an exhaust gas emitted from the internal combustion engine to a position downstream of the catalytic converter.

Figure 1:
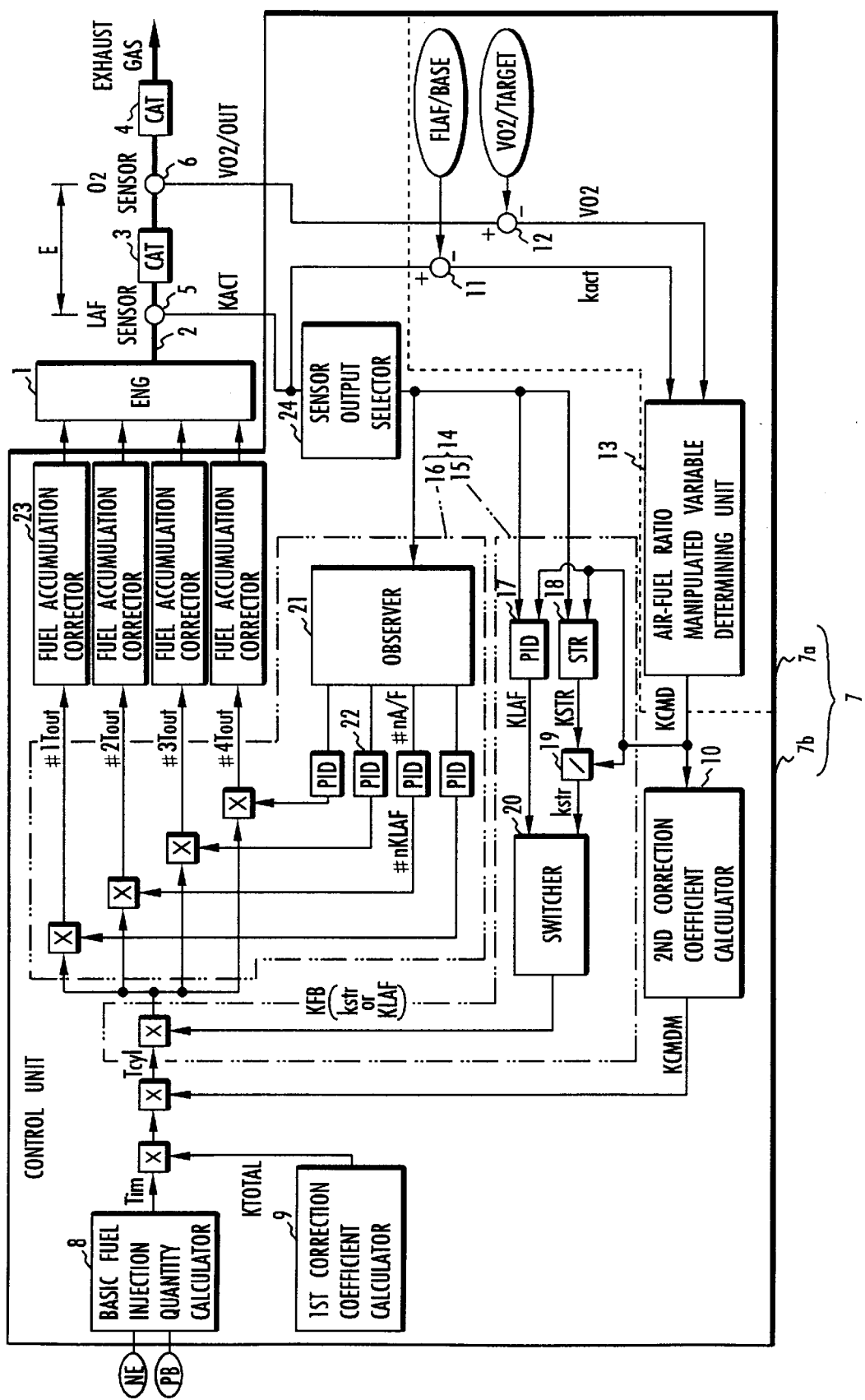
FIG. 1 is a block diagram of an overall arrangement of an air-fuel ratio control system for an internal combustion engine and a plant control system according to an embodiment of the present invention.
Figure 2:
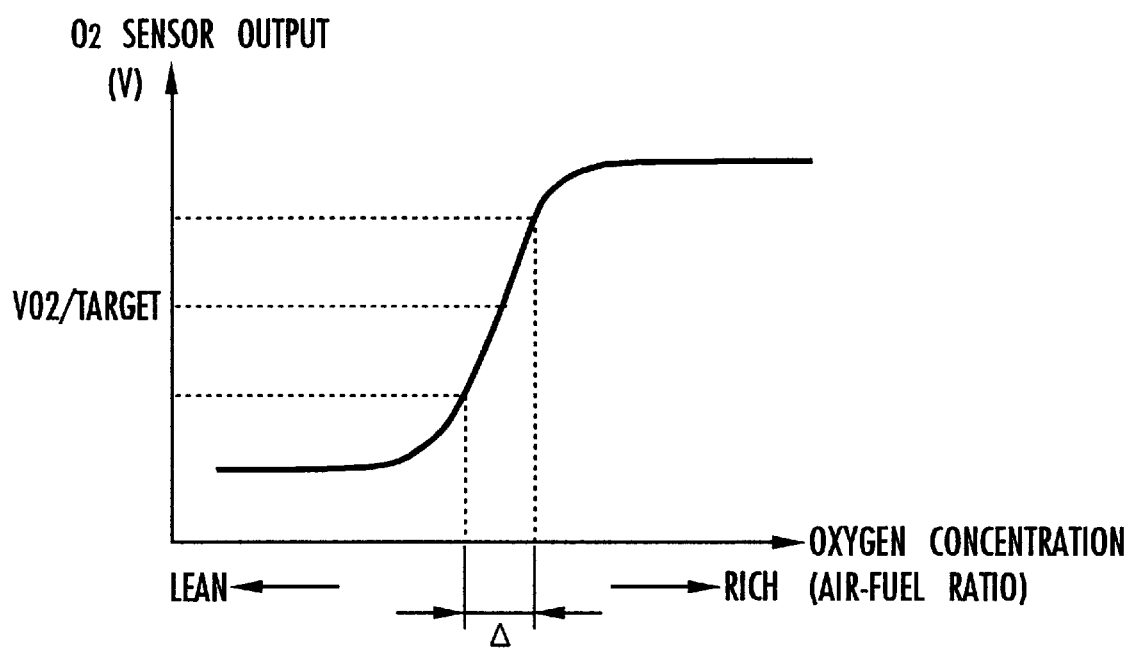
FIG. 2 is a diagram showing output characteristics of an $O_2$ sensor used in the arrangement shown in FIG. 1.

FIG. 1 shows in block form the plant control system according to the embodiment. As shown in FIG. 1, an internal combustion engine 1 such as a four-cylinder internal combustion engine generates an exhaust gas which is generated when a mixture of fuel and air is combusted in each cylinder and emitted from each cylinder into a common discharge pipe 2 positioned near the internal combustion engine 1, from which the exhaust gas is discharged into the atmosphere. Two three-way catalytic converters 3, 4 are mounted in the common exhaust pipe 2 at successively downstream locations thereon.

The downstream catalytic converter 4 may be dispensed with. The internal combustion engine 1 corresponds to an actuator.

The plant control system serves to control an air-fuel ratio of the internal combustion engine 1, i.e., an air-fuel ratio of the mixture of air and fuel to be combusted in the internal combustion engine. The plant control system comprises a wide-range air-fuel ratio sensor 5 mounted as a second detecting means on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted as a first detecting means on the exhaust pipe 2 downstream of the catalytic converter 3 and upstream of the catalytic converter 4, and a control unit 7 for carrying out a control process (described later on) based on detected output signals from the sensors 5, 6. The control unit 7 is supplied with detected output signals from the sensors 5, 6 and also detected output signals from various other sensors for detecting operating conditions of the internal combustion engine 1, including a engine speed sensor, an intake pressure sensor, a coolant temperature sensor, etc.

The wide-range air-fuel ratio sensor 5 is in the form of an $O_2$ sensor, and outputs a signal having a level depending on the air-fuel ratio of the air-fuel mixture combusted by the internal combustion engine 1 (the air-fuel ratio is recognized according to the concentration of oxygen in the exhaust gas generated when the air-fuel mixture is combusted). The output signal from the wide-range air-fuel ratio sensor 5 (hereinafter referred to as an LAF sensor 5) is processed by a detecting circuit such as a linearizer (not shown) into a signal having an output signal KACT having a level which is proportional to the air-fuel ratio of the internal combustion engine in a wide range of air-fuel ratios thereof, i.e., an output signal KACT representative of a detected value of the air-fuel ratio. The LAF sensor 5 is disclosed in detail in Japanese laid-open patent publication No. 4-369471, which corresponds to U.S. Pat. No. 5,391,282, and will not be described below.

The $O_2$ sensor 6 disposed downstream of the catalytic converter 3 generates an output signal VO2/OUT having a level depending on the oxygen concentration of the exhaust gas that has passed through the catalytic converter 3, i.e., an output signal VO2/OUT representing a detected value of the oxygen concentration of the exhaust gas, as with ordinary $O_2$ sensors. The output signal VO2/OUT from the $O_2$ sensor 6 will change with high sensitivity in proportion to the oxygen concentration of the exhaust gas that has passed through the catalytic converter 3, with the air-fuel ratio recognized as the oxygen concentration in the exhaust gas that has passed through the catalytic converter 3 being in a range Δ close to a stoicheometric air-fuel ratio.

The control unit 7 comprises a microcomputer and is basically divided into a control unit 7a (hereinafter referred to as an "exhaust control unit 7a") for effecting a control process to determine sequentially a target air-fuel ratio KCMD for the internal combustion engine 1, and a control unit 7b (hereinafter referred to as an "engine control unit 7b") for controlling the air-fuel ratio of the internal combustion engine 1 based on the target air-fuel ratio KCMD. The exhaust control unit 7a corresponds to a manipulated variable determining means, and the engine control unit 7b to an actuator control means.

The engine control unit 7b has, as its main functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity (fuel supply quantity)

from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by the exhaust control unit 7a, as described later on.

The control unit 7 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 (U.S. Pat. No. 5,253,630), and will not be described below.

The engine control unit 7b also has, in addition to the above functions, a feedback controller 14 for feed-back-controlling the air-fuel ratio of the internal combustion engine 1 by adjusting a fuel injection quantity of the internal combustion engine 1 so as to converge the output signal KACT of the LAF sensor 5 (the detected air-fuel ratio) toward the target air-fuel ratio KCMD which is sequentially determined by the exhaust control unit 7a (described in detail later on).

The feedback controller 14 comprises a general feedback controller 15 for feedback-controlling a total fuel injection quantity for all the cylinders of the internal combustion engine 1 and a local feedback controller 16 for feedback-controlling a fuel injection quantity for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output signal KACT from the LAF sensor 5 toward the target air-fuel ratio KCMD. The general feedback controller 15 comprises a PID controller 17 for determining a feedback manipulated variable KLAF as the feedback correction coefficient KFB depending on the difference between the output signal KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feedback correction coefficient KFB in view of changes in operating conditions of the internal combustion engine 1 or characteristic changes thereof from the output signal KACT from the LAF sensor 5 and the target air-fuel ratio KCMD.

In present embodiment, the feedback manipulated variable KLAF generated by the PID controller 17 is of "1" and can be used directly as the feedback correction coeffi- cient KFB when the output signal KACT (the detected air-fuel ratio) from the LAF sensor 5 is equal to the target air-fuel ratio KCMD. The feedback manipulated variable KSTR generated b y the adaptive controller 18 becomes the target air-fuel ratio KCMD when the output signal KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output signal KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the air-fuel ratio detected by the LAF sensor 5. Based on the modeled system, a real air-fuel ratio #nA/F of each of the cylinders is estimated from the output signal KACT from the LAF sensor 5.

Details of the observer 21 are disclosed in Japanese laid-open patent publication No. 7-83094, which corresponds to U.S. Pat. No. 5,531,208, for example, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the control unit 7. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273, which corresponds to U.S. Pat. No. 5,568,799, for example, and will not be described in detail below.

A sensor output selector 24 shown in FIG. 1 serves to select the output signal KACT from the LAF sensor 5, which is suitable for the estimation of a real air-fuel ratio #nA/F of each cylinder with the observer 21, depending on the operating conditions of the internal combustion engine 1. Details of the sensor output selector 24 are disclosed in detail in Japanese laid-open patent publication No. 7-259588, which corresponds to U.S. Pat. No. 5,540,209, and will not be described in detail below.

The exhaust control unit 7a has a subtractor 11 for determining a difference kact (=KACT−FLAF/BASE) between the output signal KACT from the LAF sensor 5 and a predetermined reference value FLAF/BASE and a subtractor 12 for determining a difference VO2 (=VO2/OUT−VO2/TARGET) between the output signal VO2/OUT from the O₂ sensor 6 and a target value VO2/TARGET therefor. The reference value FLAF/BASE is established as about "1" (constant value) converted as an air-fuel ratio in present embodiment. The target value VO2 TARGET is established as a constant value for achieving optimum exhaust gas purifying performance of the catalytic converter 3 in present embodiment.

The differences kact, VO2 determined respectively by the subtractors 11, 12 are referred to as a differential output kact of the LAF sensor 5 and a differential output VO2 of the O₂ sensor 6, respectively.

The exhaust control unit 7a also has an air-fuel ratio manipulated variable determining unit 13 for sequentially determining a target air-fuel ratio KCMD for the internal combustion engine 1 (a target air-fuel ratio KCMD for the internal combustion engine 1 as detected by the LAF sensor 5) as a manipulated variable for determining the air-fuel ratio of the internal combustion engine 1, using data of the differential outputs kact, VO2 as data representing the output signals from the LAF sensor 5 and the O₂ sensor 6.

The air-fuel ratio manipulated variable determining unit 13 sequentially determines the target air-fuel ratio KCMD so as to adjust the output signal VO2/OUT of the O₂ sensor 6 to the target value VO2/TARGET therefor, i.e., to converge the output signal VO2/OUT of the O₂ sensor 6 toward "0", with an exhaust system (denoted by E in FIG. 1) including the catalytic converter 3, which ranges from the LAF sensor 5 to the O₂ sensor 6 along the exhaust pipe 2, being handled as a plant to be controlled.

More specifically, the air-fuel ratio manipulated variable determining unit 13 sequentially determines the target air-fuel ratio KCMD for the internal combustion engine 1 so as to adjust the output signal VO2/OUT of the O₂ sensor 6 to the target value VO2/TARGET therefor according to a sliding mode control process in view of a dead time (first dead time) present in the exhaust system E to be controlled, a dead time (second dead time) present in a system comprising the internal combustion engine 1 and the engine control unit 7b, and behavioral changes of the exhaust system E.

In order to carry out such a control process, according to present embodiment, the exhaust system E is regarded as a plant for generating the output signal VO2/OUT of the O₂ sensor 6 (the oxygen concentration of the exhaust gas having passed through the catalytic converter 3) from the output signal KACT of the LAF sensor 5 (the detected air-fuel ratio) via a dead time element and a response delay element, and the plant is modeled as a discrete system or, more specifically, a discrete time system. In addition, the system comprising the internal combustion engine 1 and the engine control unit 7b is regarded as a system for generating the output signal KACT of the LAF sensor 5 from the target air-fuel ratio KCMD via a dead time element, and this system is modeled as a discrete system.

For simplifying the processing by the air-fuel ratio manipulated variable determining unit 13, the discrete-system model of the exhaust system E is expressed, using the differential output kact (=KACT−FLAF/BASE) from the LAF sensor 5 and the differential output VO2 (=VO2/OUT−VO2/TARGET) from the O₂ sensor 6, instead of the output signal KACT of the LAF sensor 5 and the output signal VO2/OUT of the O₂ sensor 6, according to the following equation (1):

$$VO2(k+1)=a1 \cdot VO2(k)+a2 \cdot VO2(k-1)+b1 \cdot kact(k-d1) \quad (1)$$

According to the equation (1), the exhaust system E is regarded as a plant for generating the differential output VO2 from the O₂ sensor 6 from the differential output kact from the LAF sensor 5 via a dead time element and a response delay element, and modeled as a discrete system (more specifically, an autoregressive model having a dead time in the differential output kact as an input to the exhaust system E).

In the equation (1), "k" represents the number of a discrete-time control cycle, and "d1" the dead time (first dead time) of the exhaust system E. The dead time of the exhaust system E (the time required until the air-fuel ratio detected by the LAF sensor 5 at each point of time is reflected in the output signal VO2/OUT from the O₂ sensor 6) of the exhaust system E is generally equal to the time of 3–10 control cycles (d1=3–10) if the period (constant in present embodiment) of control cycles of the air-fuel ratio manipulated variable determining unit 13 ranges from 30 to 100 ms. In present embodiment, a preset constant value (d1=7 in present embodiment) which is equal to or slightly longer than the actual dead time of the exhaust system E is used as the dead time d1 in the discrete-system model of the exhaust system E as represented by the equation (1). The first and second terms of the right side of the equation (1) correspond to a response delay element of the exhaust system E, the first term being a primary autoregressive term and the second term being a secondary autoregressive term. In the first and second terms, "a1", "a2" represent respective gain coefficients of the primary autoregressive term and the secondary autoregressive term. The third term of the right side of the equation (1) corresponds to a dead time element of the exhaust system E, and specifically represents the differential output kact of the LAF sensor 5 as an input to the exhaust system E, including the dead time. In the third term, "b1" represents a gain coefficient of the dead time element. The gain coefficients "a1", "a2", "b1" are parameters which define the behavior of the discrete-system model, and are sequentially identified by an identifier which will be described later on.

The discrete-system model of the air-fuel ratio manipulating system (the system comprising the internal combustion engine 1 and the engine control unit 7b) is expressed, using the differential output kact (=KACT−FLAF/BASE) from the LAF sensor 5 instead of the output KACT from the LAF sensor 5 and also using a difference kcmd (=KCMD−FLAF/BASE, which corresponds to a target value for the differential output kact of the LAF sensor 5, and will be referred to as a "target differential air-fuel ratio kcmd") between the target air-fuel ratio KCMD and the reference value FLAF/BASE instead of the target air-fuel ratio KCMD, according to the following equation (2):

$$kact(k)=kcmd\ (k-d2) \qquad (2)$$

The equation (2) expresses the air-fuel ratio manipulating system as a discrete-system model, regarding the air-fuel ratio manipulating system as a system for generating the differential output kact from the LAF sensor 5 from the target differential air-fuel ratio kcmd via a dead time element, i.e., a system in which the differential output kact in each control cycle is equal to the target differential air-fuel ratio kcmd prior to the dead time.

Figure 4:
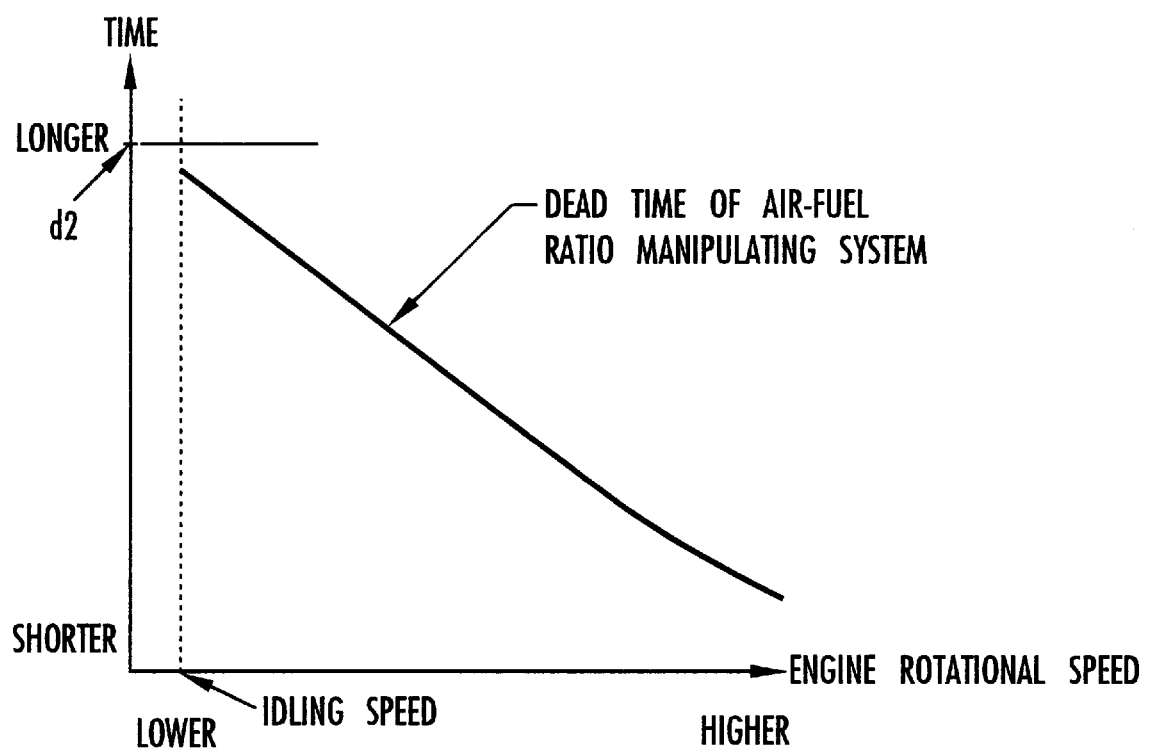
FIG. 4 is a diagram illustrative of the dead time of an engine system of the arrangement shown in FIG. 1.

In the equation (2), "d2" represents the dead time (second dead time) of the air-fuel ratio manipulating system in terms of the number of control cycles of the air-fuel ratio manipulated variable determining unit 13. The dead time of the air-fuel ratio manipulating system (the time required until the target air-fuel ratio KCMD at each point of time is reflected in the output signal KACT of the LAF sensor 5) varies with the rotational speed NE of the internal combustion engine 1 as shown in FIG. 4, and is longer as the rotational speed NE of the internal combustion engine 1 is lower. In present embodiment, in view of the above characteristics of the dead time of the air-fuel ratio manipulated variable determining unit 13, a preset constant value (d2=3 in present embodiment) which is equal to or slightly longer than the actual dead time of the air-fuel ratio manipulating system at an idling rotational speed of the internal combustion engine 1, which is a rotational speed in a low speed range of the internal combustion engine 1 (the actual dead time is a maximum dead time which can be taken by the air-fuel ratio manipulating system at an arbitrary rotational speed of the internal combustion engine 1).

The air-fuel ratio manipulating system actually includes a dead time element and a response delay element of the internal combustion engine 1. Since a response delay of the output KACT of the LAF sensor 5 with respect to the target air-fuel ratio KCMD is basically compensated for by the feedback controller 14 (particularly the adaptive controller 18), there will arise no problem if a response delay element of the internal combustion engine 1 is not taken into account in the air-fuel ratio manipulating system as viewed from the air-fuel ratio manipulated variable determining unit 13.

The air-fuel ratio manipulated variable determining unit 13 in present embodiment carries out the control process for determining the target air-fuel ratio KCMD in predetermined (constant) control cycles based on the discrete-system model expressed by the equations (1), (2). The air-fuel ratio manipulated variable determining unit 13 has its functions as shown in FIG. 3.

Figure 3:
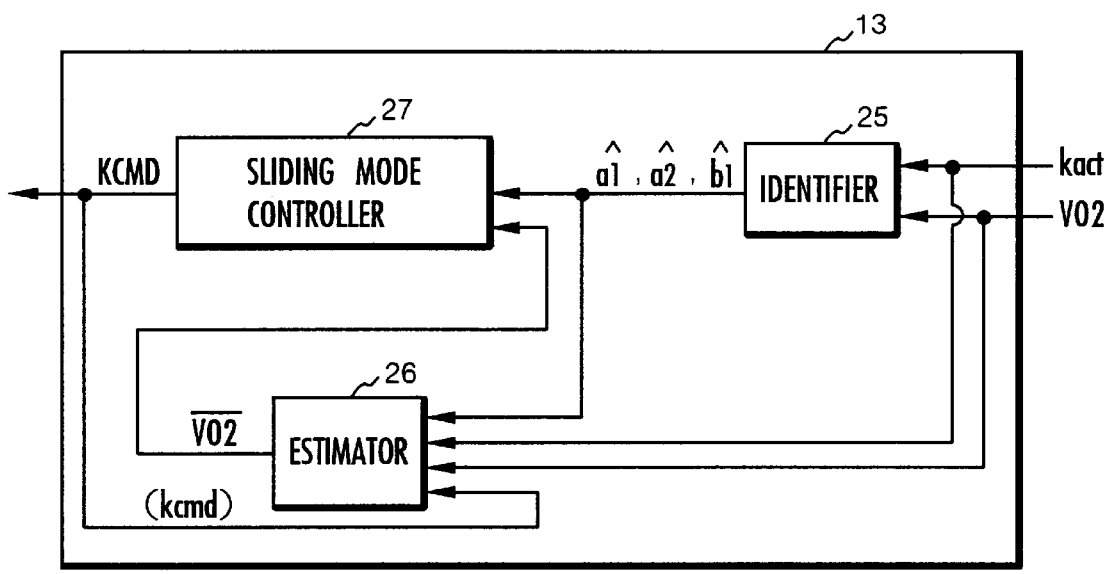
FIG. 3 is a block diagram showing a basic arrangement of an air-fuel ratio manipulated variable determining unit of the arrangement shown in FIG. 1.

As shown in FIG. 3, the fuel ratio manipulated variable determining unit 13 comprises an identifier 25 for sequentially identifying in each control cycle values of the gain coefficients a1, a2, b1 that are parameters to be established for the discrete-system model of the exhaust system E, from the data of the differential output kact from the LAF sensor 5 and the differential output VO2 from the O$_2$ sensor 6, an estimator 26 (estimating means) for sequentially estimating in each control cycle an estimated value VO2 bar of the differential output VO2 from the O$_2$ sensor 6 (hereinafter referred to as an estimated differential output VO2 bar) after the total dead time d (=d1+d2) which is the sum of the dead time d1 of the exhaust system E and the dead time d2 of the air-fuel ratio manipulating system, using identified values a1 hat, a2 hat, b1 hat of the gain coefficients a1, a2, b1 that are identified by the identifier 25 (hereinafter referred to as identified gain coefficients a1 hat, a2 hat, b1 hat), from the data of the differential output kact from the LAF sensor 5, the data of the differential output VO2 from the O$_2$ sensor 6, and the data of the target air-fuel ratio KCMD (more accurately the target differential air-fuel ratio kcmd) determined in the past by a sliding mode controller 27 (described below), and a sliding mode controller 27 for sequentially determining in each control cycle a target air-fuel ratio KCMD, using the identified gain coefficients a1 hat, a2 hat, b1 hat, from the estimated differential output VO2 bar from the O$_2$ sensor 6 which has been determined by the estimator 26, according to an adaptive slide mode control process.

The algorithm of a processing operation to be carried out by the identifier 25, the estimator 26, and the sliding mode controller 27 is constructed on the basis of the discrete-system model as follows:

With respect to the identifier 25, actual gain coefficients of the exhaust system E which correspond to the gain coefficients a1, a2, b1 of the discrete-system model generally vary depending on behavioral conditions and time-dependent characteristic changes of the exhaust system E. Therefore, in order to minimize a modeling error of the discrete-system model (the equation (1)) with respect to the actual exhaust system E for increasing the accuracy of the discrete-system model, it is preferable to identify the gain coefficients a1, a2, b1 of the discrete-system model on a real-time basis depending on the behavioral conditions and time-dependent characteristic changes of the actual exhaust system E.

The identifier 25 serves to identify the gain coefficients a1, a2, b1 sequentially on a real-time basis for the purpose of minimizing a modeling error of the discrete-system model. The identifier 25 carries out its identifying process as follows:

In each control cycle, the identifier 25 determines an identified value VO2 hat of the present differential output VO2 from the O$_2$ sensor 6 (hereinafter referred to as an identified differential output VO2 hat) on the presently established discrete-system model, using the identified gain coefficients a1 hat, a2 hat, b1 hat of the presently established discrete-system model, i.e., identified gain coefficients a1 hat (k−i), a2 hat (k−1), b1 hat (k−1) determined in a preceding control cycle, and past data of the differential output kact from the LAF sensor 5 and the differential output VO2 from the O$_2$ sensor 6, according to the following equation (3):

$$V\hat{O}2(k)=a\hat{1}(k-1)\cdot VO2(k-1)+a\hat{2}(k-1)\cdot VO2(k-2)+b\hat{1}(k-1)\cdot kact(k-d1-1) \qquad (3)$$

The equation (3) corresponds to the equation (1) which is shifted into the past by one control cycle with the gain coefficients a1, b2, b1 being replaced with the respective gain coefficients a1 hat (k−i), a2 hat (k−1), b1 hat (k−i). "d1" of the exhaust system E in the third term of the equation (3) represents a preset value (d1=7) as described above.

If vectors Θ, ξ defined by the following equations (4), (5) are introduced (the letter T in the equations (4), (5) and other equations represents a transposition), then the equation (3) is expressed by the equation (6)

$$\Theta^T(k) = [\hat{a}1(k) \hat{a}2(k) \hat{b}2(k)] \quad (4)$$

$$\xi^T(k) = [VO2(k-1) VO2(k-2) kact(k-d1-1)] \quad (5)$$

$$V\hat{O}2(k) = \Theta^T(k-1) \cdot \xi(k) \quad (6)$$

The identifier 25 also determines a difference id/e between the identified differential output VO2 hat from the $O_2$ sensor 6 which is determined by the equation (3) or (6) and the present differential output VO2 from the $O_2$ sensor 6, as representing a modeling error of the discrete-system model with respect to the actual exhaust system E (hereinafter the difference id/e will be referred to as an identified error id/e), according to the following equation (7):

$$id/e(k) = VO2(k) - V\hat{O}2(k) \quad (7)$$

The identifier 25 further determines new identified gain coefficients a1(k) hat, a2 (k) hat, b1(k) hat, stated otherwise, a new vector Θ (k) having these identified gain coefficients as elements (hereinafter the new vector Θ(k) will be referred to as an identified gain coefficient vector Θ), in order to minimize the identified error id/e, according to the equation (8) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2 (k) hat, b1(k) hat.

$$\Theta(k) = \Theta(k-1) + K\theta(k) \cdot id/e(k) \quad (8)$$

where Kθ represents a cubic vector determined by the following equation (9), i.e., a gain coefficient vector for determining a change depending on the identified error id/e of the identified gain coefficients a1 hat, a2 hat, b1 hat):

$$K\theta(k) = \frac{P(k-1)\xi(k)}{1 + \xi^T(k)P(k-1)\xi(k)} \quad (9)$$

where P represents a cubic square matrix determined by a recursive formula expressed by the following equation (10):

$$P(k) = \frac{1}{\lambda_1(k)} \left[ I - \frac{\lambda_2(k) P(k-1) \xi(k) \xi^T(k)}{\lambda_1(k) + \lambda_2(k) \xi^T(k) P(k-1) \xi(k)} \right] P(k-1) \quad (10)$$

where I represents a unit matrix.

In the equation (10), $\lambda_1$, $\lambda_2$ are established to satisfy the conditions $0 < \lambda_1 \leq 1$ and $0 \leq \lambda_2 2 1 2$, and an initial value P(0) of P represents a diagonal matrix whose diagonal components are positive numbers.

Depending on how $\lambda_1$, $\lambda_2$ in the equation (10) established, any one of various specific algorithms including a fixed gain method, a degressive gain method, a method of weighted least squares, a method of least squares, a fixed tracing method, etc. may be employed. According to present embodiment, a method of least squares ($\lambda_1=\lambda_2=1$), for example, is employed.

Basically, the identifier 25 sequentially determines in each control cycle the identified gain coefficients a1 hat, a2 hat, b1 hat of the discrete-system model in order to minimize the identified error idle according to the above algorithm (calculating operation). Through this operation, it is possible to sequentially obtain the identified gain coefficients a1 hat, a2 hat, b1 hat which match the actual exhaust system E.

The calculating operation is the basic processing that is carried out by the identifier 25. In present embodiment, the identifier 25 performs additional processes such as a limiting process, on the identified gain coefficients a1 hat, a2 hat, b1 hat in order to determine them. Such operations of the identifier 25 will be described later on.

The estimator 26 sequentially determines in each control cycle the estimated differential output VO2 bar which is an estimated value of the differential output VO2 from the $O_2$ sensor 6 after the total dead time d (=d1+d2) in order to compensate for the effect of the dead time d1 of the exhaust system E and the effect of the dead time d2 of the air-fuel ratio manipulating system for the determination of the target air-fuel ratio KCMD with the sliding mode controller 27 as described in detail later on. The estimator 26 determines the estimated differential output VO2 as follows:

If the equation (2) expressing the model of the air-fuel ratio manipulating system is applied to the equation (1) expressing the discrete-system model of the exhaust system E, t hen the equation (1) can be rewritten as the following equation (11):

$$VO2(k+2) = a1 \cdot VO2(k) + a2 \cdot VO2(k-1) + b1 \cdot kcmd(k-d1-d2) = a1 \cdot VO2(k) + a2 \cdot VO2(k-1) + b1 \cdot kcmd(k-d) \quad (11)$$

The equation (11) expresses a system which is a combination of the exhaust system E and the air-fuel manipulating system as a discrete-system model, regarding such a system as a system for generating the output signal VO2/OUT from the $O_2$ sensor 6 from the target differential air-fuel ratio kcmd via dead time elements of the exhaust system E and the air-fuel manipulating system and a response delay element of the exhaust system E.

If a vector X defined by the following equation (12) is introduced into the discrete-system model expressed by the equation (11), then the equation (11) may be rewritten as the equation (13):

$$X(k) = \begin{bmatrix} VO2(k) \\ VO2(k-1) \end{bmatrix} \quad (12)$$

$$X(k+1) = \begin{bmatrix} a1 & a2 \\ 1 & 0 \end{bmatrix} X(k) + \begin{bmatrix} b1 \\ 0 \end{bmatrix} \cdot kcmd(k-d) \quad (13)$$
$$= A \cdot X(k) + B \cdot kcmd(k-d)$$

$$\left( A = \begin{bmatrix} a1 & a2 \\ 1 & 0 \end{bmatrix}, B = \begin{bmatrix} b1 \\ 0 \end{bmatrix} \right)$$

When the recursive formula according to the equation (13) is repeatedly used, a vector X(k+d) after the total dead time d is expressed by the following equation (14), using the matrix A and the vector B which are defined in the equation (13) and time-series data kcmd(k−j) (j=1, 2, . . . , d) of the target differential air-fuel ratio kcmd:

$$X(k+d) = \begin{bmatrix} VO2(k+d) \\ VO2(k+d-1) \end{bmatrix} = A^d \cdot X(k) + \sum_{j=1}^{d} A^{j-1} \cdot B \cdot kcmd(k-j) \quad (14)$$

Since the first-row element of the left side of the equation (14) represents the differential output VO2(K+d) from the $O_2$ sensor 6 after the dead time d, its estimated value (estimated differential output) VO2 (k+d) bar can be determined by calculating the first-row element of the right side of the equation (14).

Attention is paid to the first-row element of each of both sides of the equation (14), and it is assumed that $\alpha 1$, $\alpha 2$ are substituted for the first-row, first-column element and the first-row, second-column element of the matrix $A^d$ of the first term of the right side, and $\beta j$ (j=1, 2, . . . , d) is substituted for the first-row elements of the vector $A^{j-1} \cdot B$ (j=1, 2, . . . , d) of the second term of the right side. At this time, the estimated differential output VO2 bar for the $O_2$ sensor 6 can be determined using time-series data VO2 (k), VO2 (k−1) of the differential output VO2 from the $O_2$ sensor 6 and past time-series data kcmd(k−j) (j=1, 2, . . . , d) of the target differential air-fuel ratio kcmd which corresponds to the target air-fuel ratio (to be determined as described in detail later on) determined by the sliding mode controller 27, according to the following equation (14):

$$\overline{VO2}(k+d) = \alpha 1 \cdot VO2(k) + \alpha 2 \cdot VO2(k-1) + \sum_{j=1}^{d} \beta_j \cdot kcmd(k-j) \quad (15)$$

The coefficients $\alpha 1$, $\alpha 2$, $\beta j$ (j=1, 2, . . . , d) in the equation (15) can be determined by using the identified gain coefficients a1 hat, a2 hat, b1 hat determined by the identifier 25 as the gain coefficients a1, a2, b1 which serve as elements of the matrix A and the vector B (see the equation ((13)) and determining the matrix $A^d$ and the vector $A^{j-1} \cdot B$ (j=1, 2, . . . , d) in the equation (14) from the matrix A and the vector B.

The value of the total dead time d required for the calculation of the equation (15) may be the sum (d1+d2) of the preset value of the dead time d1 of the exhaust system E and the preset value of the dead time d2 of the air-fuel ratio manipulating system.

The above process represents a basic algorithm for the estimator 26 to determine the estimated differential output VO2 bar from the $O_2$ sensor 6 after the total dead time d.

Of the past time-series data kcmd(k−j) (j=1, 2, . . . , d) of the target differential air-fuel ratio kcmd in the equation (15) which is a basic equation to determine the estimated differential output VO2 (k+d) bar, the past a time-series data kcmd(k−d2), kcmd(k−d2−1), . . . , kcmd(k−d) of the target differential air-fuel ratio kcmd before the dead time d2 of the air-fuel ratio manipulating system can be replaced with data kact(k), kact(k−1), . . . , kact(k−d+2), respectively, prior to the present time, of the LAF sensor 5. While the target differential air-fuel ratio kcmd used in the equation (15) corresponds to a calculated air-fuel ratio, the differential output kact of the LAF sensor 5 corresponds to an actual air-fuel ratio of the internal combustion engine 1 which is generated by the air-fuel ratio manipulating system that comprises the internal combustion engine 1 and the engine control unit 7b. Therefore, for determining the estimated differential output VO2 bar of the $O_2$ sensor 6 depending on the actual behaviors of the internal combustion engine 1, etc. to increase the reliability of the estimated differential output VO2 bar, it is considered to be preferable to determine the estimated differential output VO2 bar using the differential output kact of the LAF sensor 5, rather than the target differential air-fuel ratio kcmd.

In present embodiment, the estimator 26 determines in each control cycle the estimated differential output VO2 bar of the $O_2$ sensor 6 after the dead time d according to the following equation (16) which is similar to the equation (15) except that of the past time-series data kcmd(k−j) (j=1, 2, . . . , d) of the target differential air-fuel ratio kcmd, all the past time-series data kcmd(k−b2), kcmd(k−d2−1), . . . , kcmd(k−d) of the target differential air-fuel ratio kcmd before the dead time d2 of the air-fuel ratio manipulating system are replaced with data kact(k), kact(k−1), . . . , kact(k−d+2), respectively, prior to the present time, of the LAF sensor 5.

$$\overline{VO2}(k+d) = \alpha 1 \cdot VO2(k) + \alpha 2 \cdot VO2(k-1) + \quad (16)$$
$$\sum_{j=1}^{d_2-1} \beta_j \cdot kcmd(k-j) + \sum_{j=0}^{d-d_2} \beta_{j+d2} \cdot kact(k-j)$$
$$= \alpha 1 \cdot VO2(k) + \alpha 2 \cdot VO2(k-1) +$$
$$\sum_{j=1}^{d_2-1} \beta_j \cdot kcmd(k-j) + \sum_{j=0}^{d_1} \beta_{j+d2} \cdot kact(k-j)$$

Stated otherwise, the estimator 26 determines the estimated differential output VO2 bar of the $O_2$ sensor 6 according to the equation (16), using the time-series data VO2(k), VO2(k−1) of the differential output VO2 of the $O_2$ sensor 6, the past data kcmd(k−j) (j=1, . . . , d21) of the target differential air-fuel ratio kcmd which represents the past target air-fuel ratio KCMD determined by the sliding mode controller 27, and the time-series data kact(k−j) (j=0, . . . , d1) of the differential output kact of the LAF sensor 5.

In present embodiment, the values of the dead times d1, d2 used in the equation (16) comprise the preset values as described above.

Specifically, the dead times d1, d2 are set to d1=7, d2=3. In this case, the estimated differential output VO2 bar of the $O_2$ sensor 6 can be determined according to the following equation (17):

$$\overline{VO2}(k+d) = \alpha 1 \cdot VO2(k) + \alpha 2 \cdot VO2(k-1) + \quad (17)$$
$$\beta_1 \cdot kcmd(k-1) +$$
$$\beta_2 \cdot kcmd(k-2) +$$
$$\beta_3 \cdot kact(k) + \cdots + \beta_{10} \cdot kact(k-7)$$

The above process is a calculating process (estimating algorithm) for the estimator 26 to determine the estimated differential output VO2 bar of the $O_2$ sensor 6.

The dead time d2 of the air-fuel ratio manipulating system may be set to d2=1 depending on the period of control cycles of the air-fuel ratio manipulated variable determining unit 13 or the rotational speed of the internal combustion engine 1 whose air-fuel ratio is to be controlled. In this case, all the past time-series data kcmd(k−j) (j=1, 2, . . . , d) of the target differential air-fuel ratio kcmd in the equation (15) may be replaced with the data kact(k), kact(k−1), . . . , kact(k−d+2), prior to the present time, of the LAF sensor 5. Therefore, the equation (15) may be rewritten into the following equation (18) which includes no data of the target differential air-fuel ratio kcmd:

$$\overline{VO2}(k+d) = \alpha 1 \cdot VO2(k) + \alpha 2 \cdot VO2(k-1) + \sum_{j=0}^{d-1} \beta_{j+1} \cdot kact(k-j) \quad (18)$$

Therefore, if the dead time d2 of the air-fuel ratio manipulating system is about the same as the period of control cycles of the air-fuel ratio manipulated variable determining unit 13, then the estimated differential output VO2 bar can be determined according to the equation (18), using the time-series data VO2(k), VO2(k−1) of the differential output VO2 from the $O_2$ sensor 6 and the time-series data kact(k−j) (j=1, . . . , d1) of the differential output kact of the LAF sensor 5.

By applying the equation (2), all the time-series data kcmd(k−j) (j=1, 2, . . . , d) in the equation (15) can formally be replaced with respective differential outputs kact(k−j+d2) (j=1, 2, . . . , d) of the LAF sensor 5. Even when the time-series data kcmd(k−j) are thus replaced, if the dead time d2 of the air-fuel ratio manipulating system is d2>1, then a future value, e.g., kact(k+1), of the differential output kact of the LAF sensor 5 is required, making it substantially impossible to determine the estimated differential output VO2 bar. That is, if d2>1, then at least one data of the target differential air-fuel ratio kcmd is necessary.

The sliding mode controller 27 will be described in detail below.

A general sliding mode control process will first briefly be described below with reference to FIG. 5.

The sliding mode control process is a feedback control process of variable structure. According to the sliding mode control process, if there are two state quantities $x_1$, $x_2$ of an object to be controlled, then a hyperplane expressed by σ=0 is designed beforehand using a linear function σ=$s_1 x_1 + s_2 x_2$ ($s_1$, $s_2$ are coefficients) with the state quantities $x_1$, $x_2$ used as variables therein. The hyperplane σ=0 is often called a switching line if a phase plane is of the second degree (there are two state quantities), and the linear function a is called a switching function. If the degree of the phase plane is larger, then the switching line changes to a switching plane and then to a hyperplane which cannot geometrically be illustrated. The hyperplane may also be called a slip plane.

When the state quantities $x_1$, $x_2$ are such that the state quantities $x_1$, $x_2$ are θ≠0 as indicated by a point P in FIG. 4, the state quantities $x_1$, $x_2$ are caused to converge at a high speed onto the hyperplane σ=0 under high gain control according to the so-called reaching control law (mode 1), and then to converge toward a balanced point (a point where $x_1 = x_2 = 0$) on the hyperplane σ=0 while converging onto the hyperplane σ=0 according to the so-called equivalent control input (mode 2).

In the sliding mode control process, the state quantities $x_1$, $x_2$ can converge highly stably toward the balanced point on the hyperplane σ=0 according to the equivalent control input without being affected by a disturbance, etc. simply when the state quantities $x_1$, $x_2$ are converged onto the hyperplane σ=0. If there is a disturbance or a modeling error of the object to be controlled, then the state quantities $x_1$, $x_2$ do not converge strictly toward the balanced point (the point where $x_1 = x_2 = 0$), but toward a point near the balanced point.

In the sliding mode control process, in converging the state quantities $x_1$, $x_2$ onto the hyperplane σ=0 in the mode 1, if there is a disturbance, etc., it is often difficult to converge the state quantities $x_1$, $x_2$ onto the hyperplane H according to only the reaching control law. In view of this, there has in recent years been proposed an adaptive sliding mode control process which employs an adaptive control law (adaptive algorithm) for converging state quantities onto a hyperplane while eliminating the effect of a disturbance, in addition to the reaching control law, as disclosed in, for example, "Sliding mode control—design theory of nonlinear robust control—", pages 134–135, published Oct. 20, 1994 by Corona Co., Ltd.

The sliding mode controller 27 uses such an adaptive sliding mode control process to determine an input (which will hereinafter referred to as an SLD manipulating input usl) to be applied to the exhaust system E (specifically, a target value for the difference between the output KACT of the LAF sensor 5 (the detected air-fuel ratio) and the reference value FLAF/BASE, which is equal to the target differential air-fuel ratio kcmd) in order to adjust the output signal VO2/OUT from the $O_2$ sensor 6 to its target value VO2/TARGET, and determine the target air-fuel ratio KCMD from the determined SLD manipulating input usl. An algorithm for such an operation of the sliding mode controller 27 is arranged as follows:

First, the construction of a hyperplane required for the adaptive sliding mode control process of the sliding mode controller 27 will be described below.

According to a basic concept of the sliding mode control process in present embodiment, the differential output VO2 (k) from the $O_2$ sensor 6 in each control cycle and the differential output VO2 (k−1) in each preceding control cycle are used, and the linear function a which defines a hyperplane for the sliding mode control process is established according to the following equation (19). The vector X defined according to the equations (12), (19) as a vector having the differential outputs VO2(k), VO2(k−1) as its components will hereinafter be referred to as a state quantity X.

$$\sigma(k) = s1 \cdot VO2(k) + s2 \cdot VO2(k-1) \quad (19)$$
$$= S \cdot X$$
$$\left( S = [s1 \ s2], X = \begin{bmatrix} VO2(k) \\ VO2(k-1) \end{bmatrix} \right)$$

Figure 5:
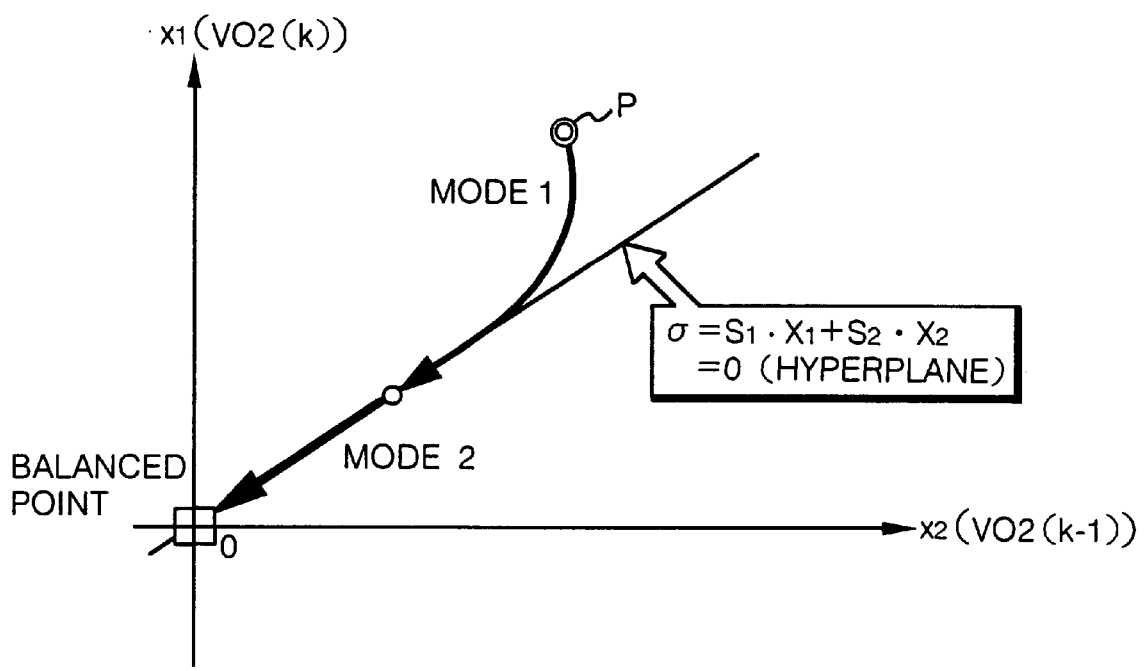
FIG. 5 is a diagram illustrative of a sliding mode control process employed by the arrangement shown in FIG. 1.

With the linear function σ defined as described above, the hyperplane for the sliding mode control process is expressed by σ=0 (since there are two state quantities, the hyperplane is a straight line as shown in FIG. 5). the balanced point on the hyperplane σ=0 is a point where VO2(k)=VO2(k−1)=0, i.e., a point where time-series data VO2/OUT(k), VO2/OUT (k−1) of the output VO2/OUT of the $O_2$ sensor 6 are equal to the target value VO2/TARGET.

The coefficients s1, s2 of the linear function σ are established to meet the condition of the following equation (20):

$$-1 < \frac{s2}{s1} < 1 \quad (20)$$
(when $s1 = 1, -1 < s2 < 1$)

The condition of the equation (20) is a condition for stably converging the differential output VO2 of the $O_2$ sensor 6 to "0", i.e., for converting the state quantity X on the hyperplane σ=0 toward the balanced point on the hyperplane σ=0. In present embodiment, for the sake of brevity, the coefficient s1 is set to s1=1 (s2/s1=s2), and the coefficient s2 is established to satisfy the condition: −1<s2 <1.

The time-series data of the estimated differential output VO2 bar determined by the estimator 26 is actually used as the state quantity which is a variable of the linear function, as described later on.

The SLD manipulating input usl (=the target differential air-fuel ratio kcmd)) to be generated by the sliding mode controller 27 according to the sliding mode control process for converging the state quantity X toward the balanced point on the hyperplane σ=0 is expressed as the sum of an equivalent control input ueq to be applied to the exhaust system E according to the control law for converging the state quantity X onto the hyperplane σ=0, an input urch (hereinafter referred to as a reaching control law input urch)

to be applied to the exhaust system E according to the reaching control law for converging the state quantity X onto the hyperplane σ=0, and an input uadp (hereinafter referred to as an adaptive control law uadp) to be applied to the exhaust system E according to the adaptive control law for converging the state quantity X onto the hyperplane σ=0 while compensating for the effect of a disturbance, etc. (see the following equation (21)).

$$Usl = Ueq + Urch + Uadp \quad (21)$$

The equivalent control input ueq, the reaching control law input urch, and the adaptive control law uadp are determined on the basis of the discrete-system model expressed by the equation (11) (a model where the differential output kact(k−d1) of the LAF sensor 5 in the equation (1) is replaced with the target differential air-fuel ratio kcmd(k−d) using the total dead time d), as follows:

With respect to the equivalent control input ueq, the condition to be met for the state quantity X to stay on the hyperplane σ=0 is represented by σ(k+1)=σ(k)=0, and this condition is rewritten into the following equation (22) using the equations (11), (19):

$$\sigma(k+1) = S \cdot A \cdot X(k) + S \cdot B \cdot kcmd(k-d) = S \cdot X(k) = \sigma(k) \therefore S \cdot (A-1) \cdot X(k) + S \cdot B \cdot kcmd(k-d) = 0 \quad (22)$$

Since the equivalent control input ueq is an input to be applied to the exhaust system E for converging the state quantity X onto the hyperplane σ, the equivalent control input ueq is equal to the target differential air-fuel ratio kcmd which satisfies the condition expressed by the equation (22).

From the equation (22), the equivalent control input ueq is given by the following equation (23):

$$Ueq(k) = -(S \cdot B)^{-1} \cdot \{S \cdot (A-1)\} \cdot X(k+d) \quad (23)$$

$$= \frac{-1}{s1b1} \cdot \{[s1 \cdot (a1-1) + s2] \cdot VO2(k+d) + (s1 \cdot a2 - s2) \cdot VO2(k+d-1)\}$$

The equation (23) is a basic formula for determining the equivalent control input ueq in each control cycle.

According to present embodiment, the reaching control law input urch is basically determined according to the following equation (24):

$$Urch(k) = -(S \cdot B)^{-1} \cdot F \cdot \sigma(k+d) \quad (24)$$

$$= \frac{-1}{s1b1} \cdot F \cdot \sigma(k+d)$$

Specifically, the reaching control law input urch is determined in proportion to the value σ(k+d) of the linear function σ after the total dead time d, in view of the effect of the total dead time d.

The coefficient F which determines the reaching control law input urch is established to satisfy the condition expressed by the following equation (25):

$$0 < F < 2 \quad (25)$$

The condition expressed by the equation (25) is a condition for converging the value σ(k) of the linear function σ in the absence of any disturbance.

The value of the linear function σ may possibly vary in an oscillating fashion (so-called chattering) with respect to the hyperplane σ=0. In order to suppress such chattering, it is preferable that the coefficient F relative to the reaching control law input urch be established to further satisfy the condition of the following equation (26):

$$0 < F < 1 \quad (26)$$

The adaptive control law input uadp is basically determined according to the following equation (27) (ΔT in the equation (27) represents the period of the control cycles of the air-fuel ratio manipulated variable determining unit 13):

$$Uadp(k) = -(S \cdot B)^{-1} \cdot G \cdot \sum_{i=0}^{k+d} (\sigma(i) \cdot \Delta T) \quad (27)$$

$$= \frac{-1}{s1b1} \cdot G \cdot \sum_{i=0}^{k+d} (\sigma(i) \cdot \Delta T)$$

Therefore, the adaptive control law input uadp is determined in proportion to an integrated value (which corresponds to an integral of the values of the linear function σ) over control cycles of values of the linear function σ until after the total dead time d, in view of the effect of the total dead time d.

The coefficient G (which determines a gain of the adaptive control law) in the equation (27) is established to satisfy the condition of the following equation (28):

$$G = J \cdot \frac{2-F}{\Delta T} \quad (28)$$

$$(0 < J < 2)$$

The condition of the equation (28) is a condition for stably converging the value σ(k) of the linear function σ onto the hyperplane σ=0.

A specific process of deriving conditions for establishing the equations (20), (25), (26), (28) is described in detail in Japanese patent application No. 9-251142 which corresponds to U.S. patent application Ser. No. 09/153032, and will not be described in detail below.

In present embodiment, the sliding mode controller 27 determines the sum (ueq+urch+uadp) of the equivalent control input ueq, the reaching control law input urch, and the adaptive control law uadp determined according to the respective equations (23), (24), (27) as the SLD manipulating input usl to be applied to the exhaust system E. However, the differential outputs VO2(K+d), VO2(k+d−1) of the $O_2$ sensor 6 and the value σ (k+d) of the linear function σ, etc. used in the equations (23), (24), (27) cannot directly be obtained as they are values in the future.

According to present embodiment, therefore, the sliding mode controller 27 actually uses the estimated differential outputs VO2(k+d) bar, VO2(k+d−1) bar determined by the estimator 26, instead of the differential outputs VO2(K+d), VO2(k+d−1) from the O2 sensor 6 for determining the equivalent control input ueq according to the equation (23), and calculates the equivalent control input ueq in each control cycle according to the following equation (29):

$$Ueq(k) = \frac{-1}{s1b1}\{[s1 \cdot (a1-1) + s2] \cdot \overline{VO2}(k+d) + (s1 \cdot a2 - s2) \cdot \overline{VO2}(k+d-1)\} \quad (29)$$

According to present embodiment, furthermore, the sliding mode controller 27 actually uses time-series data of the estimated differential output VO2 bar sequentially determined by the estimator 26 as described as a state quantity to be controlled, and defines a linear function a bar according to the following equation (30) (the linear function a bar corresponds to time-series data of the differential output VO2 in the equation (19) which is replaced with time-series data of the estimated differential output VO2 bar), in place of the linear function a established according to the equation (19):

$$\overline{\sigma}(k) = s1 \cdot \overline{VO2}(k) + s2 \cdot \overline{VO2}(k-1) \tag{30}$$

The sliding mode controller 27 calculates the reaching control law input urch in each control cycle according to the following equation (31), using the linear function σ bar represented by the equation (30), rather than the value of the linear function σ for determining the reaching control law input urch according to the equation (24):

$$Urch(k) = \frac{-1}{s1b1} \cdot F \cdot \overline{\sigma}(k+d) \tag{31}$$

Similarly, the sliding mode controller 27 calculates the adaptive control law input uadp in each control cycle according to the following equation (32), using the linear function ( bar represented by the equation (30), rather than the value of the linear function v for determining the adaptive control law input uadp according to the equation (27):

$$Uadp(k) = \frac{-1}{s1b1} \cdot G \cdot \sum_{i=0}^{k+d} (\overline{\sigma}(i) \cdot \Delta T) \tag{32}$$

The latest identified gain coefficients a1(k) hat, a2(k) hat, b1(k) hat which have been determined by the identifier 25 are basically used as the gain coefficients a1, a1, b1 that are required to calculate the equivalent control input ueq, the reaching control law input urch, and the adaptive control law input uadp according to the equations (29), (31), (32).

The sliding mode controller 27 determines the sum of the equivalent control input ueq, the reaching control law input urch, and the adaptive control law input uadp determined according to the equations (29), (31), (32), as the SLD manipulating input usl to be applied to the exhaust system E (see the equation (21)). The conditions for establishing the coefficients s1, s2, F, G used in the equations (29), (31), (32) are as described above.

The above process is a basic algorithm for determining the SLD manipulating input usl (=target differential air-fuel ratio kcmd) to be applied to the exhaust system E with the sliding mode controller 27. According to the above algorithm, the SLD manipulating input usl is determined to converge the estimated differential output VO2 bar from the O₂ sensor 6 toward "0", and as a result, to convert the output VO2 bar from the O₂ sensor 6 toward the target value VO2/TARGET.

The sliding mode controller 27 eventually sequentially determines the target air-fuel ratio KCMD in each control cycle. The SLD manipulating input usl determined as described above signifies a target value for the difference between the air-fuel ratio of the exhaust gas detected by the LAF sensor 5 and the reference value FLAF/BASE. Consequently, the sliding mode controller 27 eventually determines the target air-fuel ratio KCMD by adding the reference value FLAF/BASE to the determined SLD manipulating input usl in each control cycle according to the following equation (33):

$$KCMD(k) = Usl(k) + FLAF/BASE \tag{33}$$
$$= Ueq(k) + Urch(k) + Uadp(k) + FLAF/BASE$$

The above process is a basic algorithm for determining the target air-fuel ratio KCMD with the sliding mode controller 27 according to the present embodiment.

In the present embodiment, the stability of the adaptive sliding mode control process carried out by the sliding mode controller 27 is checked for limiting the value of the SLD manipulating input usl. Details of such a checking process will be described later on.

The general feedback controller 15, particularly, the adaptive controller 18, will be described below.

As shown in FIG. 1, the general feedback controller 15 effects a feedback control process to converge the output KACT (detected air-fuel ratio) from the LAF sensor 5 toward the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 6:
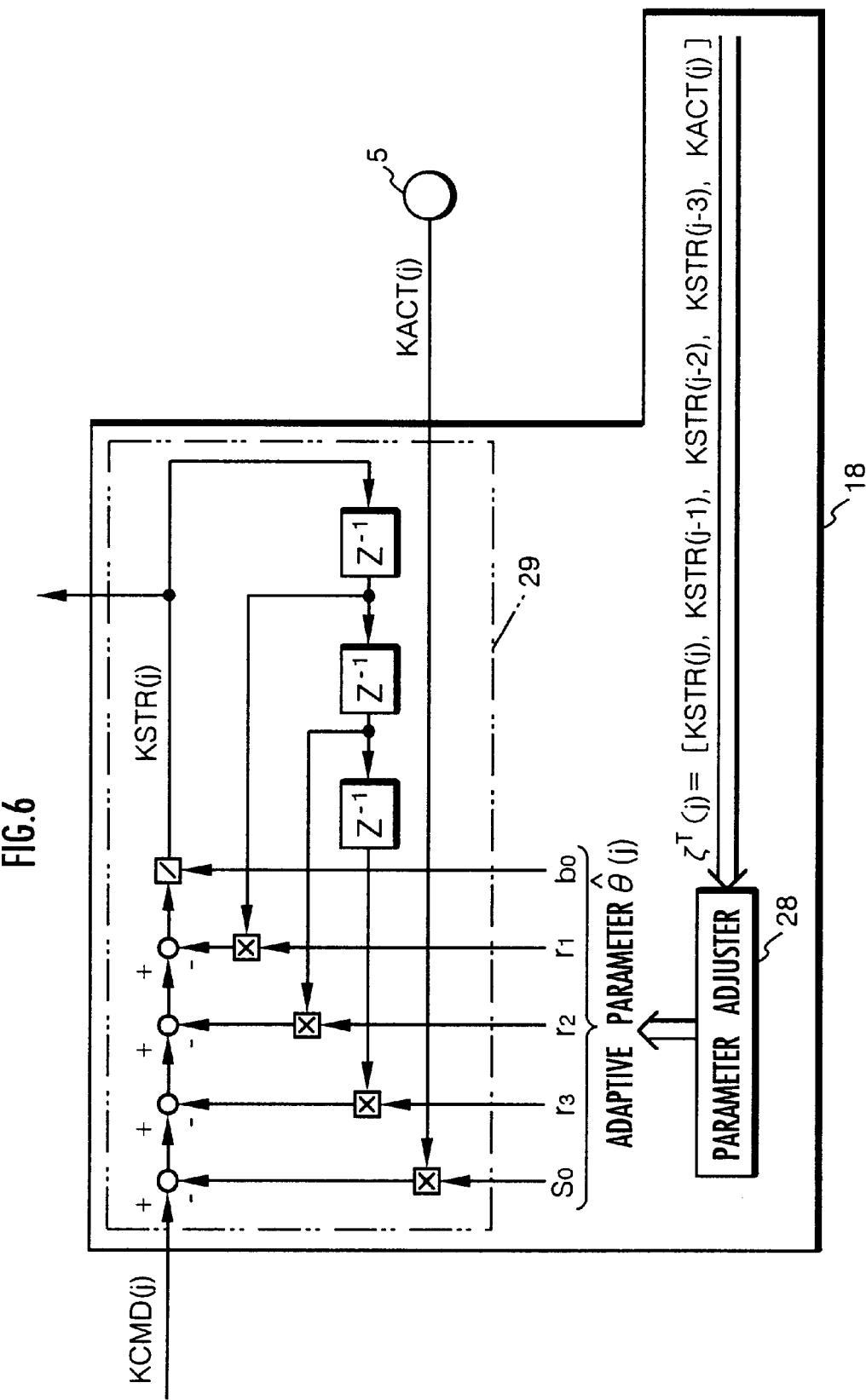
FIG. 6 is a block diagram of an adaptive controller in the arrangement shown in FIG. 1.

The adaptive controller 18 is a recursive-type controller which makes it possible to carry out a feedback control process while compensating for dynamic behavioral changes of the internal combustion engine 1. As shown in FIG. 6, the adaptive controller 18 comprises a parameter adjuster 28 for establishing a plurality of adaptive parameters using the parameter adjusting law proposed by I. D. Landau, et al., and a manipulated variable calculator 29 for calculating the feedback manipulated variable KSTR using the established adaptive parameters.

The parameter adjuster 28 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (34), (35), given below, an adaptive parameter θ hat (j) (j indicates the number of a control cycle) established by the parameter adjuster 28 is represented by a vector (transposed vector) according to the equation (36) given below. An input ζ(j) to the parameter adjuster 28 is expressed by the equation (37) given below. In the present embodiment, it is assumed that the internal combustion engine 1, which is an object to be controlled by the general feedback controller 15, is considered to be a plant of a first-order system having a dead time $d_p$ corresponding to three control cycles (a time corresponding to three combustion cycles of the internal combustion engine 1), and m=n=1, $d_p$=3 in the equations (34)–(37), and five adaptive parameters $s_0$, $r_1$, $r_2$, $r_3$, $b_0$ are established (see FIG. 6). In the upper and middle expressions of the equation (37), $u_s$, $y_s$ generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 5, and the input ζ(j) to the parameter adjuster 28 is expressed by the lower expression of the equation (37) (see FIG. 6).

$$A(Z^{-1}) = 1 + a1Z^{-1} + \cdots + anZ^{-n} \tag{34}$$

$$B(Z^{-1}) = b0 + b1Z^{-1} + \cdots + bmZ^{-m} \tag{35}$$

$$\hat{\theta}^T(j) = \left[\hat{b}_0^{-1}(j), \hat{B}_R(Z^{-1}, j), \hat{S}(Z^{-1}, j)\right] \tag{36}$$

$$= [b_0(j), r_1(j), \ldots, r_{m+d_p-1}(j), s_o(j), \ldots, (j)]$$

$$= [b_0(j), r_1(j), r_2(j), r_3(j), s_o(j)]$$

$$\zeta^T(j) = [u_s(j), \ldots, u_s(j-m-d_p+1), y_s(j), \ldots, y_s(j-n+1)] \tag{37}$$

$$= [u_s(j), u_s(j-1), u_s(j-2), u_s(j-3), y_s(j)]$$

$$= [KSTR(j), KSTR(j-1), KSTR(j-2), KSTR(j-3), KACT(j)]$$

The adaptive parameter θ hat expressed by the equation (36) is made up of a scalar quantity element $b_0$ hat ($Z^{-1}$,j) for determining the gain of the adaptive controller 18, a control element $B_R$ hat ($Z^{-1}$,j) expressed using a manipulated variable, and a control element S hat ($Z^{-1}$,j) expressed using a controlled variable, which are expressed respectively by the following equations (38)–(40) (see the block of the manipulated variable calculator 29 shown in FIG. 6):

$$\hat{b}_0^{-1}(j) = \frac{1}{b_0} \tag{38}$$

$$\hat{B}_R(Z^{-1}, j) = r_1 Z^{-1} + r_2 Z^{-2} + \ldots + r_{m+d_p-1} Z^{-(n+d_p-1)} \tag{39}$$

$$= r_1 Z^{-1} + r_2 Z^{-2} + r_3 Z^{-3}$$

$$\hat{S}(Z^{-1}, j) = s_0 + s_1 Z^{-1} + \ldots + s_{n-1} Z^{-(n-1)} \tag{40}$$

$$= s_0$$

The parameter adjuster 28 establishes coefficients of the scalar quantity element and the control elements, described above, and supplies them as the adaptive parameter θ hat expressed by the equation (36) to the manipulated variable calculator 29. The parameter adjuster 28 calculates the adaptive parameter θ hat so that the output KACT from the LAF sensor 5 will agree with the target air-fuel ratio KCMD, using time-series data of the feedback manipulated variable KSTR from the present to the past and the output KACT.

Specifically, the parameter adjuster 28 calculates the adaptive parameter θ hat according to the following equation (41):

$$\hat{\theta}(j) = \hat{\theta}(j-1) + \Gamma(j-1) \cdot \zeta(j-d_p) \cdot e^*(j) \tag{41}$$

where Γ(j) represents a gain matrix (whose degree is indicated by m+n+$d_p$) for determining a rate of establishing the adaptive parameter θ hat, and e*(j) an estimated error of the adaptive parameter θ hat. Γ(j) and e*(j) are expressed respectively by the following recursive formulas (42), (43):

$$\Gamma(j) = \tag{42}$$

$$\frac{1}{\lambda_1(j)}\left[\Gamma(j-1) - \frac{\lambda_2(j) \cdot \Gamma(j-1) \cdot \zeta(j-d_p) \cdot \zeta^T(j-d_p) \cdot \Gamma(j-1)}{\lambda_1(j) + \lambda_2(j) \cdot \zeta^T(j-d_p) \cdot \Gamma(j-1) \cdot \zeta(j-d_p)}\right]$$

where $0 < \lambda_1(j) \le 1, 0 \le \lambda_2(j) < 2, \Gamma(0) > 0$.

$$e^*(j) = \frac{D(Z^{-1}) \cdot KACT(j) - \hat{\theta}^T(j-1) \cdot \zeta(j-d_p)}{1 + \zeta^T(j-d_p) \cdot \Gamma(j-1) \cdot \zeta(j-d_p)} \tag{43}$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed trace algorithm, and the fixed gain algorithm are obtained depending on how $\lambda_1(j), \lambda_2(j)$ in the equation (47). For a time-dependent plant such as a fuel injection process, an air-fuel ratio, or the like of the internal combustion engine 1, either one of the degressive gain algorithm, the variable gain algorithm, the fixed gain algorithm, and the fixed trace algorithm is suitable.

Using the adaptive parameter θ hat ($s_0$, $r_1$, $r_2$, $r_3$, $b_0$) established by the parameter adjuster 28 and the target air-fuel ratio KCMD calculated by the target air-fuel ratio manipulated variable calculator 13, the manipulated variable calculator 29 determines the feedback manipulated variable KSTR according to a recursive formula expressed by the following equation (44):

$$KSTR = \frac{KCMD(j) - s_0 \cdot KACT(j) - r_1 \cdot KSTR(j-1) - r_2 \cdot KSTR(j-2) - r_3 \cdot KSTR(j-3)}{b_0} \tag{44}$$

The manipulated variable calculator 29 shown in FIG. 6 represents a block diagram of the calculations according to the equation (49).

The feedback manipulated variable KSTR determined according to the equation (44) becomes the target air-fuel ratio KCMD insofar as the output KACT of the LAF sensor 5 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the internal combustion engine 1 which is an object to be controlled. Stated otherwise, the adaptive controller 18 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 20, calculates a proportional term (P term), an integral term (I term), and a derivative term (D term) from the difference between the output KACT (detected air-fuel ratio) of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT (detected air-fuel ratio) of the LAF sensor 5 quickly toward the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 which corresponds to U.S. Pat. No. 5,558,075, and will not be described in detail below.

Operation of the plant control system will be described below.

Control cycles of a processing operation carried out by the control unit 7 will first be described below. Controlling the amount of fuel (fuel injection quantity) supplied to the internal combustion engine 1 needs to be in synchronism with the rotational speed of the internal combustion engine 1. In the present embodiment, the engine control unit 7b operates in control cycles in synchronism with a crankshaft angle period (so-called TDC) of the internal combustion engine 1. Output data from various sensors including the LAF sensor 5 and the $O_2$ sensor 6 are also read in synchronism with a crankshaft angle period (so-called TDC) of the internal combustion engine 1.

It is preferable that the operation of the exhaust control unit 7a to determine the target air-fuel ratio KCMD be carried out in control cycles of a constant period in view of the dead time present in the catalytic converter 3, calculating loads, etc. In the present embodiment, the above operation of the exhaust control unit 7a is carried out in control cycles of a constant period (e.g., 30–100 ms).

The constant period may be determined depending on the type, reaction rate, volume, etc. of the catalytic converter 3 to be controlled. In the present embodiment, the time interval of the above constant period is selected to be greater than the time interval of the crankshaft angle period (TDC).

Figure 7:
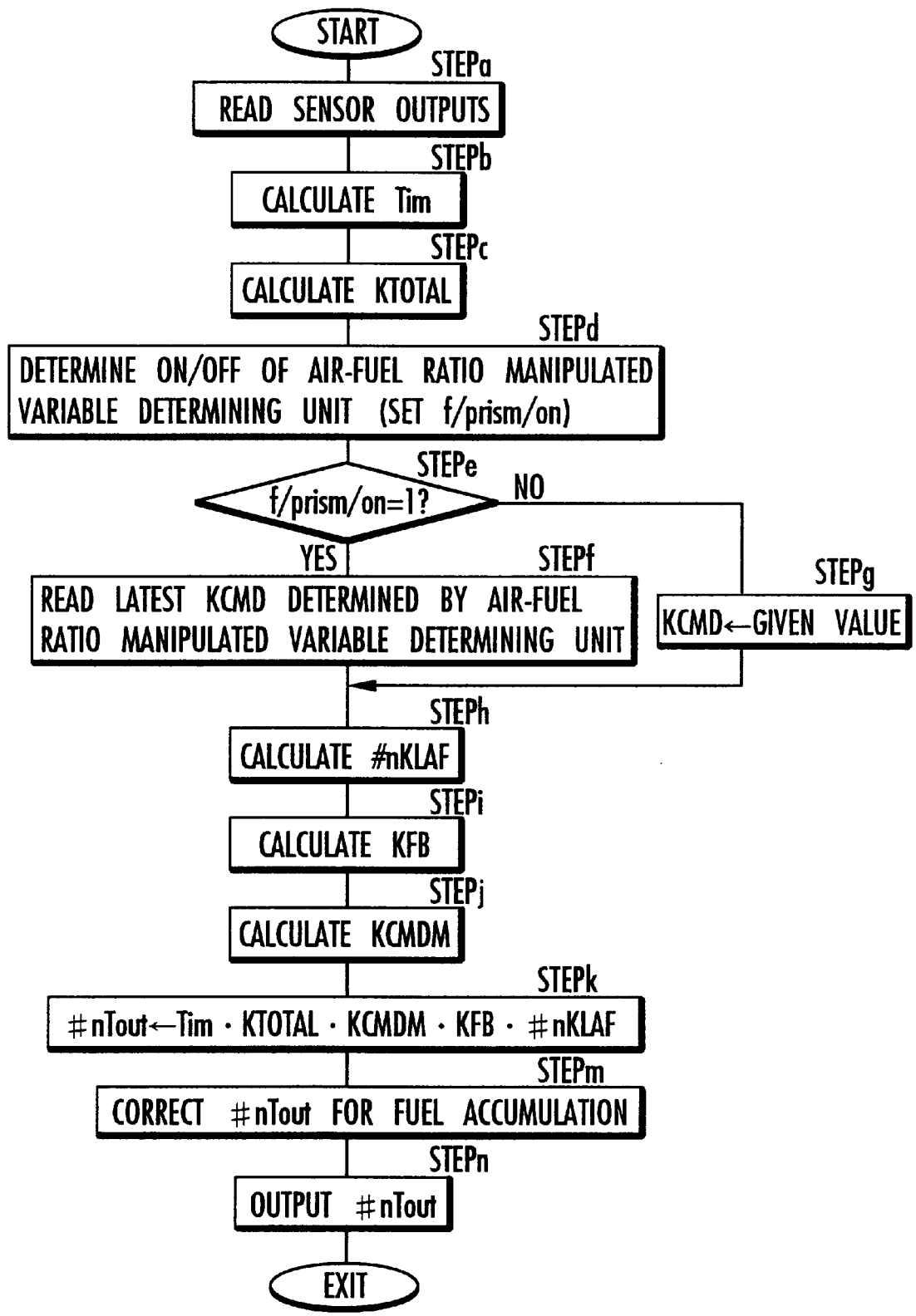
FIG. 7 is a flowchart of an engine fuel control process carried out by the arrangement shown in FIG. 1.

First, a process, carried out by the engine control unit 7b, of calculating an output fuel injection quantity #nTout (n=1, 2, 3, 4) for each of the cylinders of the internal combustion engine 1 for controlling the amount of fuel supplied to the internal combustion engine 1 will be described below with reference to FIGS. 7 and 8. The engine control unit 7b calculates an output fuel injection quantity #nTout (n=1, 2, 3, 4) for each of the cylinders in synchronism with a crankshaft angle period of the internal combustion engine 1 as follows:

In FIG. 7, the engine control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine control unit 7b decides whether the target air-fuel ratio KCMD generated by the air-fuel ratio manipulated variable determining unit 13 is to be used or not, i.e., determines ON/OFF of the air-fuel ratio manipulated variable determining unit 13, and sets a value of a flag f/prism/on which represents ON/OFF of the air-fuel ratio manipulated variable determining unit 13 in STEPd. When the value of the flag f/prism/on is "0", it means that the target air-fuel ratio KCMD generated by the air-fuel ratio manipulated variable determining unit 13 is not to be used (OFF), and when the value of the flag f/prism/on is "1", it means that the target air-fuel ratio KCMD generated by the air-fuel ratio manipulated variable determining unit 13 is to be used (ON).

Figure 8:
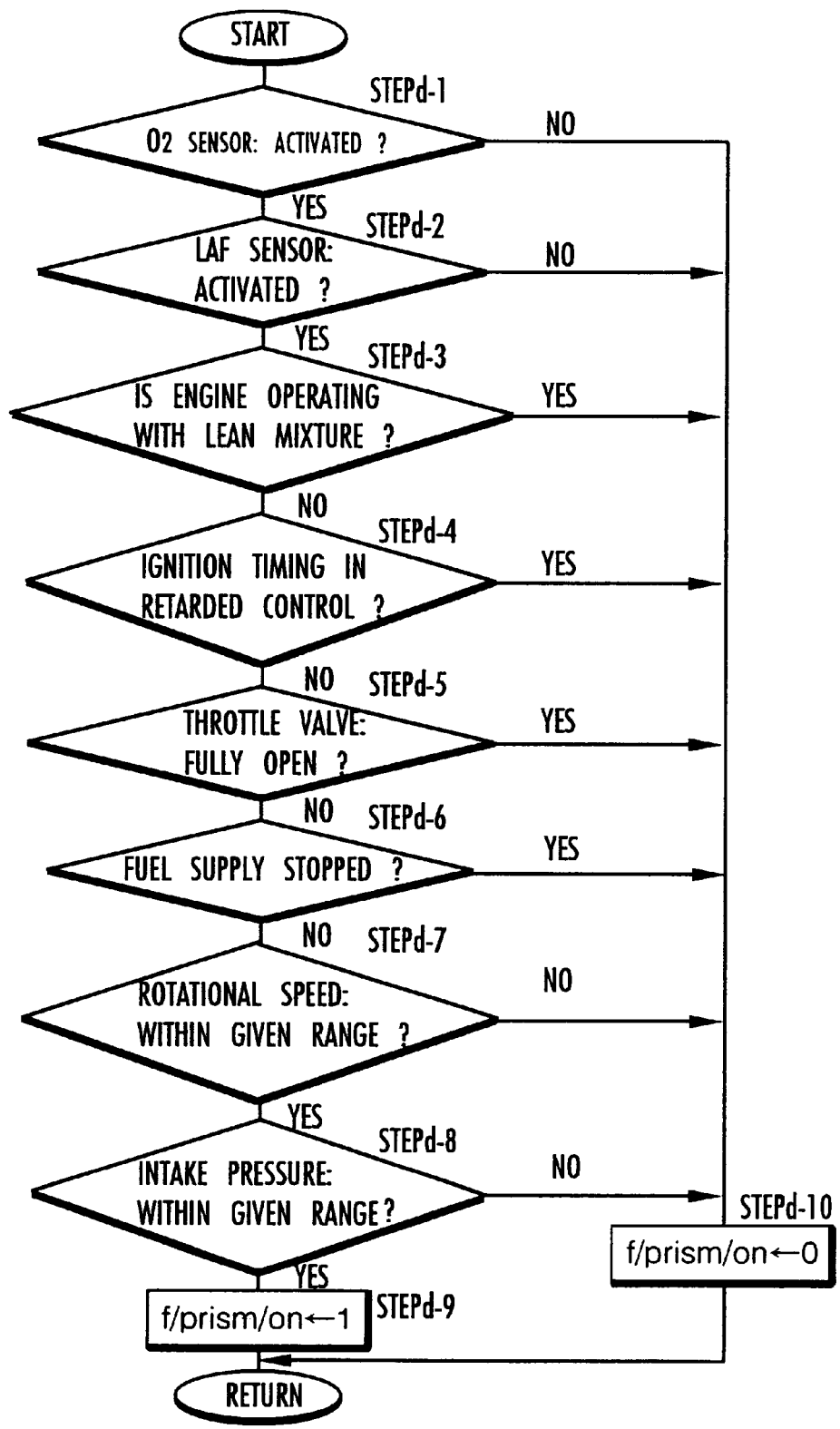
FIG. 8 is a flowchart of a subroutine of the engine fuel control process shown in FIG. 7.

The deciding subroutine of STEPd is shown in detail in FIG. 8. As shown in FIG. 8, the engine control unit 7b decides whether the $O_2$ sensor 6 and the LAF sensor 5 are activated or not respectively in STEPd-1, STEPd-2. If neither one of the $O_2$ sensor 6 and the LAF sensor 5 is activated, since detected data from the $O_2$ sensor 6 and the LAF sensor 5 for use by the air-fuel ratio manipulated variable determining unit 13 are not accurate enough, the value of the flag f/prism/on is set to "0" in STEPd-10.

Then, the engine control unit 7b decides whether the internal combustion engine 1 is operating with a lean air-fuel mixture or not in STEPd-3. The engine control unit 7b decides whether the ignition timing of the internal combustion engine 1 is retarded for early activation of the catalytic converter 3 immediately after the start of the internal combustion engine 1 or not in STEPd-4. The engine control unit 7b decides whether the throttle valve of the internal combustion engine 1 is fully open or not in STEPd-5. The engine control unit 7b decides whether the supply of fuel to the internal combustion engine 1 is being stopped or not in STEPd-6. If either one of the conditions of these steps is satisfied, then since it is not preferable to control the supply of fuel to the internal combustion engine 1 using the target air-fuel ratio KCMD generated by the air-fuel ratio manipulated variable determining unit 13, the value of the flag f/prism/on is set to "0" in STEPd-10.

The engine control unit 7b then decides whether the rotational speed NE and the intake pressure PB of the internal combustion engine 1 fall within respective given ranges or not respectively in STEPd-7, STEPd-8. If either one of the rotational speed NE and the intake pressure PB does not fall within its given range, then since it is not preferable to control the supply of fuel to the internal combustion engine 1 using the target air-fuel ratio KCMD generated by the air-fuel ratio manipulated variable determining unit 13, the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied, then the value of the Ad flag f/prism/on is set to "1" to use the target air-fuel ratio KCMD generated by the air-fuel ratio manipulated variable determining unit 13 for controlling the supply of fuel to the internal combustion engine 1 in STEPd-9.

In FIG. 7, after the value of the flag f/prism/on has been set, the engine control unit 7b determines the value of the flag f/prism/on in STEPe. If f/prism/on=1, then the engine control unit 7b reads the target air-fuel ratio KCMD generated by the air-fuel ratio manipulated variable determining unit 13 in STEPf. If f/prism/on=0, then the engine control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controllers 22 calculates respective feedback correction coefficients #nKLAF in order to eliminate variations between the cylinders, based on actual air-fuel ratios #nA/F of the respective cylinders which have been estimated from the output KACT of the LAF sensor 5 by the observer 21, in STEPh. Then, the general feedback controller 15 calculates a feedback correction coefficient KFB in STEPi.

Depending on the operating conditions of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the cycle time for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the control unit 7 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders accord- ing to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected air-fuel ratio) toward the target air-fuel ratio KCMD. While the feedback manipulated variable kstr from the adaptive controller 18 is being used as the feedback correction coefficient KFB, the output KACT of the LAF sensor 5 is quickly converged toward the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 9:
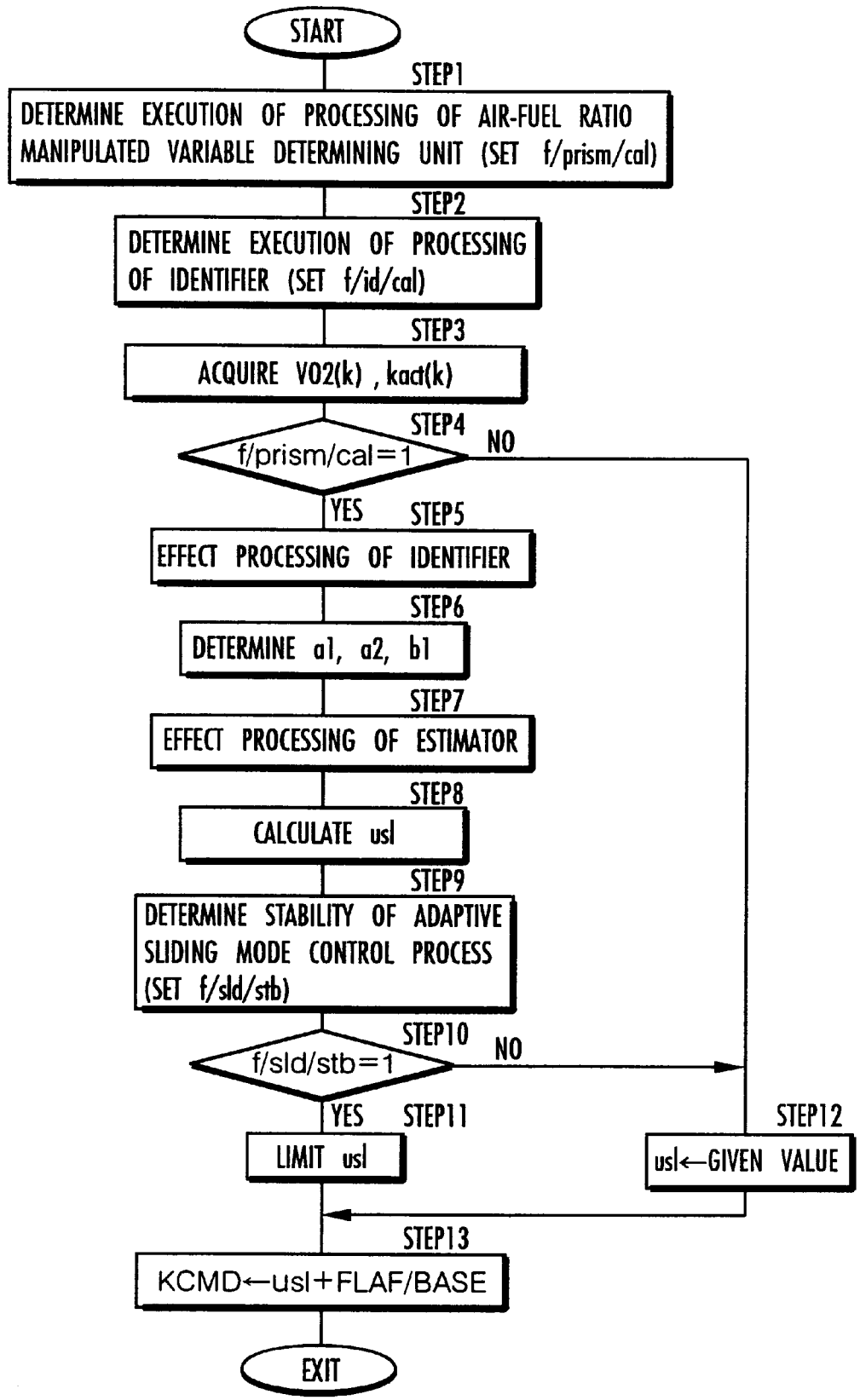
FIG. 9 is a flowchart of an overall process carried out by the air-fuel ratio manipulated variable determining unit of the arrangement shown in FIG. 1.

Concurrent with the above fuel control for the internal combustion engine 1, the air-fuel ratio manipulated variable determining unit 13 executes a main routine shown in FIG. 9 in control cycles of a constant period.

As shown in FIG. 9, the air-fuel ratio manipulated variable determining unit 13 decides whether its own processing (the processing of the identifier 25, the estimator 26, and the sliding mode controller 27) is to be executed or not, and sets a value of a flag f/prim/cal indicative of whether the processing is to be executed or not in STEP1. When the value of the flag f/prim/cal is "0", it means that the processing of the air-fuel ratio manipulated variable determining unit 13 is not to be executed, and when the value of the flag f/prim/cal is "1", it means that the processing of the air-fuel ratio manipulated variable determining unit 13 is to be executed.

Figure 10:
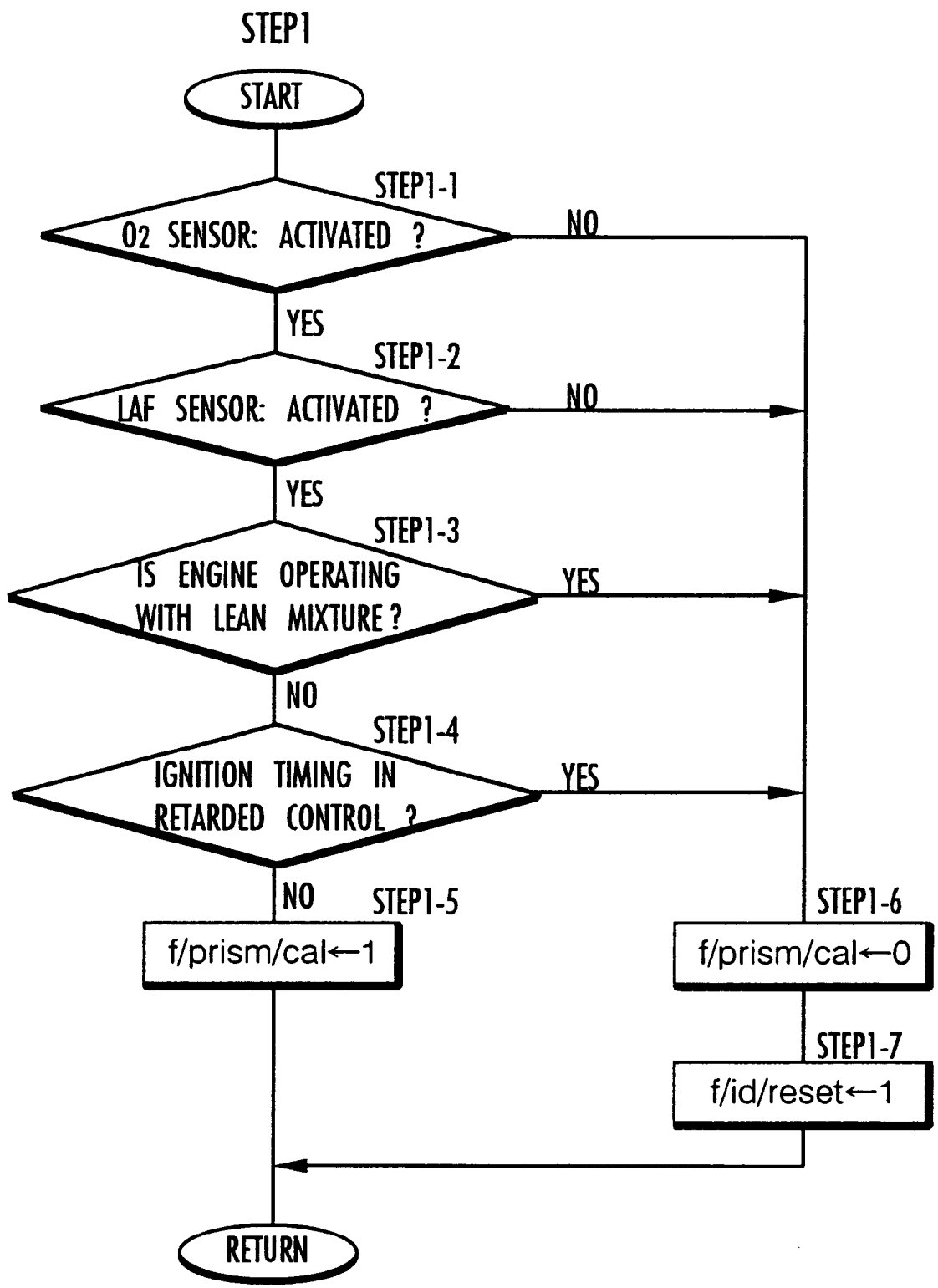
FIG. 10 is a flowchart of a subroutine of the process shown in FIG. 9.

The deciding subroutine in STEP1 is shown in detail in FIG. 10. As shown in FIG. 10, the air-fuel ratio manipulated variable determining unit 13 decides whether the $O_2$ sensor 6 and the LAF sensor 5 are activated or not respectively in STEP1-1, STEP-2. If neither one of the $O_2$ sensor 6 and the LAF sensor 5 is activated, since detected data from the $O_2$ sensor 6 and the LAF sensor 5 for use by the air-fuel ratio manipulated variable determining unit 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1"in STEP1-7. When the value of the flag f/id/reset is "1", it means that the identifier 25 is to be initialized, and when the value of the flag f/id/reset is "0", it means that the identifier 25 is not to be initialized.

The air-fuel ratio manipulated variable determining unit 13 decides whether the internal combustion engine 1 is operating with a lean air-fuel mixture or not in STEP1-3. The air-fuel ratio manipulated variable determining unit 13 decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to adjust the output VO2/OUT of the $O_2$ sensor 6 to the target value VO2/TARGET is not used for the fuel control for the internal combustion engine 1, the value of the flag f/id/cal is set to "0" in STEP1-6, and the value of the flag f/id/reset is set to "1" in order to initialize the identifier 25 in STEP1-7.

In FIG. 9, after the above deciding subroutine, the air-fuel ratio manipulated variable determining unit 13 decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 is not to be executed, and when the value of the flag f/id/cal is "1", it means that the process of identifying (updating) the gain coefficients a1, a1, b1 is to be executed.

Figure 11:
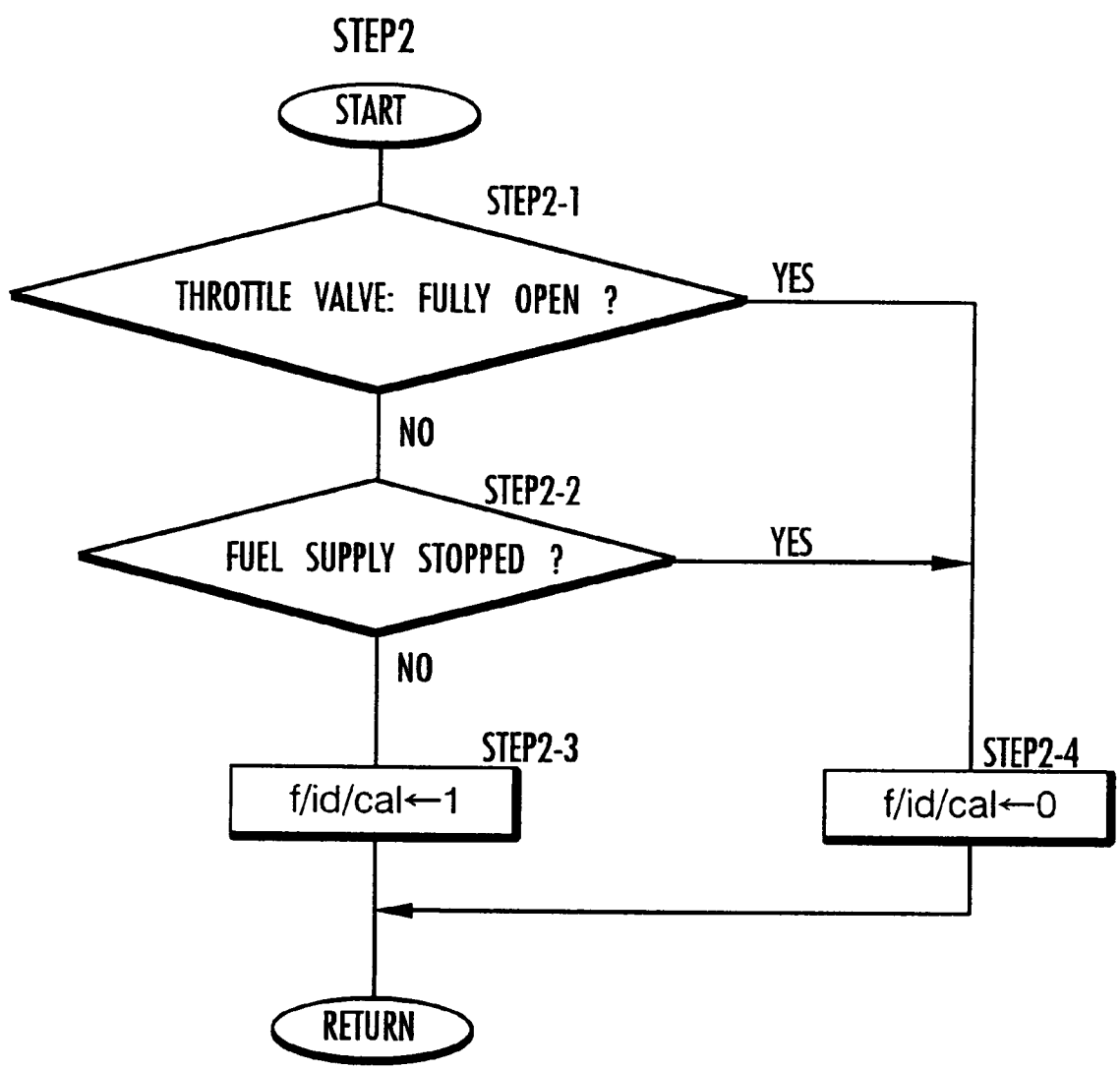
FIG. 11 is a flowchart of another subroutine of the process shown in FIG. 9.

The deciding subroutine of STEP2 is shown in detail in FIG. 11.

The air-fuel ratio manipulated variable determining unit 13 decides whether the throttle valve of the internal combustion engine 1 is fully open or not in STEP2-1. The air-fuel ratio manipulated variable determining unit 13 decides whether the supply of fuel to the internal combustion engine 1 is being stopped or not in STEP2-2. If either one of the conditions of these steps is satisfied, then since it is difficult to adjust the gain coefficients a1, a1, b1 appropriately, the value of the flag f/id/cal is set to "0" in STEP2-4. If neither one of the conditions of these steps is satisfied, then the value of the flag f/id/cal is set to "1" to identify (update) the gain coefficients a1, a1, b1 with the identifier 25 in STEP2-3.

Referring back to FIG. 9, the air-fuel ratio manipulated variable determining unit 13 acquires the latest differential outputs kact(k) (=KACT−FLAF/BASE), VO2(k) (=VO2/OUT−VO2/TARGET) respectively from the subtractors 11, 12 in STEP3. Specifically, the subtractors 11, 12 select latest ones of the time-series data read and stored in the non-illustrated memory in STEPa shown in FIG. 7, calculate the differential outputs kact(k), VO2(k), and give the calculated differential outputs kact(k), VO2(k) to the air-fuel ratio manipulated variable determining unit 13. The differential outputs kact(k), VO2(k) given to the air-fuel ratio manipulated variable determining unit 13, as well as data given in the past, are stored in a time-series manner in a memory (not shown) in the air-fuel ratio manipulated variable determining unit 13.

Then, in STEP4, the air-fuel ratio manipulated variable determining unit 13 determines the value of the flag f/prism/cal set in STEP1. If the value of the flag f/prism/cal is "0", i.e., if the processing of the air-fuel ratio manipulated variable determining unit 13 is not to be executed, then the air-fuel ratio manipulated variable determining unit 13 forcibly sets the SLD manipulating input usl to be determined by the sliding mode controller 27 for the exhaust system E, to a predetermined value in STEP12. The predetermined value may be a fixed value (e.g., "0") or the value of the SLD manipulating input usl determined in a preceding control cycle. After the SLD manipulating input usl is set to the predetermined value in STEP12, the air-fuel ratio manipulated variable determining unit 13 adds the reference value FLAF/BASE to the SLD manipulating input usl for thereby determining a target air-fuel ratio KCMD in the present control cycle in STEP 13. Then, the processing in the present control cycle is finished.

If the value of the flag f/prism/cal is "1" in STEP4, i.e., if the processing of the air-fuel ratio manipulated variable determining unit 13 is to be executed, then the air-fuel ratio manipulated variable determining unit 13 effects the processing of the identifier 25 in STEP5.

Figure 12:
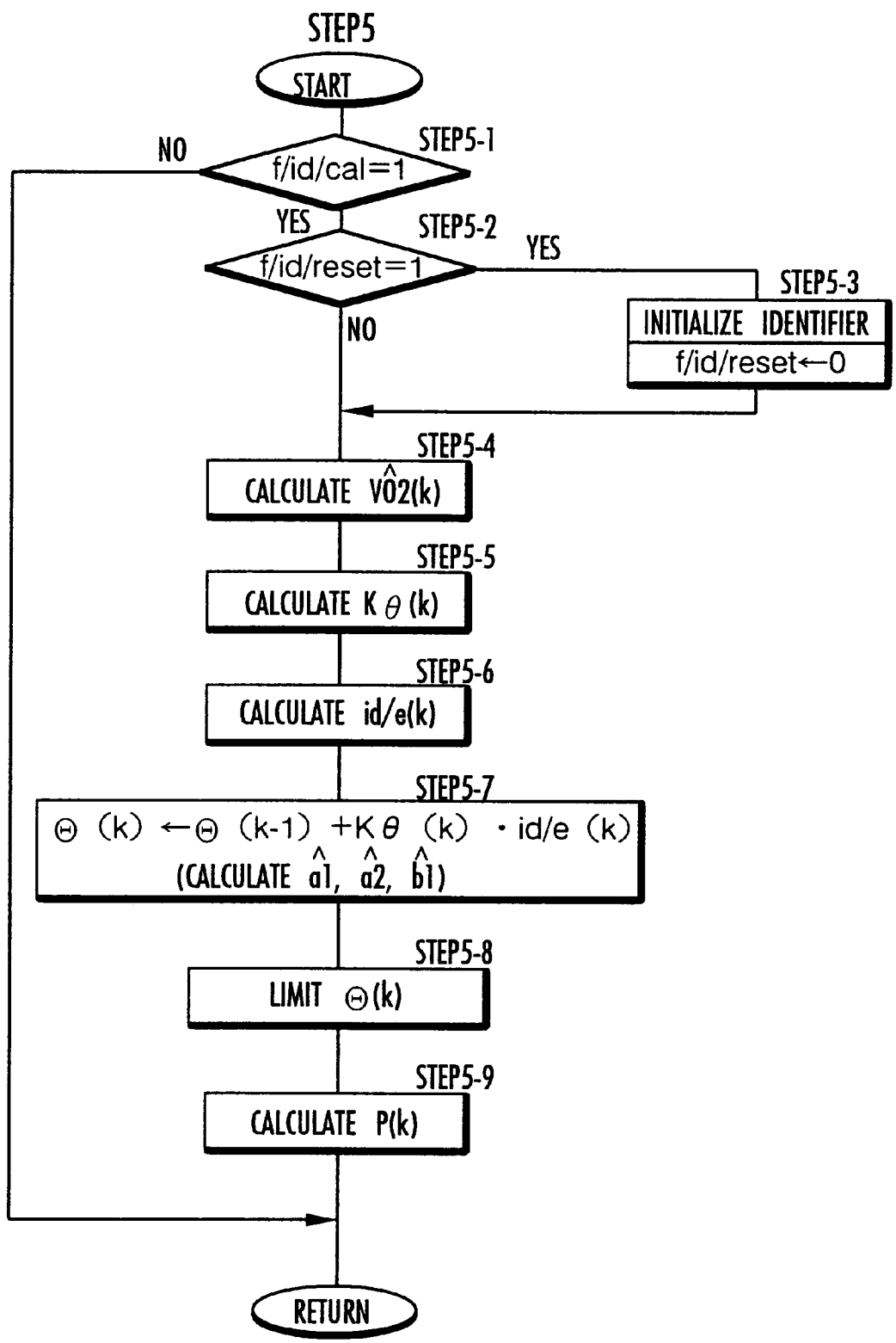
FIG. 12 is a flowchart of still another subroutine of the process shown in FIG. 9.

The processing subroutine of STEP5 is shown in detail in FIG. 12.

The identifier 25 determines the value of the flag f/id/cal set in STEP2 in STEP5-1. If the value of the flag f/id/cal is "0", then since the process of identifying the gain coefficients a1, a1, b1 with the identifier 25 is not carried out, control immediately goes back to the main routine shown in FIG. 9.

If the value of the flag f/id/cal is "1", then the identifier 25 determines the value of the flag f/id/reset set in STEP1 with respect to the initialization of the identifier 25 in STEP5-2. If the value of the flag f/id/reset is "1", the identifier 25 is initialized in STEP5-3. When the identifier 25 is initialized, the identified gain coefficients a1 hat, a1 hat, a2 b1 hat are set to predetermined initial values (the identified gain coefficient vector $\Theta$ according to the equation (4) is initialized), and the elements of the matrix P (diagonal matrix) according to the equation (9) are set to predetermined initial values. The value of the flag f/id/reset is reset to "0".

Then, the identifier 25 calculates the identified differential output VO2(k) hat from the $O_2$ sensor 6 in the discrete-system model (see the equation (3)) of the exhaust system E which is expressed using the present identified gain coefficients a1(k−1) hat, a2(k−1) hat, b1(k−1) hat, according to the equation (3) or the equation (6) equivalent thereto, using the past data VO2(k−1), VO2(k−2), kact(k−d−1) of the differential outputs VO2, kact acquired in each control cycle in STEP3, and the identified gain coefficients a1(k−1) hat, a2(k−1) hat, b1(k−l) hat, in STEP5-4.

The identifier 25 then calculates the vector K$\theta$(k) to be used in determining the new identified gain coefficients a1 hat, a2 hat, b1 hat according to the equation (9) in STEP5-5. Thereafter, the identifier 25 calculates the identified error idle, i.e., the difference between the identified differential output VO2 hat from the $O_2$ sensor 6 in the discrete-system model and the actual differential output VO2 (see the equation (7)), in STEP5-6.

Figure 13:
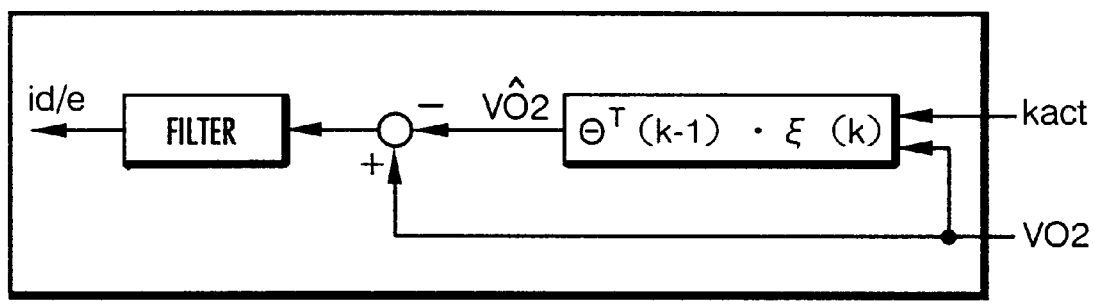
FIG. 13 is a diagram illustrative of the subroutine shown in FIG. 12.

The identified error id/e obtained in STEP5-6 may basically be calculated according to the equation (7). In the present embodiment, however, as shown in FIG. 13, a value (=VO2−VO2 hat) calculated according to the equation (7) from the differential output VO2 acquired in each control cycle in STEP3 (see FIG. 9), and the identified differential output VO2 hat calculated in each control cycle in STEP5-4 is filtered with low-pass characteristics to calculate the identified error id/e.

This is because since the exhaust system E including the catalytic converter 3 generally has low-pass characteristics, it is preferable to attach importance to the low-frequency behavior of the exhaust system E in appropriately identifying the gain coefficients a1, a2, b1 of the discrete-system model of the exhaust system E.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error id/e. However, determining the identified error id/e by filtering the result of the calculation of the equation (7) as with the present embodiment offers the following advantages: If the resolutions of the differential output kact of the LAF sensor 5 and the differential output VO2 of the $O_2$ sensor 6, which are supplied to the air-fuel ratio manipulated variable determining unit 13, are lower than the calculating resolution of the air-fuel ratio manipulated variable determining unit 13, then the result of the calculation of the equation (7) exhibits relatively large stepwise changes. By filtering the result of the calculation of the equation (7), any changes of the identified error id/e can be smoothed.

The above filtering is carried out by a moving average process which is a digital filtering process.

After the identifier 25 has calculated the identified error idle, the identifier 25 calculates a new identified gain coefficient vector Θ, i.e., new identified gain coefficients a1(k) hat, a2(k) hat, b1(k) hat, according to the equation (8) using the identified error id/e and Kθ calculated in SETP5-5 in STEP5-7.

The identifier 25 further limits the values of the gain coefficients a1 hat, a2 hat, b1 hat (elements of the identified gain coefficient vector Θ), are limited to meet predetermined conditions.

The predetermined conditions for limiting the values of the identified gain coefficients a1 hat, a2 1hat, b1 hat include a condition (hereinafter referred to as a first limiting condition) for limiting combinations of the values of the identified gain coefficients a1 hat, a2 1hat relative to a response delay element of the discrete-system model expressed by the equation (1) (more specifically, primary and secondary autoregressive terms of the right side of the equation (1)) to a predetermined combination, and a condition (hereinafter referred to as a second limiting condi- tion) for limiting the value of the identified gain coefficient b1 hat relative to a dead time element of the discrete-system model.

Prior to describing the first and second limiting conditions and the specific processing details of STEP5-8, the reasons for limiting the values of the identified gain coefficients a1 hat, a2 hat, b1 hat will be described below.

The inventors of the present invention have found that if the values of the identified gain coefficients a1 hat, a2 hat, b1 hat are not particularly limited, while the output signal VO2/OUT of the $O_2$ sensor 6 is being stably controlled at the target value VO2/TARGET, there are developed a situation in which the target air-fuel ratio KCMD determined by the sliding mode controller 27 changes smoothly with time, and a situation in which the target air-fuel ratio KCMD oscillates with time at a high frequency. Neither of these situations poses problems in controlling the output VO2/OUT of the $O_2$ sensor 6 at the target value VO2/TARGET. However, the situation in which the target air-fuel ratio KCMD oscillates with time at a high frequency is not preferable in smoothly operating the internal combustion engine 1 that is controlled on the basis of the target air-fuel ratio KCMD.

A study of the above phenomenon by the inventors has shown that whether the target air-fuel ratio KCMD determined by the sliding mode controller 27 changes smoothly or oscillates at a high frequency depends strongly on the combinations of the values of the identified gain coefficients a1 hat, a2 hat identified by the identifier 25 and the value of the identified gain coefficient b1 hat.

In the present embodiment, the first and second limiting conditions are established appropriately, and the combinations of the values of the identified gain coefficients a1 hat, a2 hat and the value of the identified gain coefficient b1 hat are appropriately limited to eliminate the situation in which the target air-fuel ratio KCMD oscillates at a high frequency.

According to the present embodiment, the first and second limiting conditions are established as follows:

With respect to the first limiting condition for limiting the values of the identified gain coefficients a1 hat, a2 hat, the study by the inventors indicates that whether the target air-fuel ratio KCMD determined by the sliding mode controller 27 changes smoothly or oscillates at a high frequency is closely related to combinations of the coefficient values $\alpha 1$, $\alpha 2$ in the equations (15)–(18) which are determined by the values of the gain coefficients a1, a2, i.e., the coefficient values a1, a2 used for the estimator 26 to determine the estimated differential output VO2(k+d) bar (the coefficient values $\alpha 1$, $\alpha 2$ are the first-row, first-column element and the first-row, second-column element of the matrix $A^d$ which is a power of the matrix A defined by the equation (13)).

Figure 14:
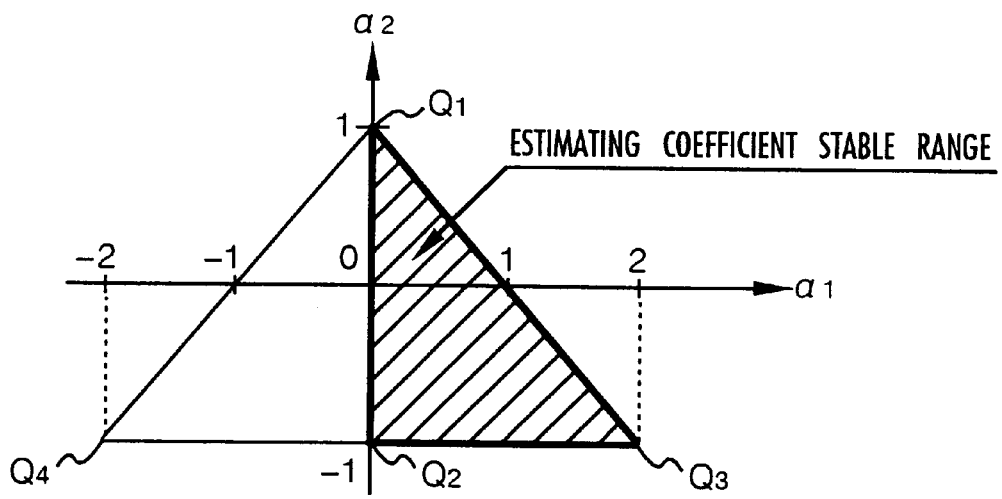
FIG. 14 is a diagram illustrative of the subroutine shown in FIG. 12.

Specifically, as shown in FIG. 14, when a coordinate plane whose coordinate components or axes are represented by the coefficient values $\alpha 1$, $\alpha 2$ is established, if a point on the coordinate plane which is determined by a combination of the coefficient values $\alpha 1$, $\alpha 2$ lies in a hatched range, which is surrounded by a triangle $Q_1Q_2Q_3$ (including the boundaries) and will hereinafter be referred to as an estimating coefficient stable range, then the time-dependent change of the target air-fuel ratio KCMD tends to be smooth. Conversely, if a point on the coordinate plane which is determined by a combination of the coefficient values $\alpha 1$, $\alpha 2$ does not lie in the estimating coefficient stable range, then the time-dependent change of the target air-fuel ratio KCMD tends to be oscillatory at a high frequency, or the controllability of the output VO2/OUT of the $O_2$ sensor 6 at the target value VO2/TARGET tends to be poor.

Therefore, the combinations of the values of the gain coefficients a1, a2 identified by the identifier 25, i.e., the combinations of the values of the identified gain coefficients a1 hat, a2 hat, should be limited such that the point on the coordinate plane shown in FIG. 14 which corresponds to the combination of the coefficient values a1, a2 determined by the values of the gain coefficients a1, a2 or the values of the identified gain coefficients a1 hat, a2 hat will lie within the estimating coefficient stable range.

In FIG. 14, a triangular range $Q_1Q_4Q_3$ on the coordinate plane which contains the estimating coefficient stable range is a range that determines combinations of the coefficient values $\alpha 1$, $\alpha 2$ which makes theoretically stable a system defined according to the following equation (45), i.e., a system defined by an equation similar to the equation (11) except that VO2(k), VO2(k−1) on the right side of the equation (11) are replaced respectively with VO2(k) bar, VO2(k−1) bar (VO2(k) bar, VO2(k−1) bar mean respectively an estimated differential output determined before the dead time d by the estimator 26 and an estimated differential output determined in a preceding cycle by the estimator 26).

$$\overline{VO2}(k+d) = \alpha 1 \cdot \overline{VO2}(k) + \alpha 2 \cdot \overline{VO2}(k-1) + \sum_{j=1}^{d} \beta_j \cdot kcmd(k-j) \quad (45)$$

The condition for the system defined according to the equation (45) to be stable is that a pole of the system (which is given by the following equation (46)) exists in a unit circle on a complex plane:

$$\text{Pole of the system according to the equation (45)} = \frac{\alpha 1 \pm \sqrt{\alpha 1^2 + 4 \cdot \alpha 2}}{2} \quad (46)$$

The triangular range $Q_1Q_4Q_3$ shown in FIG. 14 is a range for determining the combinations of the coefficient values $\alpha 1$, $\alpha 2$ which satisfy the above condition. Therefore, the estimating coefficient stable range is a range indicative of those combinations where $\alpha 1 \geq 0$ of the combinations of the coefficient values $\alpha 1$, $\alpha 2$ which make stable the system defined by the equation (45).

Since the coefficient values $\alpha 1$, $\alpha 2$ are determined by a combination of the values of the gain coefficients a1, a2, a combination of the values of the gain coefficients a1, a2 is determined by a combination of the coefficient values $\alpha 1$, α2. Therefore, the estimating coefficient stable range shown in FIG. 14 which determines preferable combinations of the coefficient values α1, α2 can be converted into a range on a coordinate plane shown in FIG. 15 whose coordinate components or axes are represented by the gain coefficients a1, a2. Specifically, the estimating coefficient stable range shown in FIG. 14 is converted into a range enclosed by the imaginary lines in FIG. 15, which is a substantially triangular range having an undulating lower side and will hereinafter be referred to as an identifying coefficient stable range, on the coordinate plane shown in FIG. 15. Stated otherwise, when a point on the coordinate plane shown in FIG. 15 which is determined by a combination of the values of the gain coefficients a1, a2 resides in the identifying coefficient stable range, a point on the coordinate plane shown in FIG. 14 which corresponds to the combination of the coefficient values α1, α2 determined by those values of the gain coefficients a1, a2 resides in the estimating coefficient stable range.

Figure 15:
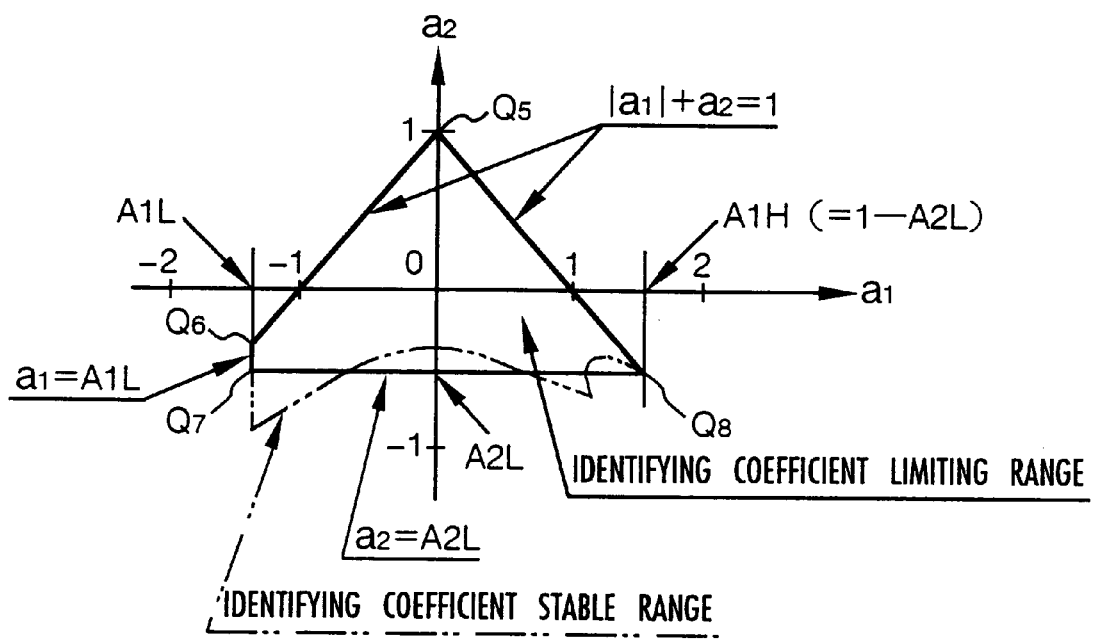
FIG. 15 is a diagram illustrative of the subroutine shown in FIG. 12.

Consequently, the first limiting condition for limiting the values of the identified gain coefficients a1 hat, a2 hat determined by the identifier 25 should preferably be basically established such that a point on the coordinate plane shown in FIG. 15 which is determined by those values of the identified gain coefficients a1 hat, a2 hat reside in the identifying coefficient stable range.

However, since a boundary (lower side) of the identifying coefficient stable range indicated by the imaginary lines in FIG. 15 is of a complex undulating shape, a practical process for limiting the point on the coordinate plane shown in FIG. 15 which is determined by the values of the identified gain coefficients a1 hat, a2 hat is liable to be complex.

For this reason, according to the present embodiment, the identifying coefficient stable range is substantially approximated by a quadrangular range $Q_5Q_6Q_7Q_8$ enclosed by the solid lines in FIG. 15, which has straight boundaries and will hereinafter be referred to as an identifying coefficient limiting range. As shown in FIG. 15, the identifying coefficient limiting range is a range enclosed by a polygonal line (including line segments $Q_5Q_6$ and $Q_5Q_8$) expressed by a functional expression $|a1|+a2=1$, a straight line (including a line segment $Q_6Q_7$) expressed by a constant-valued functional expression a1=A1L (A1L: constant), and a straight line (including a line segment $Q_7Q_8$) expressed by a constant-valued functional expression a2=A2L (A2L: constant). The first limiting condition for limiting the values of the identified gain coefficients a1 hat, a2 hat is established such that the point on the coordinate plane shown in FIG. 15 which is determined by those values of the identified gain coefficients a1 hat, a2 hat lies in the identifying coefficient limiting range, and the values of the identified gain coefficients a1 hat, a2 hat are limited such that the point determined by those values of the identified gain coefficients a1 hat, a2 hat lies in the identifying coefficient limiting range. Although part of the lower side of the identifying coefficient limiting range deviates from the identifying coefficient stable range, it has experimentally been confirmed that the point determined by the identified gain coefficients a1 hat, a2 hat determined by the identifier 25 does not actually fall in the deviating range. Therefore, the deviating range will not pose any practical problem.

The above identifying coefficient limiting range is given for illustrative purpose only, and may be equal to or may substantially approximate the identifying coefficient stable range, or may be of any shape insofar as most or all of the identifying coefficient limiting range belongs to the identifying coefficient stable range. Thus, the identifying coefficient limiting range may be established in various configurations in view of the ease with which to limit the values of the identified gain coefficients a1 hat, a2 hat and the practical controllability. For example, while the boundary of an upper portion of the identifying coefficient limiting range is defined by the functional expression $|a1|+a2=1$ in the illustrated embodiment, combinations of the values of the gain coefficients a1, a2 which satisfy this functional expression are combinations of theoretical stable limits where a pole of the system defined by the equation (46) exists on a unit circle on a complex plane. Therefore, the boundary of the upper portion of the identifying coefficient limiting range may be determined by a functional expression $|a1|+a2=r$ (r is a value slightly smaller than "1" corresponding to the stable limits, e.g., 0.99) for higher control stability.

The above identifying coefficient stable range shown in FIG. 15 as a basis for the identifying coefficient limiting range is given for illustrative purpose only. The identifying coefficient stable range which corresponds to the estimating coefficient stable range shown in FIG. 14 is affected by the dead time d (more precisely, its set value) and has its shape varied depending on the dead time d, as can be seen from the definition of the coefficient values α1, α2 (see the equations (14), (15)). Irrespective of the shape of the identifying coefficient stable range, the identifying coefficient limiting range may be established, as described above, in a manner to match the shape of the identifying coefficient stable range.

In the present embodiment, the second limiting condition for limiting the value of the gain coefficient b1 identified by the identifier 25, i.e., the value of the identified gain coefficient b1 hat, is established as follows:

The inventors have found that the situation in which the time-depending change of the target air-fuel ratio KCMD is oscillatory at a high frequency tends to happen also when the value of the identified gain coefficient b1 hat is excessively large or small. According to the present embodiment, an upper limit value B1H and a lower limit value B1L (B1H>B1L>0) for the identified gain coefficient b1 hat are determined in advance through experimentation or simulation. Then, the second limiting condition is established such that the identified gain coefficient b1 hat is equal to or smaller than the upper limit value B1H and equal to or greater than the lower limit value B1L (B1L≦b1 hat≦B1H).

Figure 16:
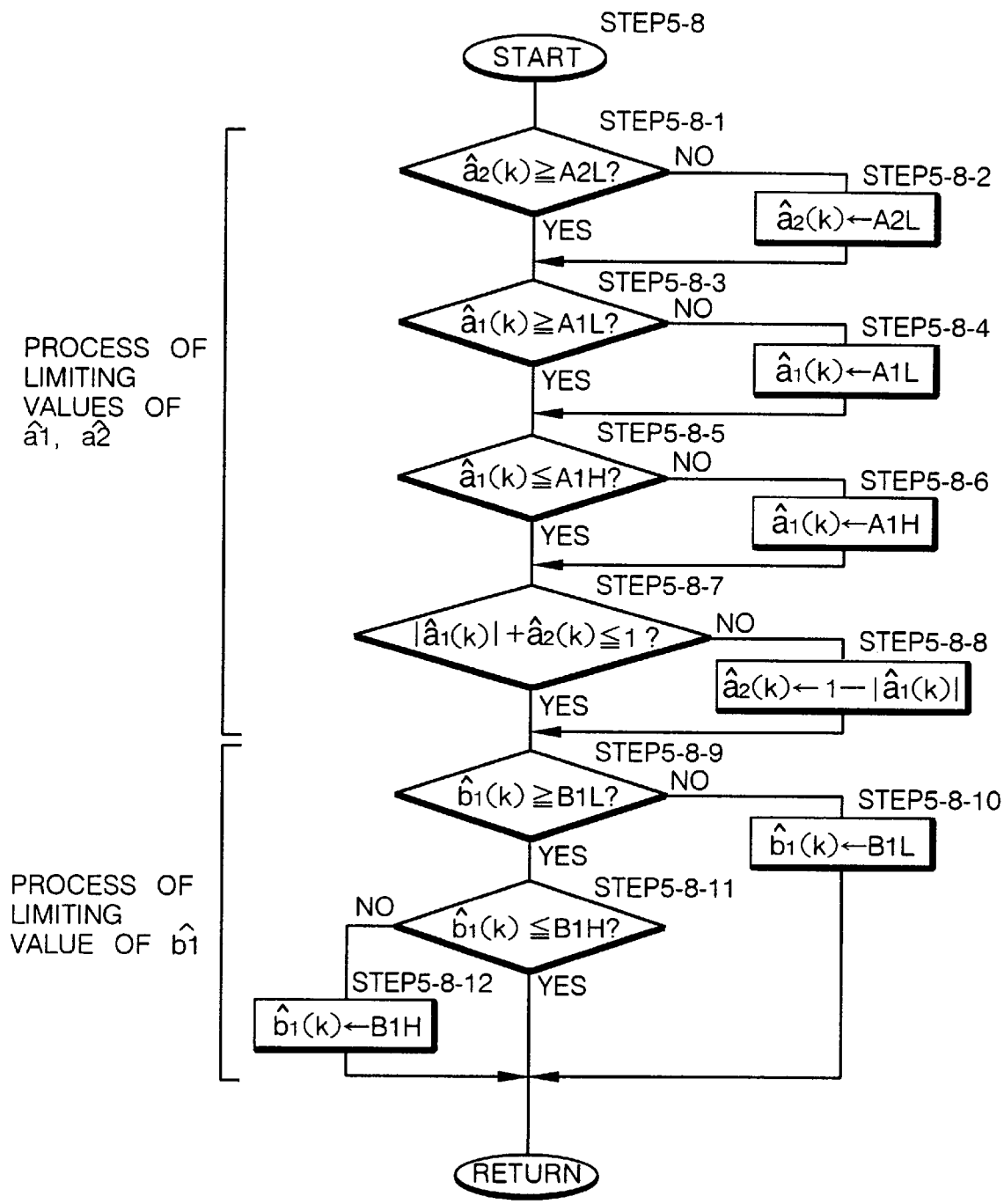
FIG. 16 is a flowchart of a subroutine of the subroutine shown in FIG. 12.

A process of limiting the values of the identified gain coefficients a1 hat, a2 hat, b1 hat according to the first and second limiting conditions is carried out by in STEP5-8 as follows:

As shown in FIG. 16, the identifier 25 limits combinations of the identified gain coefficients a1(k) hat, a2(k) hat determined in STEP5-7 shown in FIG. 12 according to the first limiting condition in STEP5-8-1 through STEP5-8-8.

Specifically, the identifier 25 decides whether or not the value of the identified gain coefficient a2(k) hat determined in STEP5-7 is equal to or greater than a lower limit value A2L (see FIG. 25) for the gain coefficient a2 in the identifying coefficient limiting range in STEP5-8-1

If the value of the identified gain coefficient a2(k) is smaller than A2L, then since a point on the coordinate plane shown in FIG. 15, which is expressed by (a1(k) hat, a2(k) hat), determined by the combination of the values of the identified gain coefficients a1(k) hat, a2(k) hat does not reside in the identifying coefficient limiting range, the value of a2(k) hat is forcibly changed to the lower limit value A2L in STEP5-8-2. Thus, the point (a1(k) hat, a2(k) hat) on the coordinate plane shown in FIG. 15 is limited to a point in a region on and above a straight line, i.e., the straight line including the line segment $Q_7Q_8$, expressed by at least a2=A2L.

Then, the identifier 25 decides whether or not the value of the identified gain coefficient a1(k) hat determined in STEP5-7 is equal to or greater than a lower limit value A1L (see FIG. 15) for the gain coefficient a1 in the identifying coefficient limiting range in STEP5-8-3, and then decides whether or not the value of the identified gain coefficient a1(k) hat is equal to or smaller than an upper limit value A1H (see FIG. 15) for the gain coefficient a1 in the identifying coefficient limiting range in STEP5-8-5. The upper limit value A1H for the gain coefficient a1 in the identifying coefficient limiting range is represented by A1H=1−A2L because it is an a1 coordinate of the point $Q_8$ where the polygonal line |a1|+a2=1 (a1>0) and the straight line a2=A2L intersect with each other, as shown in FIG. 15.

If the value of the identified gain coefficient a1(k) hat is smaller than the lower limit value A1L or greater than the upper limit value A1H, then since the point (a1(k) hat, a2(k) hat) on the coordinate plane shown in FIG. 15 does not reside in the identifying coefficient limiting range, the value of a1(k) hat is forcibly changed to the lower limit value A1L or the upper limit value A1H in STEP5-8-4, STEP5-8-6.

Thus, the point (a1(k) hat, a2(k) hat) on the coordinate plane shown in FIG. 15 is limited to a region on and between a straight line, i.e., the straight line including the line segment $Q_6$ Q7, expressed by a1=A1L, and a straight line, i.e., the straight line passing through the point $Q_8$ and perpendicular to the a1 axis, expressed by a1=A1H.

The processing in STEP5-8-3 and STEP5-8-4 and the processing in STEP5-8-5 and STEP5-8-6 may be switched around. The processing in STEP5-8-1 and STEP5-8-2 may be carried out after the processing in STEP5-8-3 through STEP5-8-6.

Then, the identifier 25 decides whether the present values of a1(k) hat, a2(k) hat after STEP5-8-1 through STEP5-8-6 satisfy an inequality |a1|+a1<1 or not, i.e., whether the point (a1(k) hat, a2(k) hat) is positioned on or below or on or above the polygonal line (including line segments $Q_5Q_6$ and $Q_5Q_8$) expressed by the functional expression a1+a2=1 in STEP5-8-7.

If |a1|+a1 >1, then the point (a1(k) hat, a2(k) hat) determined by the values of a1(k) hat, a2(k) hat after STEP5-8-1 through STEP5-8-6 exists in the identifying coefficient limiting range (including its boundaries).

If |a1|+a1>1, then since the point (a1(k) hat, a2(k) hat) deviates upwardly from the identifying coefficient limiting range, the value of the a2(k) hat is forcibly changed to a value (1 −|a1(k) hat|) depending on the value of a1(k) hat in STEP5-8-8. Stated otherwise, while the value of a1(k) hat is being kept unchanged, the point (a1(k) hat, a2(k) hat) is moved onto a polygonal line expressed by the functional expression |a1|+a2=1, i.e., onto the line segment $Q_5Q_6$ or the line segment $Q_5Q_8$ which is a boundary of the identifying coefficient limiting range.

Through the above processing in STEP5-8-1 through 5-8-8, the values of the identified gain coefficients a1(k) hat, a2(k) hat are limited such that the point (a1(k) hat, a2(k) hat) determined thereby resides in the identifying coefficient limiting range. If the point (a1(k) hat, a2(k) hat) corresponding to the values of the identified gain coefficients a1(k) hat, a2(k) hat that have been determined in STEP5-7 exists in the identifying coefficient limiting range, then those values of the identified gain coefficients a1(k) hat, a2(k) hat are maintained.

The value of the identified gain coefficient a1(k) hat relative to the primary autoregressive term of the discrete-system model is not forcibly changed insofar as the value resides between the lower limit value A1L and the upper limit value A1H of the identifying coefficient limiting range. If a1(k) hat<A1L or a1(k) hat>A1H, then since the value of the identified gain coefficient a1(k) hat is forcibly changed to the lower limit value A1L which is a minimum value that the gain coefficient a1 can take in the identifying coefficient limiting range or the upper limit value A1H which is a maximum value that the gain coefficient a1 can take in the identifying coefficient limiting range, the change in the value of the identified gain coefficient a1(k) hat is minimum. Stated otherwise, if the point (a1(k) hat, a2(k) hat) corresponding to the values of the identified gain coefficients a1(k) hat, a2(k) hat that have been determined in STEP5-10 deviates from the identifying coefficient limiting range, then the forced change in the value of the identified gain coefficient a1(k) hat is held to a minimum.

After having limited the values of the identified gain coefficients a1(k) hat, a2(k) hat, the identifier 25 limits the identified gain coefficient b1(k) hat according to the second limiting condition in STEP5-8-9 through STEP5-8-12.

Specifically, the identifier 25 decides whether or not the value of the identified gain coefficient b1(k) hat determined in STEP5-7 is equal to or greater than the lower limit value B1L in STEP5-8-9. If the lower limit value B1L is greater than the value of the identified gain coefficient b1(k) hat, the value of b1(k) hat is forcibly changed to the lower limit value B1L in STEP5-8-10.

The identifier 25 decides whether or not the value of the identified gain coefficient b1(k) hat is equal to or smaller than the upper limit value B1H in STEP5-8-11. If the upper limit value B1H is greater than the value of the identified gain coefficient b1(k) hat, the value of b1(k) hat is forcibly changed to the upper limit value B1H in STEP5-8-12.

Through the above processing in STEP5-8-9 through 5-8-12, the value of the identified gain coefficient b1(k) hat is limited to a range between the lower limit value B1L and the upper limit value B1H.

After the identifier 25 has limited the combination of the values of the identified gain coefficients a1(k) hat, a2(k) hat and the identified gain coefficient b1(k) hat, control returns to the sequence shown in FIG. 12. The preceding values a1(k−1) hat, a2(k−1) hat, b1(k−1) hat of the identified gain coefficients used for determining the identified gain coefficients a1(k) hat, a2(k) hat, b1(k) hat in STEP5-7 shown in FIG. 12 are the values of the identified gain coefficients limited according to the first and second limiting conditions in STEP5-8 in the preceding control cycle.

After having limited the identified gain coefficients a1(k) hat, a2(k) hat, b1(k) hat as described above, the identifier 25 updates the matrix P(k) according to the equation (10) for the processing of a next control cycle in STEP5-9, after which control returns to the main routine shown in FIG. 9.

The processing subroutine of STEP5 for the identifier 25 has been described above.

Figure 17:
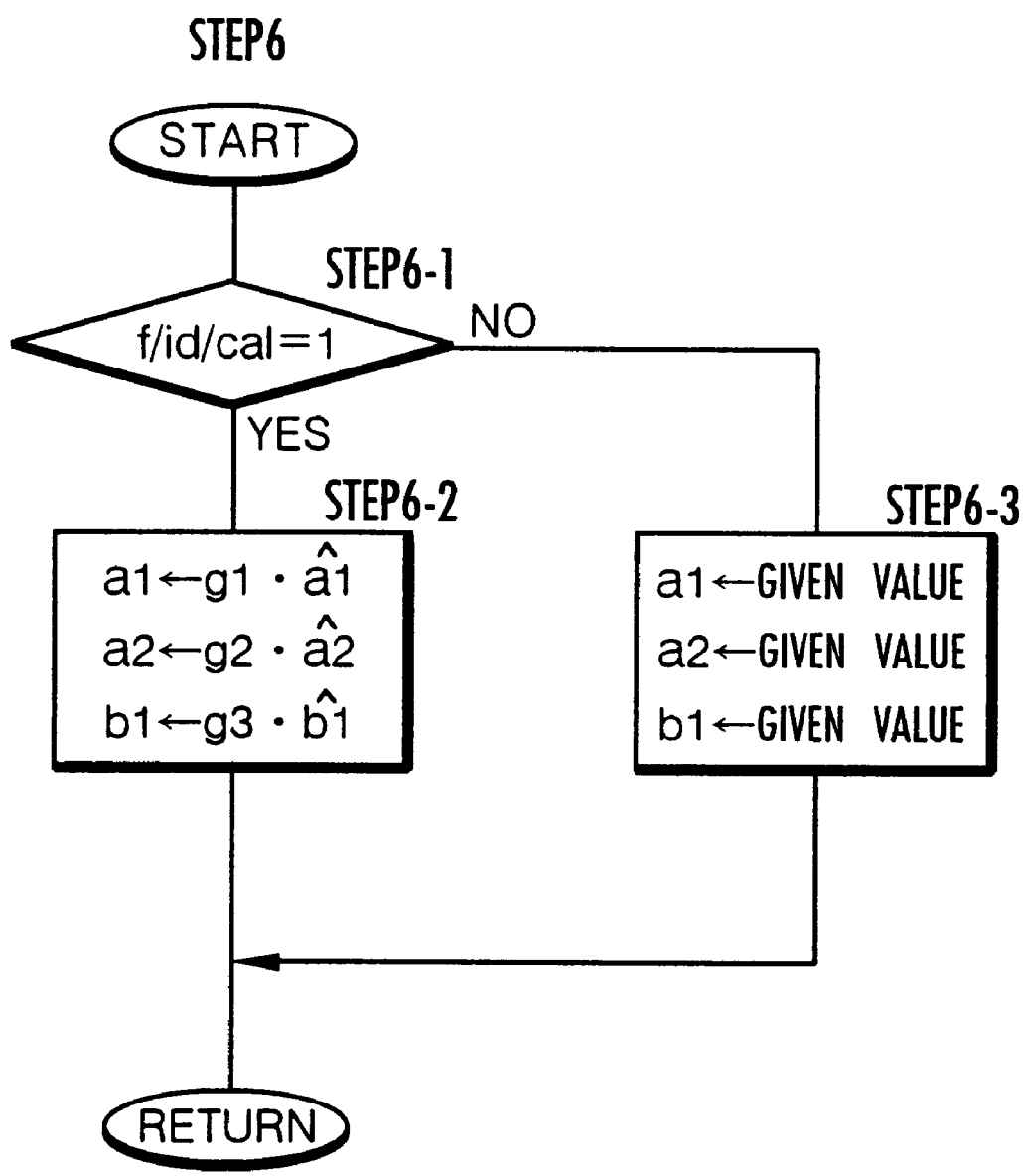
FIG. 17 is a flowchart of another subroutine of the subroutine shown in FIG. 9.

In FIG. 9, after the processing of the identifier 25 has been carried out, the air-fuel ratio manipulated variable determining unit 13 determines the gain coefficients a1, a2, b1 in STEP6. The determining subroutine of STEP6 is shown in detail in FIG. 17. As shown in FIG. 17, the air-fuel ratio manipulated variable determining unit 13 determines the value of the flag f/id/cal set in STEP2 in STEP6-1. If the value of the flag f/id/cal is "1", i.e., if the gain coefficients a1, a2, b1 have been identified by the identifier 25, then the gain coefficients a1, a2, b1 are set to respective values that are produced by scaling the identified gain coefficients a1 hat, a2 hat, b1 hat determined by the identifier 25 in STEP5-10 (see FIG. 11) with respective scaling coefficients g1, g2, g3, in STEP6-2. In the present embodiment, each of the scaling coefficients g1, g2, g3 has a value of "1", and the values of the identified gain coefficients a1 hat, a2 hat, b1 hat serve directly as the values of the gain coefficients a1, a2, b1.

If the value of the flag f/id/cal is "0", i.e., if the gain coefficients a1, a2, b1 have not been identified by the identifier 25, then the gain coefficients a1, a2, b1 are set to predetermined values, respectively, in STEP6-3.

Then, the air-fuel ratio manipulated variable determining unit 13 effects a processing operation of the estimator 26, i.e., calculates the estimated differential output VO2 bar, in STEP7 of the main routine shown in FIG. 9.

Figure 18:
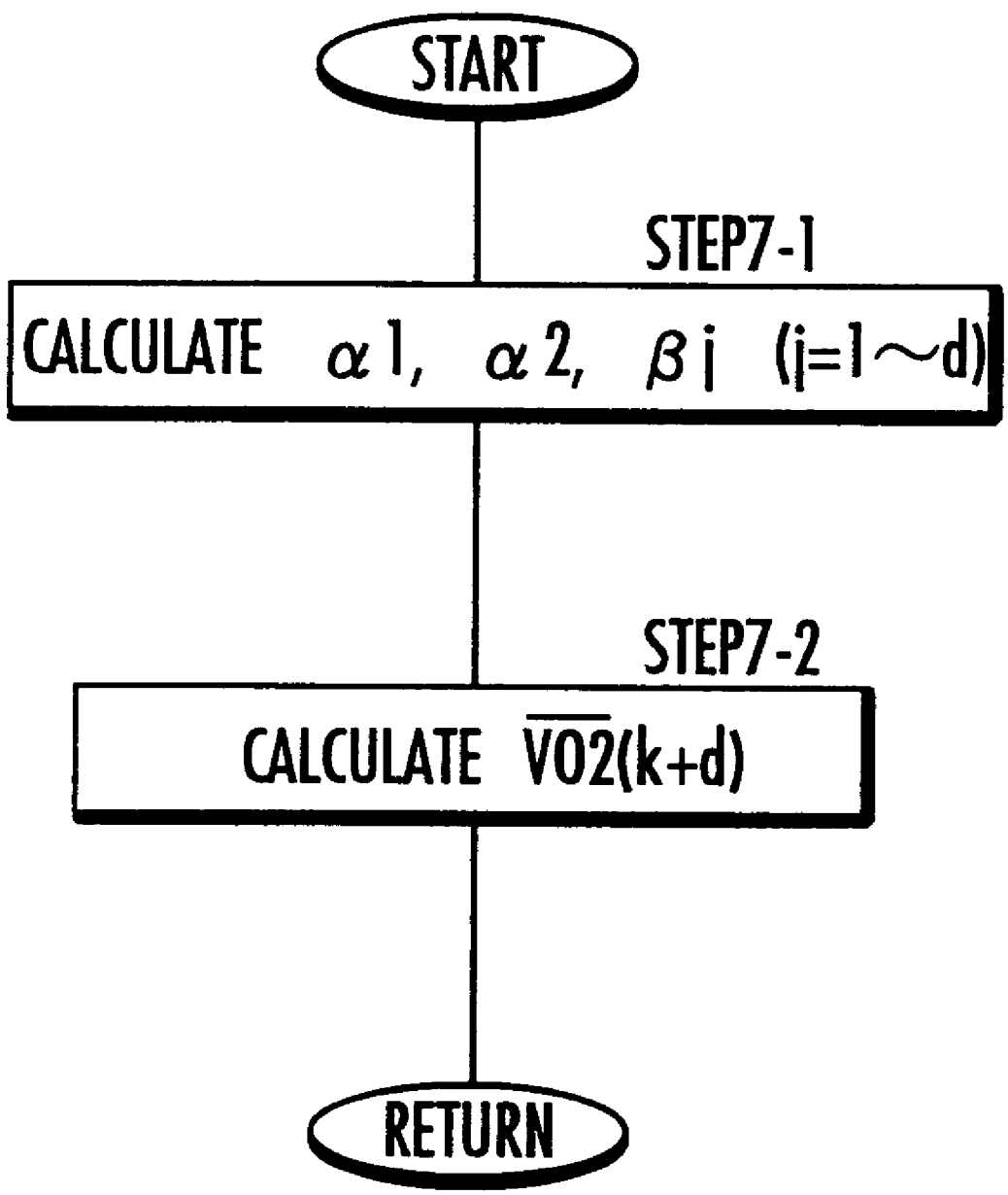
FIG. 18 is a flowchart of yet still another subroutine of the process shown in FIG. 9.

The calculating subroutine of STEP7 is shown in detail in FIG. 18. As shown in FIG. 18, the estimator 26 calculates the coefficients α1, α2, αj (j=1, 2, ... , d) to be used in the equation (16), using the gain coefficients a1, a2, b1 determined in STEP6 (these values are basically the identified gain coefficients a1 hat, a2 hat, b1 hat which have been limited in STEP5-8 shown in FIG. 12) in STEP7-1. The coefficients α1, α2 are the first-row, first-column element and the first-row, second-column element of the matrix Ad, and the coefficients βj (j=1, 2, ... , d) are the first-row elements of the vector $A^{j-1} \cdot B$ (j=1, 2, ... , d) (see the equations (13), (14)).

Then, in STEP7-2, the estimator 26 calculates the estimated differential output VO2(k+d) bar (estimated value of the differential output VO2 after the total dead time d from the time of the present control cycle) according to the equation (16) (the equation (17) in the present embodiment), using the time-series data VO2(k), VO2(k−1), from before the present control cycle, of the differential output VO2 of the $O_2$ sensor acquired in each control cycle in STEP3 shown in FIG. 9, the. time-series data kact(k−j) (j=0 −d1), from before the present control cycle, of the differential output kact of the LAF sensor 5, the time-series data kcmd(k−j) (=usl(k−j) (j=1−d2−1), from before the preceding control cycle, of the target differential air-fuel ratio kcmd (=the SLD manipulating input us1) given in each control cycle from the sliding mode controller 27, and the coefficients α1, α2, βj calculated in STEP7-1.

Referring back to FIG. 9, the air-fuel ratio manipulated variable determining unit 13 then calculates the SLD manipulating input usl (=the target differential air-fuel ratio kcmd) with the sliding mode controller 27 in STEP8.

Figure 19:
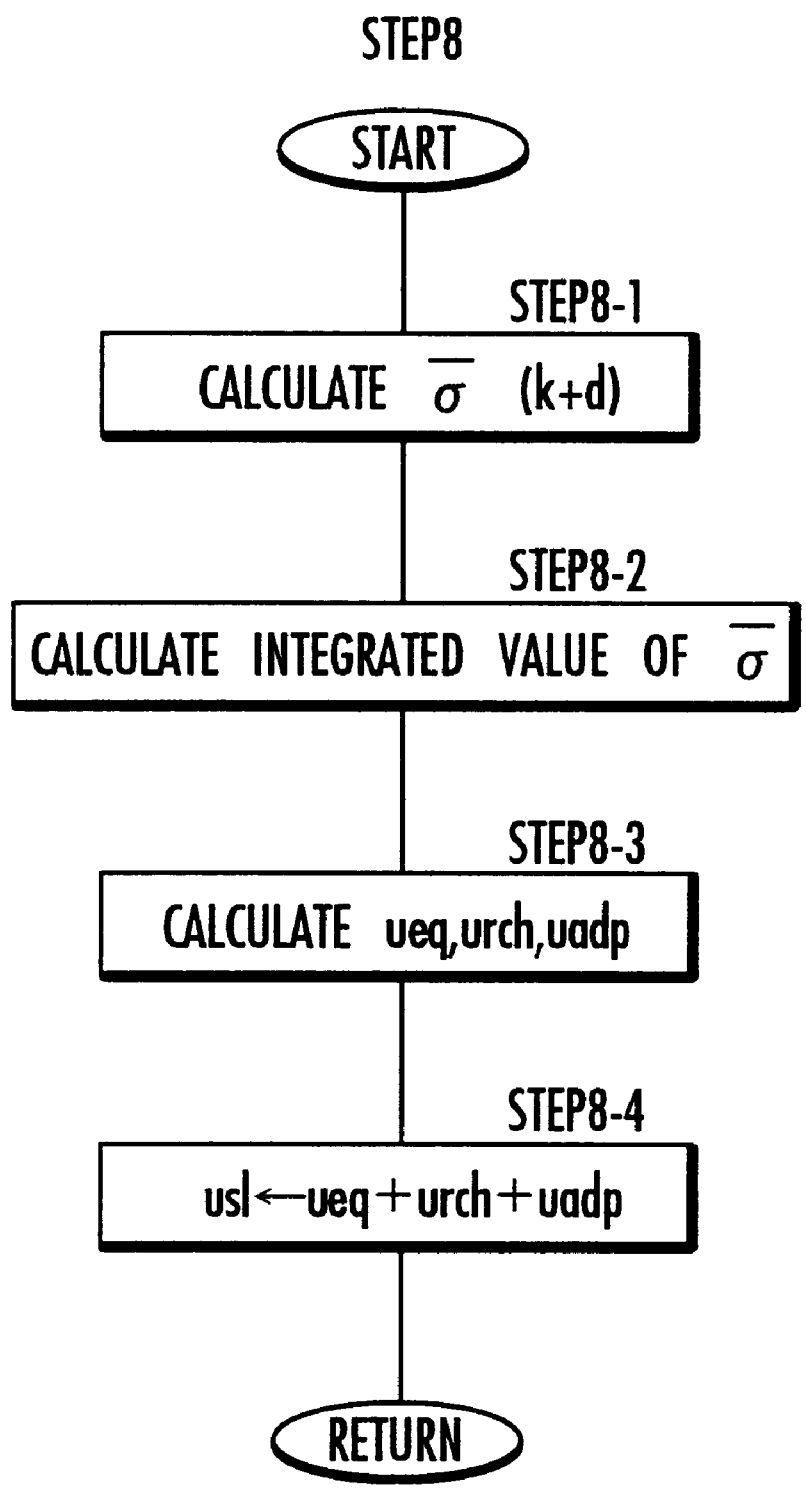
FIG. 19 is a flowchart of a further subroutine of the process shown in FIG. 9.

The calculating subroutine of STEP8 is shown in detail in FIG. 19.

As shown in FIG. 19, the sliding mode controller 27 calculates a value σ(k+d) bar (corresponding to an estimated value, after the dead time d, of the linear function σ defined according to the equation (14)), after the dead time d from the present control cycle, of the linear function σ bar defined according to the equation (35), using the time-series data of the estimated differential output VO2 bar determined by the estimator 26 in STEP8 (specifically, the VO2 (k+d) bar determined in the present control cycle and the VO2 (k+d−1) bar determined in the preceding control cycle), in STEP8-1.

Then, the sliding mode controller 27 accumulates values σ(k+d) bar calculated in respective control cycles in STEP8-1, i.e., adds a value σ(k+d) calculated in the present control cycle to the sum determined in the preceding control cycle, thereby calculating an integrated value of σ((k+d) bar (which corresponds to the term at the right end of the equation (32)) in STEP8-2. In the present embodiment, the integrated value of σ(k+d) bar falls in a predetermined range, and if the integrated value of σ(k+d) bar exceeds a given upper or lower limit, then the integrated value of σ(k+d) bar is limited to the upper or lower limit. This is because if the integrated value of σ(k+d) bar is excessively large, then adaptive control law input uadp determined according to the equation (32) will become excessive, tending to impair controllability.

Then, the sliding mode controller 27 calculates the equivalent control input ueq, the reaching control law input urch, and the adaptive control law uadp according to the respective equations (29), (30), (32) in STEP8-3, using the time-series data VO2(k+d)bar, VO2(k+d−1) bar of the estimated differential output VO2 bar determined by the estimator 26 in STEP9, the value σ(k+d) bar of the linear function and its integrated value which are determined respectively in STEP8-1 and STEP8-2, the gain coefficients a1, a1, b1 determined in STEP 6 (which are basically the gain coefficients a1 hat, a2 hat, b1 hat limited in STEP5-8 shown in FIG. 12).

The sliding mode controller 27 then adds the equivalent control input ueq, the reaching control law input urch, and the adaptive control law uadp determined in STEP8-3 to calculate the SLD manipulating input usl, i.e., the input (=the target differential air-fuel ratio kcmd) to be applied to the exhaust system E for converging the output signal VO2/OUT of the $O_2$ sensor 6 toward the target value VO2/TARGET in STEP8-4. SLD manipulating inputs usl (=target differential air-fuel ratios kcmd) thus determined in respective control cycles are stored in a time-series fashion in a memory (not shown) for use in the above processing operation of the estimator 26.

In FIG. 9, after the SLD manipulating input usl has been calculated, the air-fuel ratio manipulated variable determining unit 13 determines the stability of the adaptive sliding mode control process carried out by the sliding mode controller 27, and sets a value of a flag f/sld/stb indicative of whether the adaptive sliding mode control process is stable or not in STEP9.

Figure 20:
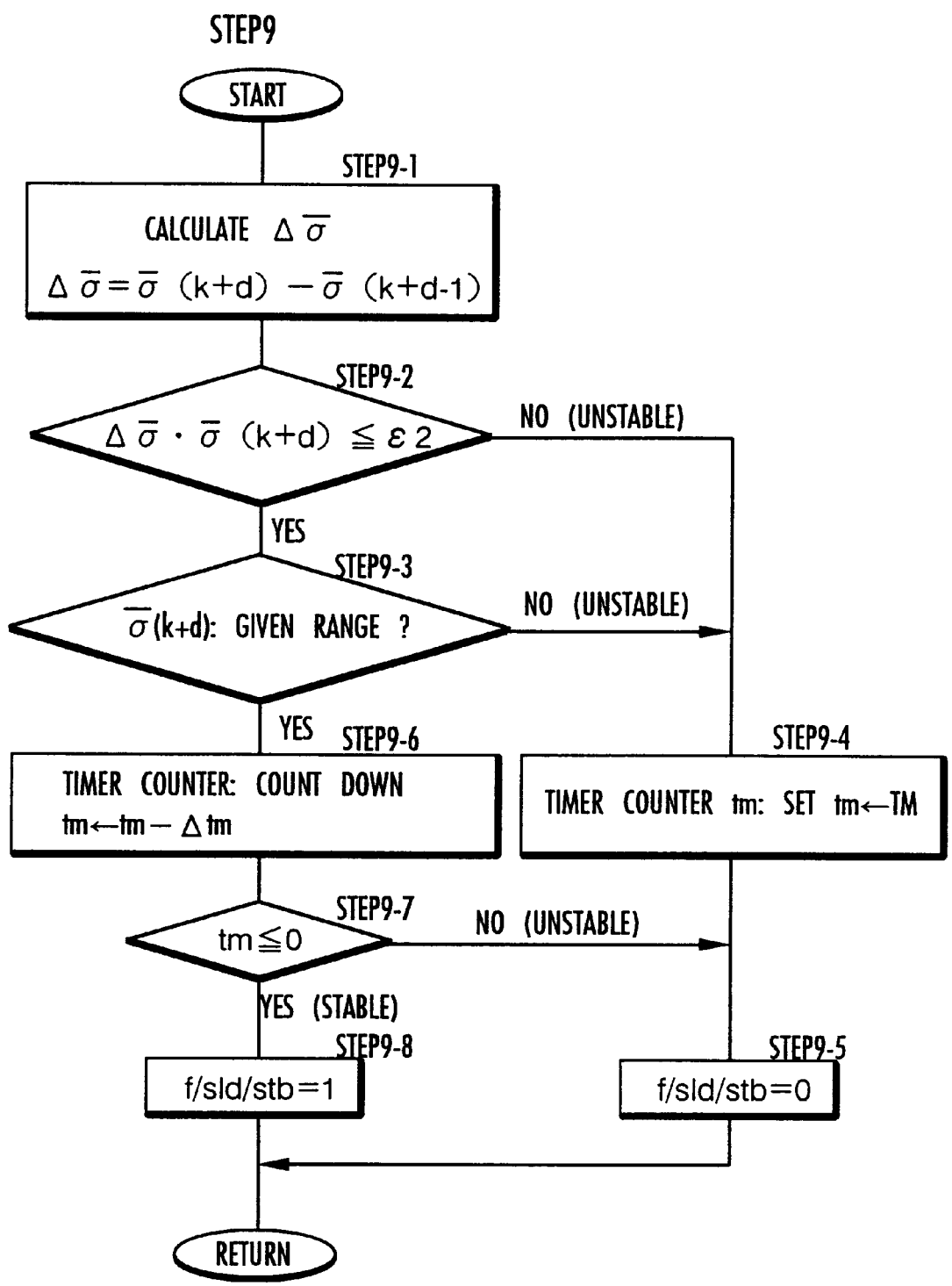
FIG. 20 is a flowchart of a still further subroutine of the process shown in FIG. 9.

The determining subroutine of STEP9 is shown in detail in FIG. 20.

As shown in FIG. 20, the air-fuel ratio manipulated variable determining unit 13 calculates a difference Δσ bar (corresponding to a rate of change of the linear function σ bar) between the present value σ(k+d) bar calculated in STEP8-1 and a preceding value σ(k+d−1) bar of the linear function σ bar in STEP9-1.

Then, the air-fuel ratio manipulated variable determining unit 13 decides whether or not a product Δσ·σ(k+d) bar (corresponding to the time-differentiated function of a Lyapunov function σ $bar^2/2$ relative to the σ bar) of the difference Δσ bar calculated in STEP9-1 and the present value σ(k+d) bar is equal to or smaller than a predetermined value ε2 ($\geq$ 0) in STEP9-2.

When the difference Δσ·σ(k+d) bar is greater than ε2, the differential outputs VO2(K+d), VO2(k+d−1) change away from the hyperplane σ=0 with σ $bar^2$ increasing, and hence the adaptive sliding mode control process is considered to be unstable, i.e., the SLD manipulating input usl calculated in STEP8 is inappropriate. Therefore, if Δσ·σ((k+d) bar>ε2 in STEP9-2, then the adaptive sliding mode control process is judged as being unstable, and the value of a timer counter tm (count-down timer) is set to a predetermined initial value TM (the timer counter tm is started) in order to inhibit the determination of the target air-fuel ratio KCMD using the SLD manipulating input usl calculated in STEP8 for a predetermined time in STEP9-4. Thereafter, the value of the flag f/sld/stb is set to "0" (the flag f/sld/stb=0 represents that the adaptive sliding mode control process is unstable) in STEP9-5.

While the value ε2 used in the decision step of STEP9-2 may theoretically be "0", it should preferably be slightly greater than "0" in view of the effect of probabilistic disturbance.

If $\Delta\sigma \cdot \sigma(k+d)$ bar $\leq \epsilon2$ in STEP9-2, then the air-fuel ratio manipulated variable determining unit 13 decides whether the present value $\sigma(k+d)$ bar of the linear function $\sigma$ bar falls within a predetermined range or not in STEP9-3.

If the present value ($(k+d)$ bar of the linear function $\sigma$ bar does not fall within the predetermined range, the differential outputs VO2(K+d), VO2(k+d−1) are spaced widely apart from the hyperplane $\sigma=0$, and hence the adaptive sliding mode control process is considered to be unstable, i.e., the SLD manipulating input usl calculated in STEP8 is inappropriate. Therefore, if the present value $\sigma(k+d)$ bar of the linear function $\sigma$ bar does not fall within the predetermined range in STEP9-3, then the adaptive sliding mode control process is judged as being unstable, and the processing of STEP9-4 through STEP9-5 is executed to start the timer counter tm and set the value of the flag f/id/reset to "1".

If the present value $\sigma(k+d)$ bar of the linear function $\sigma$ bar falls within the predetermined range in STEP9-3, then the air-fuel ratio manipulated variable determining unit 13 counts down the timer counter tm for a predetermined time Atm in STEP9-6. The air-fuel ratio manipulated variable determining unit 3 then decides whether or not the value of the timer counter tm is equal to or smaller than "0", i.e., whether a time corresponding to the initial value TM has elapsed from the start of the timer counter tm or not, in STEP9-7.

If tm>0, i.e., if the timer counter tm is still measuring time and its set time has not yet elapsed, then since the adaptive sliding mode control process tends to be unstable before substantial time has not elapsed since the adaptive sliding mode control process was judged as being unstable in STEP9-2 or STEP9-3, the value of the flag f/sld/stb is set to "0" in STEP9-5.

If tm≤0 in STEP9-7, i.e., if the set time of the timer counter tm has elapsed, then the adaptive sliding mode control process is judged as being stable, and the value of the flag f/sld/stb is set to "1" (the flag f/sld/stb=1 represents that the adaptive sliding mode control process is stable) in STEP9-8.

The air-fuel ratio manipulated variable determining unit 13 determines the stability of the adaptive sliding mode control process carried out by the sliding mode controller 27 according to the subroutine shown in FIG. 20. If the adaptive sliding mode control process is judged as being unstable, then the value of the flag f/sld/stb is set to "0", and if the adaptive sliding mode control process is judged as being stable, then the value of the flag f/sld/stb is set to "1".

In the present embodiment, the stability of the adaptive sliding mode control process is determined by judging the conditions of STEP 9-2, STEP 9-3. However, the stability of the adaptive sliding mode control process may be determined by judging either one of the conditions of STEP 9-2, STEP9-3. Alternatively, the stability of the adaptive sliding mode control process may be determined by comparing the magnitude (absolute value) of the difference $\Delta\sigma$ corresponding to the rate of change of the linear function $\sigma$ bar with a predetermined value.

Referring back to FIG. 9, after a value of the flag f/sld/stb indicative of the stability of the adaptive sliding mode control process carried out by the sliding mode controller 27 has been set, the air-fuel ratio manipulated variable determining unit 13 determines the value of the flag f/sld/stb in STEP10. If the value of the flag f/sld/stb is "1", i.e., if the adaptive sliding mode control process is judged as being stable, then the sliding mode controller 27 limits the SLD manipulating input usl calculated in STEP 8 in STEP11. Specifically, the value of the SLD manipulating input usl or a range in which the value of the SLD manipulating input usl can vary is limited to a certain range, and if the present value usl(k) of the SLD manipulating input usl calculated in STEP 8 exceeds a given upper or lower limit, then the value of the SLD manipulating input usl is forcibly limited to the upper or lower limit. If a change of the present value usl(k) of the SLD manipulating input usl calculated in STEP 8 from a preceding value usl(k−1) thereof exceeds a predetermined quantity, then the value of the SLD manipulating input usl is forcibly set to a value which is equal to the sum of the preceding value usl(k−1) and the predetermined quantity.

After having limited the SLD manipulating input usl as described above, the sliding mode controller 27 calculates the target air-fuel ratio KCMD according to the equation (33) in STEP13. Then, the processing of the present control cycle is finished.

If the value of the flag f/sld/stb is "0", i.e., if the adaptive sliding mode control process is judged as being unstable, then the air-fuel ratio manipulated variable determining unit 13 sets the value of the SLD manipulating input usl in the present control cycle forcibly to a predetermined value, i.e., either a fixed value or a preceding value of the SLD manipulating input usl, in STEP 12. Thereafter, the sliding mode controller 27 calculates the target air-fuel ratio KCMD according to the equation (33) in STEP 13, followed by an end put to the processing of the present control cycle.

The target air-fuel ratio KCMD that is finally determined in STEP 13 is stored as time-series data for respective control cycles in a memory (not shown). When the general feedback controller 15, etc. is to use the target air-fuel ratio KCMD determined by the air-fuel ratio manipulated variable determining unit 13 (see STEPf in FIG. 7), the general feedback controller 15 selects the latest target air-fuel ratio KCMD from the stored time-series data thereof.

The operation of the plant control system has been described in detail above.

The operation of the plant control system will be summarized as follows: The air-fuel ratio manipulated variable determining unit 13 sequentially determines the target air-fuel ratio KCMD (corresponding to the target input for the exhaust system E) for the exhaust gas introduced into the catalytic converter 3 so as to adjust (converge) the output signal VO2/OUT (corresponding to the output of the exhaust system E as the plant) of the $O_2$ sensor 6 downstream of the catalytic converter 3 to the target value VO2/TARGET therefor. The amount of fuel supplied to the internal combustion engine 1 as the actuator for generating the input (the air-fuel ratio of the exhaust gas) to the exhaust system E is feedback-controlled according to the target air-fuel ratio KCMD based on the target air-fuel ratio KCMD and the output KACT of the LAF sensor 5 upstream of the catalytic converter 3. By adjusting the output signal VO2/OUT of the $O_2$ sensor 6 downstream of the catalytic converter 3 to the target value VO2/TARGET, the catalytic converter 3 can maintain its optimum exhaust gas purifying performance without being affected by its own aging.

The air-fuel ratio manipulated variable determining unit 13 determines the target air-fuel ratio KCMD (the target input for the exhaust system E) using the sliding mode control process which is essentially resistant to disturbances, especially the adaptive sliding mode control process to which the adaptive control law for eliminating the effect of disturbances as much as possible is added. Consequently, the air-fuel ratio manipulated variable determining unit 13 can determine the target air-fuel ratio KCMD stably while suppressing the effect of disturbances as much as possible, which is suitable for the purpose of adjusting the output signal VO2/OUT (the output of the exhaust system E) of the O₂ sensor 6 to the target value VO2/TARGET. Accordingly, the output signal VO2/OUT of the O₂ sensor 6 can be controlled stably and accurately at the target value VO2/TARGET.

When the sliding mode controller 27 of the air-fuel ratio manipulated variable determining unit 13 is to determine the target air-fuel ratio KCMD according to the adaptive sliding mode control process, the sliding mode controller 27 uses the estimated value of the differential output VO2 from the O₂ sensor 6 after the total dead time d which is the sum of the dead time d1 of the exhaust system E and the dead time d2 of the air-fuel ratio manipulating system (which comprises the internal combustion engine 1 and the engine control unit 7*b*). Then, the sliding mode controller 27 determines the target air-fuel ratio KCMD (the target input for the exhaust system E) in order to converge the estimated value of the output VO2/OUT (the output of the exhaust system E) of the O₂ sensor 6 after the total dead time d, represented by the estimated differential output VO2, toward the target value VO2/TARGET. Therefore, the effect of not only the dead time d1 existing in the exhaust system E, but also the dead time d2 of the air-fuel ratio manipulating system, is compensated for (eliminated), thus increasing the stability of the control process for converging the output VO2/OUT of the O₂ sensor 6 toward the target value VO2/TARGET.

The dead time d2 of the air-fuel ratio manipulating system is set to a preset constant value which is equal to or slightly longer than the dead time which the air-fuel ratio manipulating system can take at an idling rotational speed of the internal combustion engine 1, which is a rotational speed in a low speed range of the internal combustion engine 1. Therefore, the dead time of the air-fuel ratio manipulating system can be compensated for at substantially all rotational speeds of the internal combustion engine 1, and hence the stability of the control process for converging the output VO2/OUT of the O₂ sensor 6 toward the target value VO2/TARGET can be maintained irrespective of the rotational speed of the internal combustion engine 1. At the same time, the processing operation of the estimator 26 can easily be carried out by setting the dead time d 2 of the air-fuel ratio manipulating system to a preset constant value.

Furthermore, the estimator 26 determines the estimated differential output VO2 bar of the O₂ sensor 6 according to the equation (16) with respect to those time-series data which can be replaced with the differential output kact of the LAF sensor 5 (those prior to the dead time d2), of all the time-series data of the target differential air-fuel ratio kcmd in the equation (15), which is a basic equation of the estimating process of the estimator 26. Consequently, it is possible to obtain the estimated differential output VO2 bar depending on the actual behaviors of the internal combustion engine 1. As a result, the reliability of the estimated differential output VO2 bar is increased, and the stability of the control process for converging the output VO2/OUT of the O₂ sensor 6 toward the target value VO2/TARGET is increased.

In the present embodiment, the gain coefficients a1, a2, b1 as parameters to be established for the discrete-system model of the exhaust system E are identified on a real-time basis by the identifier 25 to minimize the modeling error of the discrete-system model determined by the gain coefficients a1, a2, b1 with respect to the actual exhaust system E depending on the actual behaviors of the exhaust system E. Using the gain coefficients a1, a2, b1 identified by the identifier 25, the processing operation of the sliding mode controller 27 and the estimator 26 is carried out to determine the target air-fuel ratio KCMD (the target input for the exhaust system E). The target air-fuel ration KCMD can be determined depending on the actual behaviors of the exhaust system E, and the output Vo2/OUT of the O₂ sensor 6 can be converged toward the target value VO2/TARGET with high accuracy.

Since the values of the identified gain coefficients a1, a2, b1 are limited according to the first and second limiting conditions as described above when they are identified by the identifier 25, the target air-fuel ratio KCMD determined by the sliding mode controller 27 is prevented from oscillating at a high frequency. As a result, the internal combustion engine 1 is allowed to operated smoothly and stably, while allowing the output VO2/OUT of the O₂ sensor 6 to be controlled highly accurately at the target value VO2/TARGET.

The present invention is not limited to the embodiment described above, but may be modified as follows:

In the above embodiment, the dead time d2 (second dead time) of the air-fuel ratio manipulating system (which comprises the internal combustion engine 1 and the engine control unit 7*b*) is set to a constant value. However, as the actual dead time of the air-fuel ratio manipulating system varies depending on the rotational speed of the internal combustion engine 1 as shown in FIG. 4, the dead time d2 may be determined variably depending on the rotational speed of the internal combustion engine 1.

Figure 21:
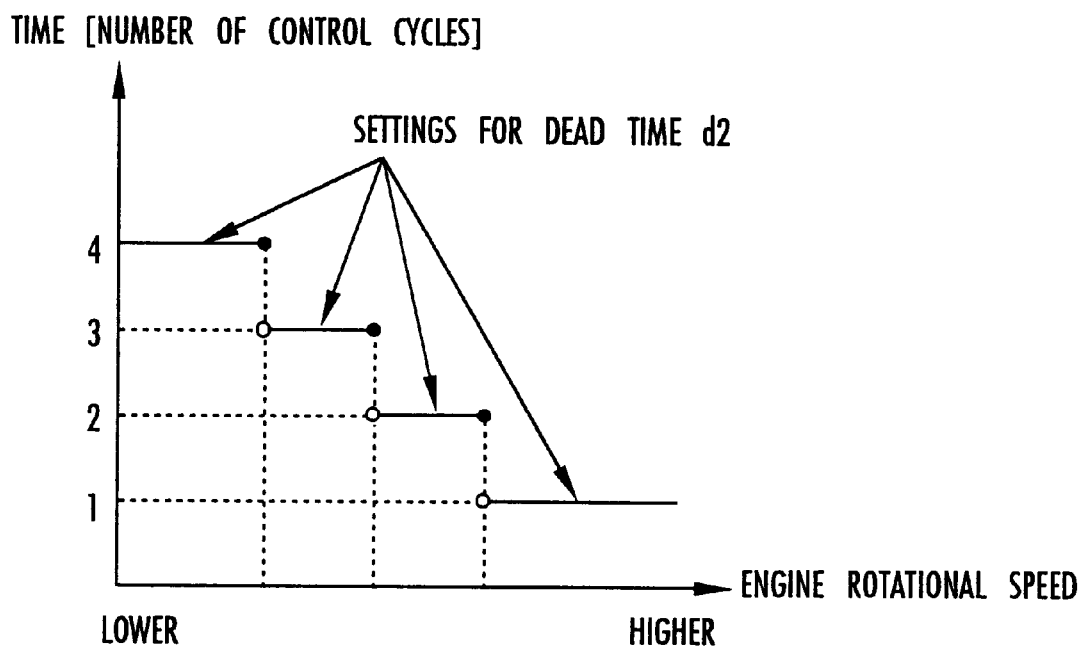
FIG. 21 is a diagram illustrative of a modification of a control process carried out by the arrangement shown in FIG. 1.

In such a case, the preset value of the dead time d2 (expressed in terms of the number of control cycles) is determined so as to be smaller stepwise as the rotational speed of the internal combustion engine 1 is higher, as shown in FIG. 21. In the processing operation (STEP 7, STEP 8) in each control cycle of the estimator 26 and the sliding mode controller 27, a preset value of the dead time d2 is determined from a data table shown in FIG. 21 based on a detected value of the rotational speed NE of the internal combustion engine 1, and the above processing operation (shown in FIGS. 18 and 19) is carried out using the determined preset value of the dead time d2, the preset value (constant value) of the dead time d1 of the exhaust system E, and their total dead time d (=d1+d2).

For limiting the values of the identified gain coefficients a1 hat, a2 hat, b1 hat, particularly the combinations of the values of the identified gain coefficients a1 hat, a2 hat, b1 hat, the identifying coefficient stable range on the coordinate plane shown in FIG. 15 may be determined in advance which corresponds to the estimating coefficient stable range shown in FIG. 14 with respect to values (four types in FIG. 21) to be set as the dead time d2 of the air-fuel ratio manipulating system. A range overlapping or approximating the identifying coefficient stable range is determined as an identifying coefficient limiting range, and the combinations of the values of the identified gain coefficients a1 hat, a2 hat, b1 hat may be limited in the same manner as with the above embodiment by the determined identifying coefficient limiting range.

The dead time d2 is set to a value equal to or slightly longer than the maximum dead time which the air-fuel ratio manipulating system can actual take in the rotational speed range of the internal combustion engine 1 in which the dead time d2 is constant. In this case, the other processing than the above processing operation may be the same as with the above embodiment.

Even if the dead time d2 of the air-fuel ratio manipulating system is established so as to be variable depending on the rotational speed of the internal combustion engine 1, the dead time of the air-fuel ratio manipulating system and also the dead time of the exhaust system E can appropriately be compensated irrespective of the rotational speed of the internal combustion engine 1, and the controllability of the output VO2/OUT of the $O_2$ sensor 6 at the target value VO2/TARGET can be increased.

If the dead time d2 of the air-fuel ratio manipulating system is established so as to be variable, it can be established depending on only the rotational speed of the internal combustion engine 1, but also the load on the internal combustion engine 1 as represented by the intake pressure thereof, etc.

In the above embodiment, the dead time d2 of the air-fuel ratio manipulating system is set to a constant value corresponding to the idling rotational speed of the internal combustion engine 1. However, the dead time d2 may be established depending on a rotational speed range other than the idling rotational speed of the internal combustion engine 1. For example, if the air-fuel ratio of the internal combustion engine 1 is controlled by the exhaust control unit 7a in a certain rotational speed range of the internal combustion engine 1, then the dead time d2 may be set to a constant value as described above or a variable value depending on the actual dead time which the air-fuel ratio manipulating system can take in such a rotational speed range.

In the above embodiment, the estimated differential output VO2 bar of the $O_2$ sensor 6 is determined in each control cycle by the estimator 26 according to the equation (16) where all time-series data prior to the dead time d2 of the air-fuel ratio manipulating system, of those time-series data of the target differential air-fuel ratio kcmd in the equation (15), are replaced with the differential output kact of the LAF sensor 5. However, the estimated differential output VO2 bar may be determined according to an equation where only some of the time-series data of the target differential air-fuel ratio kcmd prior to the dead time d2 in the equation (15) are replaced with the differential output kact of the LAF sensor 5. Alternatively, such data replacement may not be carried out, but the estimated differential output VO2 bar may be determined according to the equation (15). In this case, only the processing operation of the estimator 26 may be changed to the above processing operation, whereas the other processing operation may remains the same as with the above embodiment.

In the above embodiment, the LAF sensor (widerange air-fuel ratio sensor) 5 is employed as second detecting means. However, the second detecting means may comprise an ordinary $O_2$ sensor or any of various other types of sensors insofar as it can detecting the air-fuel ratio of an exhaust gas.

In the above embodiment, the $O_2$ sensor 6 is employed as first detecting means. However, the first detecting means may comprise any of various other types of sensors insofar as it can detect the concentration of a certain component of an exhaust gas downstream of the catalytic converter to be controlled. For example, if carbon monoxide in an exhaust gas downstream of the catalytic converter is to be controlled, the first detecting means may comprise a CO sensor. If nitrogen oxide (NOx) in an exhaust gas downstream of the catalytic converter is to be controlled, the first detecting means may comprise an NOx sensor. If hydrocarbon (HC) in an exhaust gas downstream of the catalytic converter is to be controlled, the first detecting means may comprise an HC sensor. When a three-way catalytic converter is employed, then even if the concentration of any of the above gas components is detected, it may be controlled to maximize the purifying performance of the three-way cata-lytic converter. If a catalytic converter for oxidation or reduction is employed, then purifying performance of the catalytic converter can be increased by directly detecting a gas component to be purified.

In the above embodiment, the differential output kact from the LAF sensor 5, the differential output VO2 from the $O_2$ sensor 6, and the target differential air-fuel ratio kcmd are employed in performing the processing operation of the identifier 25, the estimator 26, and the sliding mode controller 27. However, the output KACT of the LAF sensor 5, the output VO2/OUT of the $O_2$ sensor 6, and the target air-fuel ratio KCMD may directly be employed in performing the processing operation of the identifier 25, the estimator 26, and the sliding mode controller 27. The reference value FLAF/BASE relative to the differential output kact (=KACT–FLAF/BASE) may not necessarily be of a constant value, but may be established depending on the rotational speed NE and intake pressure PB of the internal combustion engine 1.

In the above embodiment, the manipulated variable determined by the air-fuel ratio manipulated variable determining unit 13 is used as the target air-fuel ratio KCMD (the target input for the exhaust system E), and the amount of fuel supplied to the internal combustion engine 1 is feedback-controlled according to the target air-fuel ratio KCMD. However, it is possible for the air-fuel ratio manipulated variable determining unit 13 to determine a corrective quantity for the amount of fuel supplied to the internal combustion engine 1, or it is also possible to control the air-fuel ratio of the internal combustion engine 1 in a feedforward fashion from the target air-fuel ratio KCMD.

In the above embodiment, the sliding mode controller 27 performs the adaptive sliding mode control process having the adaptive control law in view of the effect of disturbances. However, the sliding mode controller 27 may perform a general sliding mode control process free of the adaptive control law. In such a case, the total of the equivalent control input ueq and the reaching control law input urch may be determined as the SLD manipulating input usl.

In the above embodiment, the gain coefficients a1, a2, b1 of the discrete-system model of the exhaust system E are identified by the identifier 25. However, the gain coefficients a1, a2, b1 may be fixed to predetermined values, or may be established from a map or the like depending on operating conditions of the internal combustion engine 1 and deteriorated states of the catalytic converter 3.

In the above embodiment, the target air-fuel ratio KCMD is determined by the sliding mode controller 27 using the gain coefficients a1, a2, b1 of the discrete-system model are identified by the identifier 25. However, the target air-fuel ratio KCMD may be determined using the gain coefficients a1, a2, b1 identified by a recursive-type controller such as an adaptive controller or the like. Alternatively, a fuzzy controller or a neural-network controller may be used insofar as it can determine the target air-fuel ratio KCMD using the identified gain coefficients a1, a2, b1.

In the above embodiment, the plant control system serves to control a plant which comprises the exhaust system E. However, the plant control system may be used to control another plant.

A plant control system according to another embodiment of the present invention will be described below with reference to FIG. 22.

Figure 22:
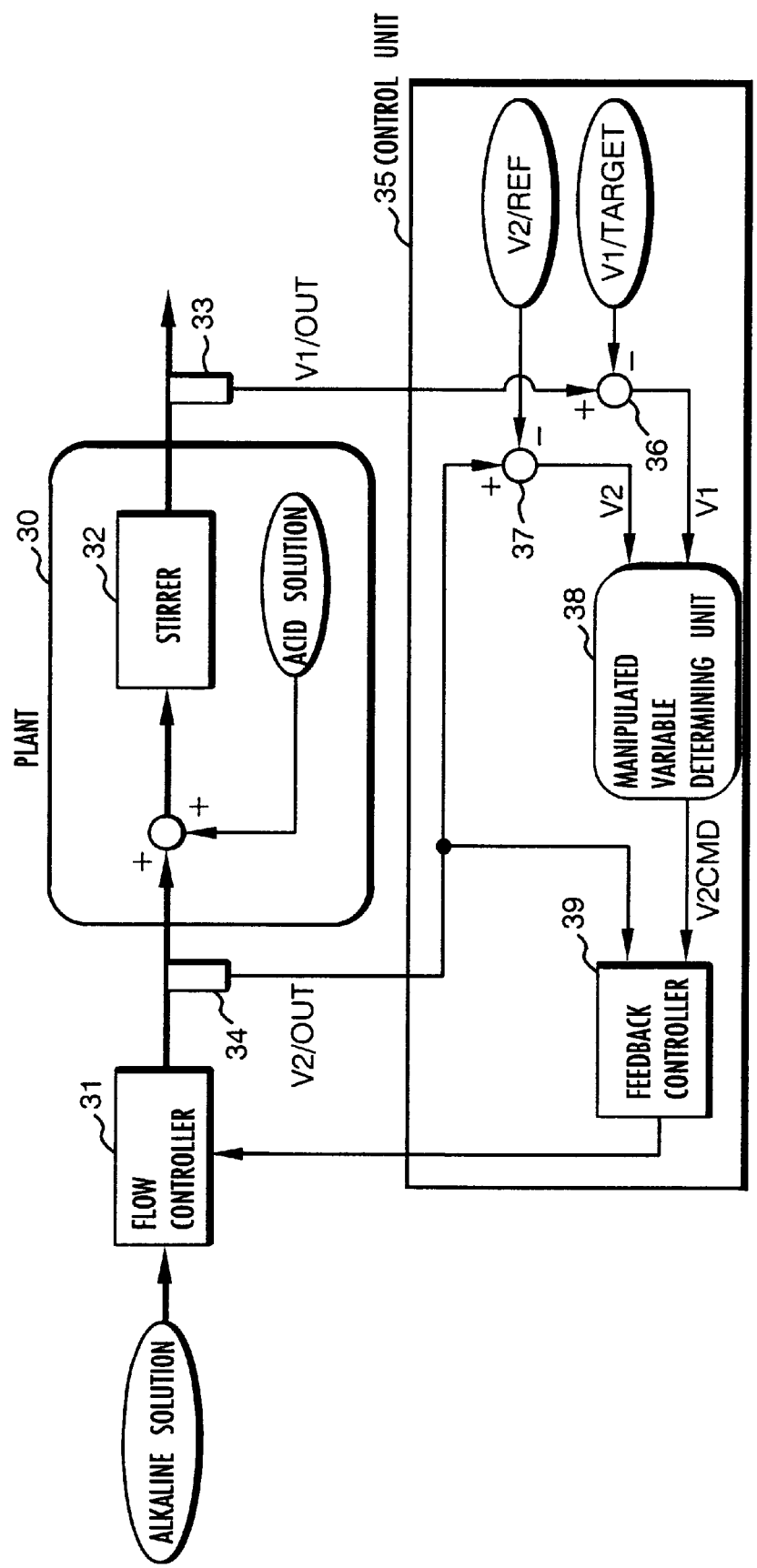
FIG. 22 is a block diagram of a plant control system according to another embodiment of the present invention.

As shown in FIG. 22, a plant 30 is supplied with an alkaline solution at a flow rate which can be regulated by a flow controller (actuator) 31. The plant 30 mixes the supplied alkaline solution with an acid solution, and stirs them into a mixed solution with a stirrer 32.

The plant control system according to the embodiment shown in FIG. 22 serves to control the flow rate of the alkaline solution supplied to the plant 30 for adjusting the pH of the mixed solution (the mixture of the alkaline solution and the acid solution) discharged from the plant 30 to a desired pH, i.e., a pH corresponding to a neutral value.

The plant control system has a pH sensor 33 (first detecting means) disposed at the outlet of the plant 30 for detecting the pH of the mixed solution discharged from the plant 30, a flow rate sensor 34 (second detecting means) disposed at the inlet of the plant 30 for detecting the flow rate of the alkaline solution supplied to the plant 30, and a control unit 35 for performing a processing operation (described later on) based on respective outputs V1/OUT, V2/OUT of the pH sensor 33 and the flow rate sensor 34.

The control unit 35 comprises a microcomputer or the like. The control unit 35 comprises a subtractor 36 for calculating a difference V1 (=V1/OUT−V1/TARGET) between the output V1/OUT of the pH sensor 33 and a target value V1/TARGET (which corresponds to a target pH of the mixed solution) therefor, as data representing the output of the pH sensor 33, a subtractor 37 for calculating a difference V2 (=V2/OUT−V2/REF, which will hereinafter referred to as a differential output V2 from the flow rate sensor 34) between the output V2/OUT of the flow rate sensor 34 and a predetermined reference value V2/REF (which may be an arbitrary value), as data representing the output of the flow rate sensor 34, a manipulated variable determining unit 38 for determining a target flow rate V2CMD for the alkaline solution supplied to the plant 30 for converging the output V1/OUT of the pH sensor 33 toward the target value V1/TARGET based on the differential outputs V1, V2, as a manipulated variable for determining the input to the plant 30, and a feedback controller 39 (actuator control means) for feedback-controlling a controlled variable for the flow controller 31 for equalizing the output V2/OUT (detected flow rate) of the flow rate sensor 34 to the target flow rate V2CMD.

The difference (=V2CMD−V2/REF) between the target flow rate V2CMD and the reference value V2/REF is referred to as a target differential flow rate v2cmd (which corresponds to the target differential air-fuel ratio kcmd in the above embodiment). A system which comprises the flow controller 31 and the feedback controller 39, i.e., a system for generating an alkaline solution at a rate detected by the flow rate sensor 34 from the target flow rate V2CMD is referred to as a flow rate manipulating system (which corresponds to the air-fuel ratio manipulating system in the above embodiment).

The manipulated variable determining unit 38 has an identifier, an estimator, and a sliding mode controller (not shown) which are identical to those of the air-fuel ratio manipulated variable determining unit 13 according to the above embodiment. The manipulated variable determining unit 38 employs a discrete-system model of the plant 30 where VO2, kact in the equation (1) described above are replaced respectively with the differential outputs V1, V2, and a discrete-system model of the flow rate manipulating system where kact, kcmd in the equation (2) are replaced respectively with the differential output V2 and the target differential flow rate v2cmd, and carries out the same processing operations as those of the identifier 25, the estimator 26, and the sliding mode controller 27 of the air-fuel ratio manipulated variable determining unit 13.

Specifically, the manipulated variable determining unit 38 calculates identified values (which correspond to the identified gain coefficients a1 hat, a2 hat, b1 hat in the above embodiment) of parameters of the discrete-system model of the plant 30, an estimated value (which corresponds to the estimated differential output VO2 bar in the above embodiment) of the output V1/OUT or the differential output V1 of the pH sensor 33 after a total dead time which is the sum of a dead time existing in the plant 30 and a dead time existing in the flow rate manipulating system, and the target flow rate V2CMD (which corresponds to the target air-fuel ratio KCMD in the above embodiment) using the identified values of the parameters and the estimated value of the output V1/OUT or the differential output V1 of the pH sensor 33.

A preset value of the dead time (first dead time) in the model of the plant 30 may be determined by way of experimentation so as to be a time (e.g., a constant value) which is equal to or greater than the actual dead time of the plant 30. A preset value of the dead time (second dead time) in the model of the flow rate manipulating system may be determined by way of experimentation so as to be a time (e.g., a constant value) which is equal to or greater than the actual dead time of the flow rate manipulating system in view of the operating characteristics of the flow rate controller 31. Alternatively, if the dead time of the flow rate manipulating system varies greatly depending on the operating state of the flow rate controller 31, then the preset value of the dead time in the model of the flow rate manipulating system may be determined so as to be variable depending on the operating state of the flow rate controller 31.

For limiting the values of parameters of the discrete-system model to be identified by the identifier as with the above embodiment, conditions for limiting the values of the parameters or their combinations may be established through experimentation or simulation in view of the controllability of the output V1/OUT of the pH sensor 33 at the target value V1/TARGET, the stability of the target flow rate V2CMD, and the stability of operation of the flow controller 31 depending thereon, in the same manner as with the above embodiment.

As with the general feedback controller 15 according to the above embodiment, the feedback controller 39 feedback-controls the operation of the flow controller 31 to equalize the output V2/OUT (detected flow rate) of the flow rate sensor 34 to the target flow rate V2CMD with a PID controller, an adaptive controller, or the like (not shown).

The plant control system according to the embodiment shown in FIG. 22 is effective to control the output V1/OUT of the pH sensor 33, i.e., the pH of the mixed solution generated by the plant 30, accurately at a desired pH according to the adaptive sliding mode control process regardless of the effect of disturbances and the dead time existing in the plant 30, without recognizing the pH of the acid solution mixed with the alkaline solution in the plant 30 and the flow rate of the acid solution.

The plant control system according to the present embodiment may be modified in the same manner as the air-fuel ratio control system according to the above embodiment.

Although certain preferred embodiments of the present invention have been shown and described in detail, it should be understood that various changes and modifications may be made therein without departing from the scope of the appended claims.

What is claimed is:

1. A plant control system for controlling a plant, comprising:
an actuator for generating an input to the plant;
first detecting means for detecting an output from the plant;

manipulated variable determining means for sequentially determining a manipulated variable which determines the input to the plant to equalize the output from said first detecting means to a predetermined target value;

actuator control means for controlling operation of said actuator based on the manipulated variable determined by said manipulated variable determining means; and estimating means for sequentially generating data representing an estimated value of the output from said first detecting means after a total dead time which is the sum of a first dead time of said plant and a second dead time of a system which comprises said actuator and said actuator control means;

said manipulated variable determining means comprising means for determining said manipulated variable based on the data generated by said estimating means.

2. A plant control system according to claim 1, wherein said estimating means comprises means for establishing said second dead time so as to be variable depending on the operating state of said actuator, and generating the data representing the estimated value of the output of said first detecting means after said total dead time which is the sum of the established second dead time and said first dead time.

3. A plant control system according to claim 1, wherein said plant comprises an exhaust system of an internal combustion engine which ranges from a position upstream of a catalytic converter in the exhaust system to a position downstream of the catalytic converter, and wherein said input to said plant comprises an air-fuel ratio of an exhaust gas generated by said internal combustion engine as said actuator and introduced into said catalytic converter, and said output from said plant comprises the concentration of a component of the exhaust gas which has passed through said catalytic converter.

4. A plant control system according to claim 1 or 3, wherein said manipulated variable determining means comprises means for determining said manipulated variable in order to converge the estimated value of the output from said first detecting means as represented by the data generated by said estimating means toward said target value according to a sliding mode control process.

5. A plant control system according to claim 1 or 3, further comprising second detecting means for detecting the input to the plant, wherein the manipulated variable determined by said manipulated variable determining means comprises a target input to said plant, said actuator control means comprising means for feedback-controlling operation of said actuator to equalize the output of said second detecting means to the target input to said plant.

6. A plant control system according to claim 5, wherein said actuator control means comprises a recursive-type controller for feedback-controlling operation of said actuator.

7. A plant control system according to claim 6, wherein said recursive-type controller comprises an adaptive controller.

8. A plant control system according to claim 1 or wherein said estimating means comprises means for generating the data representing the estimated value of the output of said first detecting means according to a predetermined algorithm from the output of said first detecting means and a past value of said manipulated variable which has been determined in the past by said manipulated variable determining means.

9. A plant control system according to claim 8, wherein said predetermined algorithm is constructed on the basis of a model representing said plant with a response delay element and a dead time element of said first dead time, and a model representing said system which comprises said actuator and said actuator control means with a dead time element of said second dead time.

10. A plant control system according to claim 8, further comprising second detecting means for detecting the input to the plant, wherein the past value of said manipulated variable which is required for said estimating means to generate the data representing the estimated value of the output of said first detecting means includes at least one past value prior to said second dead time, said estimating means comprising means for generating the data representing the estimated value of the output of said first detecting means, using an output value, prior to the present time, of said second detecting means instead of all or some of the past value of said manipulated variable prior to said second dead time.

11. A plant control system according to claim 10, wherein said output value of said second detecting means used instead of the past value of said manipulated variable comprises an output value of said second detecting means at a time upon elapse said second dead time from the time when the past value of said manipulated variable is determined by said manipulated variable determining means.

12. A plant control system according to claim 10, wherein the manipulated variable determined by said manipulated variable determining means comprises a target input to said plant, said actuator control means comprising means for feedback-controlling operation of said actuator to equalize the output of said second detecting means to the target input to said plant.

13. A plant control system according to claim 12, wherein said actuator control means comprises a recursive-type controller for feedback-controlling operation of said actuator.

14. A plant control system according to claim 13, wherein said recursive-type controller comprises an adaptive controller.

15. A plant control system according to claim 1, wherein said estimating means comprises means for setting said second dead time to a preset constant value, and generating the data representing the estimated value of the output of said first detecting means after said total dead time which is the sum of the preset constant value of said second dead time and said first dead time.

16. A plant control system according to claim 15, wherein said preset constant value of the second dead time is established as a dead time of the system which comprises said actuator and said actuator control means while said actuator is operating in a predetermined state.

17. A plant control system according to claims 3, wherein said estimating means comprises means for setting said second dead time to a preset constant value, and generating the data representing the estimated value of the output of said first detecting means after said total dead time which is the sum of the preset constant value of said second dead time and said first dead time.

18. A plant control system according to claim 17, wherein said preset constant value of the second dead time is established as a dead time of the system which comprises said actuator and said actuator control means while said internal combustion engine as said actuator is operating in a predetermined low speed range.

19. A plant control system according to claim 3, wherein said estimating means comprises means for establishing said second dead time so as to be variable depending on the operating state of said internal combustion engine as said actuator, and generating the data representing the estimated value of the output of said first detecting means after said total dead time which is the sum of the established second dead time and said first dead time.

20. A plant control system according to claim 19, wherein the operating state of said internal combustion engine for establishing said second dead time includes at least a rotational speed of said internal combustion engine, said estimating means comprising means for increasing said second dead time as the rotational speed of said internal combustion engine is lower.

21. A plant control system according to any one of claims 15 through 20, wherein said estimating means comprises means for setting said first dead time to a preset constant value, and generating the data representing the estimated value of the output of said first detecting means after said total dead time which is the sum of the preset constant value of said first dead time and the preset constant value of said second dead time.

* * * * *